(12) United States Patent
Barker et al.

(10) Patent No.: US 7,590,552 B2
(45) Date of Patent: Sep. 15, 2009

(54) SYSTEMS ENGINEERING PROCESS

(75) Inventors: Bruce G. Barker, Charlotte, NC (US);
Vincent A. Buscher, Bethel, CT (US);
Juan P. Giraldo, Alexandria, VA (US);
Carrie L. LeBolt, Center Point, TX
(US); Stephen L. McLellen, Clifton, VA
(US); Sharon E. Murphy, Ballwin, MO
(US); Paul R. Popick, Easton, MD (US);
David P. Ricci, Ocean Springs, MS
(US); Janet L. Spann, Herndon, VA
(US)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 10/839,583

(22) Filed: May 5, 2004

(65) Prior Publication Data
US 2005/0251432 A1 Nov. 10, 2005

(51) Int. Cl.
*G06F 17/60* (2006.01)
(52) U.S. Cl. .................................................. 705/7
(58) Field of Classification Search .................. 705/7
See application file for complete search history.

(56) References Cited

U.S. PATENT DOCUMENTS

| | | | |
|---|---|---|---|
| 6,023,702 A | 2/2000 | Leisten et al. | |
| 6,036,345 A * | 3/2000 | Jannette et al. | 700/97 |
| 6,088,678 A | 7/2000 | Shannon | |
| 6,351,734 B1 | 2/2002 | Lautzenheiser et al. | |
| 6,519,606 B2 | 2/2003 | Burton et al. | |
| 2002/0059512 A1 | 5/2002 | Desjardins | |
| 2003/0101086 A1 | 5/2003 | San Miguel | |
| 2003/0110067 A1 | 6/2003 | Miller et al. | |

OTHER PUBLICATIONS

Daneva (Measuring Reuse of SAP Requirements: A Model-based Approach), Dec. 1999, ACM, pp. 1-10.*
Ralf Domges et al., Adapting Traceability to Project-SP, Dec. 1998/ vol. 41, No. 12 Communications of the ACM, pp. 54-62.
Michael Gruninger et al., Using Process Requirements as the Basis for the Creation and Evaluation of Process Ontologies for Enterprise Modeling, SIGGROUP Bulletin, vol. 18, No. 2, (Aug. 1997), pp. 52-55.
Klaus Pohl et al., Prime-Toward Process-Integrated Modeling Environments, AMC Transactions on Software Engineering and Methodology, vol. 8, No. 4, Oct. 1999, pp. 343-410.

* cited by examiner

*Primary Examiner*—Romain Jeanty
(74) *Attorney, Agent, or Firm*—Schmeiser, Olsen & Watts; William E. Schiesser

(57) ABSTRACT

A method for implementing a project for a customer. Business requirements are developed for the project and are reviewed for acceptability in accordance with Business Requirements Review (BRR) exit criteria. System requirements are developed for the project and are reviewed for acceptability in accordance with system requirements review (SRR) exit criteria. Component requirements are developed for the project and are reviewed for acceptability in accordance with Preliminary Design Review (PDR) exit criteria. The business requirements are decomposed into the system requirements. The system requirements are decomposed into the component requirements. A Requirements Traceability and Verification Matrix (RTVM) is generated when the business requirements are established. The RTVM is updated throughout the life of the project. The RTVM includes verification information relating to the business requirements, the system requirements, and the component requirements. The RTVM depicts hierarchical relationships between the business requirements, the system requirements, and the component requirements.

42 Claims, 55 Drawing Sheets

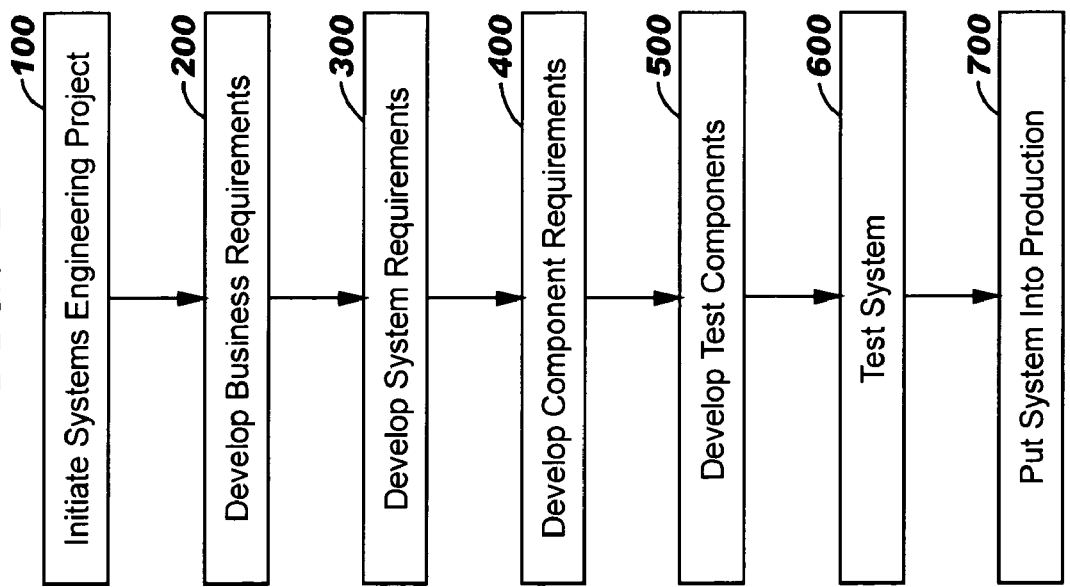

FIG. 2C

The main ground rule for a BRR is that no solutions are allowed. The BRR focuses on reviewing and signing off of business requirements and validating that "as is" business process flows exist

- Review issues and address concerns relative to:
  - Identifying and reviewing gaps in "business process flows document"
    - the "as is" end to end (e2e) business process flow that show all the business process threads that flow through the architecture if available
    - "As is" architecture, any "as is" manual touch point desk-level procedures (for example: BPSO - business partner support organization)
    - Document existing/current business process issues associated non-functional requirements (these may drive additional business requirements)
  - Reviewing and approving business requirements that will drive the project
    - identify and capture new business requirements
    - eliminate any non-agreed upon business requirements
    - modified business requirements
    - check functional and non-functional requirements
    - ensure map back to business scope and objectives (from top sheet used in Project charter)
    - review problem/opportunity, issues, defects, risks, assumptions and constraints, dependencies, deliverables, cost and schedule projections (top sheet)
    - review priority of requirements
    - ensure clarity and avoiding ambiguity pertaining to business requirements
    - review criteria and associated metrics that determine success for the project
- Stakeholders, customers, and business process owners must be present during the sessions. They must sign off on business requirements and success criteria
  - Stake Holder owns the scope and business process flows documents
  - SE will facilitate meetings to obtain agreements

FIG. 2D

- Goal: Convey a clear understanding of the business scope, objectives, and requirements that pertain to this project, and associated acceptance / success criteria. Identify "as is" business processes that will be affected. An output of this phase is a Business Requirement Review (BRR) that the business requirements and associated acceptance / success criteria are approved and baselined. *SE does not product documents for a BRR.* SE facilitates gathering and revision of these documents.

✓ Audience:
  - Stakeholders, Customers, SE, SPM

✓ Review Business requirements and acceptance criteria with customers and stakeholders
  - Business requirements mapped to Scope and Objectives
  - Ensure that agreed to business requirements and acceptance / success criteria are clear and unambiguous
  - Identify and capture new business requirements
  - Modify business requirements
  - Eliminate any non-agreed upon business requirements
  - Check functional and non-functional requirements
  - Clear understanding of the business/stakeholder needs, Rationale, and priorities
  - Gain approval of business requirements and acceptance / success criteria from customers and stakeholders
  - Sign off on business requirements
  - Put them under change control (i.e., written authority)

✓ Establish traceability and set baseline
  - The business requirements should be traceable to business scope and objectives
  - They represented the baseline for a project and the to be developed system requirements will be traceable to the business requirements ✓ Validate "as is" process flows exist and are complete
  - verify and validate "as is" manual touch point desk-level procedures
  - verify and validate "as is" business process design flow definitions
  - verify and validate "as is" architecture
  - identify gaps in process flows and ensure plans to address them ✓ Review project plan milestones
  - Primary focus is on Concept & Plan phase deliverables ✓ Review known Risks (risk mitigation) / Issues / Dependencies / Defects
  - Budget, resources, scheduling constraints; Technology and Standards to comply; Requirements and Acceptance Criteria Ambiguity; etc.

✓ Capture new Risks / Issues / Dependencies / Defects
  - Identify business dependencies (external or internal organizations, baselines, etc.)
  - Main focus are risks, issues, defects and dependencies related to business requirements, as is process flows, scope and objectives document, and acceptance criteria

FIG. 2E

| Entry Criteria | Presentation | Exit Criteria |
|---|---|---|
| Business Objectives and Scope<br>• There is a scope and objectives document<br>• Top sheet exists in scope and objectives document | Business Objectives and Scope<br>• Present business scope and objectives<br>• Present overview of business case | Business Objectives and Scope<br>• Validated that business requirements are mapped to the agreed scope and business objectives for project<br>• Identified defects, issues, risks and dependencies |
| "As is" Business Process Flows<br>• As is business process flows are defined and documented<br>• Review processes that are required to be monitored, measured and managed (M3 - end to end M3) | "As is" Business Process Flows<br>• Present list of "as is" process flows<br>• Present identified gaps in "as is" process flows<br>• Present the plan to complete "to be" process flows | "As is" Business Process Flows<br>• Validated "as is" manual touch point desk-level procedures<br>• Validated "as is" legacy business process scenarios - base functions, variant, exceptions<br>• Validated "as is" end to end legacy architecture - system, applications, interfaces<br>• Validated gaps in process flows and ensured plans to address them<br>• Validated that SMEs were involved in creation of "as is"<br>• Identified defects, issues, risks and dependencies |
| Business Requirements<br>• Business requirements are defined, documented, and prioritized<br>• Business requirements mapped to Scope and Objectives<br>• Known Issues, Risks, and dependencies are defined and documented | Business Requirements<br>• Present business requirements<br>• Present business requirements priorities<br>• Present mapping of business requirements to scope and objectives<br>• Present known issues, risks, and dependencies | Business Requirements<br>• Validated business requirements were defined<br>• Ensured that agreed to business requirements are clear and unambiguous<br>• Ensured Stakeholders and Customer signed off on business requirements and associated priority<br>• Ensured Business requirements are traceable to business scope and objectives<br>• Checked functional and non-functional requirements (Use M3 checklist if needed)<br>• Identified defects, issues, risks and dependencies for business requirements |
| Success Criteria and Associated metrics<br>• Success criteria and associated metrics are defined and documented | Success Criteria and Associated metrics<br>• Present success criteria and associated metrics<br>• Present measurement methodology | Success Criteria and Associated metrics<br>• Validated agreed to success criteria and associated metrics were defined<br>• Ensured approval of acceptance / success criteria from customers and stakeholders<br>• Ensured that acceptances / success criteria is clear and unambiguous<br>• Identified defects, issues, risks and dependencies |

FIG. 2F

| | Enter here PROJECT NAME | | |
|---|---|---|---|
| | Enter here REVIEW DATE (mm/dd/yyyy) | | |
| | Weighting Factor | BRR SCORE | USE THIS COLUMN TO ENTER SCORES |
| 1. Business Objectives and Scope | 2.50 | 0.00 | 0.00 |
| 1.1 Validated and verified business scope and objectives | 0.83 | 0.00 | 0.00 |
| 1.2 Business case reviewed (top sheet etc) | 0.83 | 0.00 | 0.00 |
| 1.3 Identified issues, risks and dependencies | 0.83 | 0.00 | 0.00 |
| 2. "As is" Business Process Flows | 5.00 | 0.00 | 0.00 |
| 2.1 Validated "as is" manual touch point desk-level procedures | 0.71 | 0.00 | 0.00 |
| 2.2 Validated "as is" legacy business process scenarios - base functions, variant, exceptions | 0.71 | 0.00 | 0.00 |
| 2.3 Validated "as is" end to end legacy architecture - system, applications, interfaces | 0.71 | 0.00 | 0.00 |
| 2.4 Validated gaps in process flows and ensured plans to address them | 0.71 | 0.00 | 0.00 |
| 2.5 Validated that SMEs were involved in creation of "as is" | 0.71 | 0.00 | 0.00 |
| 2.6 Identified issues, risks and dependencies | 0.71 | 0.00 | 0.00 |
| 2.7 Reviewed plan to complete "to be" process flows | 0.71 | 0.00 | 0.00 |
| 3. Business Requirements | 15.00 | 0.00 | 0.00 |
| 3.1 Business functional requirements | 7.50 | 0.00 | 0.00 |
| 3.1.1 Validated that requirements were defined | 1.50 | 0.00 | 0.00 |
| 3.1.2 Ensured that agreed to requirements are clear and unambiguous | 1.50 | 0.00 | 0.00 |
| 3.1.3 Ensured Stakeholders and Customer signed off on requirements and associated priority | 1.50 | 0.00 | 0.00 |
| 3.1.4 Ensured requirements are traceable to business scope and objectives | 1.50 | 0.00 | 0.00 |
| 3.1.5 Identified issues, risks and dependencies | 1.50 | 0.00 | 0.00 |
| 3.2 Business non-functional requirements | 7.50 | 0.00 | 0.00 |
| 3.2.1 Validated that requirements were defined | 1.50 | 0.00 | 0.00 |
| 3.2.2 Ensured that agreed to requirements are clear and unambiguous | 1.50 | 0.00 | 0.00 |
| 3.2.3 Ensured Stakeholders and Customer signed off on requirements and associated priority | 1.50 | 0.00 | 0.00 |
| 3.2.4 Ensured requirements are traceable to business scope and objectives | 1.50 | 0.00 | 0.00 |
| 3.2.5 Identified issues, risks and dependencies | 1.50 | 0.00 | 0.00 |
| 4. Success Criteria and Associated metrics | 2.50 | 0.00 | 0.00 |
| 4.1 Validated agreed to success criteria and associated metrics were defined | 0.63 | 0.00 | 0.00 |
| 4.2 Ensured approval of acceptance / success criteria from customers and stakeholders, including measurement m | 0.63 | 0.00 | 0.00 |
| 4.3 Ensured that acceptance / success criteria is clear an unambiguous | 0.63 | 0.00 | 0.00 |
| 4.4 Identified issues, risks and dependencies | 0.63 | 0.00 | 0.00 |
| Total | 25.00 | 0.00 | 0.00 |

Overall Review Score

Normalized Score by Criteria

FIG. 3C

- Goal: Convey a clear understanding of the business/stakeholder needs, rationale and priorities, and review the system level solution requirements and the IT solution approach - Get customer concurrence on system requirements / architecture
- Review and approve the documented System Requirements and Architecture
  - Ensure that agreed to system requirements and architectures satisfy the business requirements
- Establish Tractability
  - The system requirements must be traceable upwards to the stakeholder requirements and business process requirements and downwards to acceptance criteria and test methodology (test methods and test types)
- Establish the Technical Baseline
  - The system requirements and architecture represent the solution requirements baseline for a project
- Identify Technical Risks
  - Technology and Standards; Requirements and Acceptance Criteria Ambiguity; Technical Skill and Capability Requirements; Technical Approach Impact on Cost and Schedule
- Review mitigation plans
  - Ensure that the implementation approach selected addresses the deployment of the solution being developed, together with impact on the existing platforms and business processes
- Identify Dependencies (External - Technology, Baselines, Interfaces)
- Establish plans
  - Test Approach
  - System Baseline created at SRR, further changes must follow change control process outlined in the Program Management Plan
- Identify Technical Performance Measures (TPMs)

FIG. 3D

- Review documentation and address concerns relative to:
  - Clarity and refinement of business processes, business requirements, stakeholder priorities
  - Clarity and ambiguity pertaining to system (solution) requirements and architecture
    - Ensure ability to test and validate system (solution) requirements and architecture
  - Clarity with regard to traceability between business requirements and system (solution) requirements
    - Ensure that all business requirements are addressed
    - Ensure that the solutions scope is defined in an unambiguous manner, with external interfaces clearly identified
  - The key acceptance criteria and their traceability to key business requirements
  - Dependencies and assumptions
- Key stakeholders and business process owners are present during the SRR and sign off on the solution (system) requirements/architecture and the solution (system) scope
  - Key stakeholders/business process owners sign off on the key acceptance criteria
  - Key stakeholders/business process owners understand implementation approachs considered and the one selected

FIG. 3E

| Entry Criteria | Presentation | Exit Criteria |
|---|---|---|
| Business Requirements and Process Definition:<br>• Business objectives and Scope are defined<br>• As is business process flows are defined<br>• Business req's are defined<br>• Success criteria and associated metrics are defined | Business Requirements and Process Definition:<br>• Present Scope and Objectives<br>• Present "as is" business process flows, gaps and plan to complete the "to be" process flows<br>• Present business requirements<br>– Prioritized<br>– mapped to scope and objectives<br>• Present success criteria and associated metrics<br>• Present measurement methodology | Business Requirements and Process Definition:<br>• Business requirements are traced to the agreed scope and business objectives for project<br>• "As is" manual touch point desk-level procedures defined<br>• "As is" legacy business process scenarios (base functions, variant, exceptions) and architecture (system, applications, interfaces) defined<br>• Gaps in process flows defined and plans to address them ensured<br>• Business requirements (functional and non-functional) defined and prioritized<br>• Acceptance criteria clearly defined and agreed to |
| System Requirements Definition:<br>• Customer scope and objective document is completed and agreed to by project manager<br>• Technical baseline is completed defined<br>• Baseline requirements and change requests are in a requirements management toolkit<br>• Affected legacy application changes are identified in a requirements management toolkit | System Requirements Definition:<br>• Please see the slide on Requirements Categories | System Requirements Definition:<br>• All business process changes and stakeholder requirements trace to a system requirement<br>– Each requirement has unique name or reference number<br>– Only one requirement per statement<br>• System requirements are prioritized and compatible with business processes; Stakeholder conflicts presented and resolved<br>• System requirements are solution independent<br>– Addresses the "what" rather than the "how" at that level<br>• System requirements are complete<br>– Minimum necessary to begin architecture development<br>• System requirements are testable<br>• System requirements are validatable and verifiable<br>• System requirements are understandable<br>– Glossary and data items defined<br>• System requirements are decoupled (minimum dependency on other requirements)<br>• Alternative implementation approaches considered - rationale for selection<br>• Technology trade-offs conducted and presented |

FIG. 3F

| Entry Criteria | Presentation | Exit Criteria |
|---|---|---|
| System Level Architecture:<br>• Static and dynamic system-level architecture to satisfy the customer requirements are defined | System Level Architecture:<br>• Present the system-level architecture | System Level Architecture:<br>• Customer concurs that the defined system-level architecture satisfies the business requirements<br>• Dynamic and static architectures are defined and complete Including data architecture<br>• System level architecture matches system requirements<br>• "To be" system landscape (static or logical view of the architecture) is defined<br>• "To be" business process flows (dynamic or operations view of the architecture) is defined |
| Acceptance Criteria:<br>• Acceptance criteria, test methods, and test types for all business processes and system requirements are defined | Acceptance Criteria:<br>• Complete the Requirements Verification Matrix (RVM) portion of the Requirements Matrix | Acceptance Criteria:<br>• Customer concurs with the Acceptance Criteria, test methods, and test types |
| Requirements Traceability:<br>• Each business requirement traces to one or more system requirements | Requirements Traceability:<br>• Complete the Requirements Traceability Matrix (RTM) portion of the Requirements Matrix | Requirements Traceability:<br>• Customer concurs with the business requirements and their mapping to system requirements |

FIG. 3G

| | Weighting Factor | SRR SCORE | USE THIS COLUMN TO ENTER SCORES |
|---|---|---|---|
| 1. Business Requirements and Process Definition | 2.50 | 0.00 | 0.00 |
| 1.1 Business requirements are traced to the agreed scope and business objectives for project | 0.42 | 0.00 | 0.00 |
| 1.2 "As is" manual touch point desk-level procedures defined | 0.42 | 0.00 | 0.00 |
| 1.3 "As is" legacy business process scenarios (base functions, variant, exceptions) and architecture (system, applications, interfaces) defined | 0.42 | 0.00 | 0.00 |
| 1.4 Gaps in process flows defined and plans to address them ensured | 0.42 | 0.00 | 0.00 |
| 1.5 Business requirements (functional and nonfunctional) defined and prioritized | 0.42 | 0.00 | 0.00 |
| 1.6 Acceptance criteria clearly defined and agreed to | 0.42 | 0.00 | 0.00 |
| 2. System Requirements Definition | 5.00 | 0.00 | 0.00 |
| 2.1 All requirements are unique and have unique identifiers | 0.50 | 0.00 | 0.00 |
| 2.1.1 Each requirement has unique name or reference number | 0.25 | 0.00 | 0.00 |
| 2.1.2 Only one requirement per statement | 0.25 | 0.00 | 0.00 |
| 2.2 System requirements are prioritized. Stakeholder conflicts presented and resolved | 0.50 | 0.00 | 0.00 |
| 2.3 System requirements are solution independent (Address the "what" rather than the "how" at that level) | 0.50 | 0.00 | 0.00 |
| 2.4 System requirements are complete (allow the architecture development to begin) | 0.50 | 0.00 | 0.00 |
| 2.5 System requirements are testable | 0.50 | 0.00 | 0.00 |
| 2.6 System requirements are validatable and verifiable | 0.50 | 0.00 | 0.00 |
| 2.7 System requirements are understandable (Glossary and data items defined) | 0.50 | 0.00 | 0.00 |
| 2.8 System requirements are decoupled (minimum dependency on other requirements) | 0.50 | 0.00 | 0.00 |
| 2.9 Alternative implementation approaches considered - rationale for selection | 0.50 | 0.00 | 0.00 |
| 2.10 Technology trade-offs conducted and presented | 0.50 | 0.00 | 0.00 |
| 3. System Level Architecture | 5.00 | 0.00 | 0.00 |
| 3.1 Customer concurs that the system level architecture satisfies the business requirements | 1.00 | 0.00 | 0.00 |
| 3.2 Dynamic and static architectures are defined and complete (including data architecture) | 1.00 | 0.00 | 0.00 |
| 3.3 System level architecture matches system requirements | 1.00 | 0.00 | 0.00 |
| 3.4 "To be" system landscape (static or logical view of the architecture) is defined | 1.00 | 0.00 | 0.00 |
| 3.5 "To be" business process flows (dynamic or operational view of the architecture) is defined | 1.00 | 0.00 | 0.00 |
| 4. Requirements Traceability | 5.00 | 0.00 | 0.00 |
| 4.1 Customer concurs with the business requirements and their mapping to system requirements | 5.00 | 0.00 | 0.00 |
| 5. Acceptance Criteria | 7.50 | 0.00 | 0.00 |
| 5.1 Customer concurs with the Acceptance Criteria, test methods, and test types | 7.50 | 0.00 | 0.00 |
| Total | 25.00 | 0.00 | 0.00 |

Overall Review Score

Normalized Score by Criteria

FIG. 4C

- Goal: Present the high level design and the component level baseline, to include the allocated requirements and the architecture baseline
- Review and approve the component level architecture baseline
  - Verify completeness by tracing key business process changes and use case scenarios
- Establish Traceability
  - The system requirements must be traceable upwards to business process changes and stakeholder requirements and downwards to elements of the architecture
- Establish the Technical Baseline
  - The component-level architecture and the allocated system requirements (to components) represent the solution architecture baseline for a project
- Identify Technical Risks
  - Technology and Standards; Requirements and Acceptance Criteria Ambiguity; Technical Skill and Capability Requirements; Technical Approach Impact on Cost and Schedule
- Review mitigation plans
  - Ensure that the implementation approach selected addresses the deployment of the solution being developed, together with impact on the existing platforms and business processes
- Identify Dependencies (External - Technology, Baselines, Interfaces)
- Identify Hardware and Software Performance Monitoring Tools in support of the e2e Monitoring, Measurement, and Management Requirements (e2e M3)
- Review Technical Performance Measures (TPMs)
- Review Test Architecture (software and hardware)

FIG. 4D

- Review documentation and address concerns relative to:
  - Completeness of the component-level architecture
  - Clarity and ambiguity pertaining to system internal and external interfaces
    - Ensure ability to test and validate the interfaces
  - Clarity with regard to the Test Architecture
  - Traceability between prioritized system requirements and the component requirements
    - Ensure that all system requirements are addressed and allocated
  - Dependencies and assumptions
  - Any requirements changes
- Key stakeholders and business process owners are present during the PDR and sign off on the component requirements/architecture and the solution (system) scope
  - Key stakeholders/business process owners understand and sign off on the architecture/requirements
  - Key stakeholders include the software and hardware design and development teams

FIG. 4E

| Entry Criteria | Presentation | Exit Criteria |
|---|---|---|
| Static Architecture Definition:<br>• All system requirements allocated to elements of the logical architecture<br>• All system requirements allocated to elements of the physical architecture<br>• All external and internal logical interfaces defined<br>• The system bill of material presented (List of system physical architecture elements, both hardware and software) | Static Architecture Definition:<br>• System logical architecture - logical blocks, interfaces, requirements allocation<br>• System physical architecture showing all the elements/components, physical interfaces, requirements allocation<br>• Present efforts and results with regard to: Enhancing system modularity, reducing system complexity and reduction in number and types of interfaces, adherence to open standards, ease of technology refreshment, commonality<br>• Present considerations with regard to footprint, packaging, power, volume<br>• Technical risks, dependencies, & mitigation plans | Static Architecture Definition:<br>• Completeness in the system logical and physical architecture presented and agreed to<br>• Completeness with the allocation of system requirements to architecture components agreed to<br>• Completeness with regard to the external and internal logical and physical interfaces agreed to<br>• Business monitoring tools (volume and volume projections) identified and agreed to |
| Dynamic Architecture Definition:<br>• The application / component level use case scenarios and interaction diagrams are defined | Dynamic Architecture Definition:<br>• Application / component level use case diagrams<br>  – Present tracing of selected and key business processes<br>  – Specify how users in specific roles will interact with the applications in the system<br>• Application / component level interaction diagrams<br>  – Graphical representation of what depicts the internal behavior of the applications. It shows how resources collaborate by sending messages and returning responses to each other<br>• Data architecture / model (data definition, data flow diagrams, and data migration)<br>• Technical risks, dependencies, & mitigation plans | Dynamic Architecture Definition:<br>• Completeness in the use case diagrams - showing tracing of scenarios through the system at the application / component level<br>• Completeness of the interaction diagrams - showing application / component level interactions or interfaces<br>• Completeness of data architecture / model (data flow, data definition, and data migration models) |

FIG. 4F

| Entry Criteria | Presentation | Exit Criteria |
|---|---|---|
| Architecture Element Definition / Component Requirements:<br>• Requirements decomposed, allocated, and traced to each architectural element/component (hardware and software)<br>• Hardware and software have been sized<br>• Internal interface and packaging standards identified and used<br>• Message and message formats identified | Architecture Element Definition / Component Requirements:<br>• Prioritized requirements (functional and non-functional) allocated and traced to architecture elements, captured and presented in a requirements toolkit<br>• Key architectural components and interfaces presented - sizing, key allocated requirements, standards and protocols, message and message formats<br>• Present the updated TPMs and Acceptance Criteria for the system and system elements<br>• Any changes to the system requirements baseline since SRR | Architecture Element Definition / Component Requirements:<br>• Development team (hardware and software) and customer concurrence with the completeness of the component definitions<br>• Verification of system requirements - through the consolidation of architectural element requirements |
| Test Architecture Definition:<br>• System requirements and acceptance criteria allocated to the test architecture | Test Architecture Definition:<br>• Allocation of acceptance criteria and system requirements to test architecture<br>• Testing approaches at various levels in the system and for the various to-be business processes and requirements<br>• Test architecture diagram<br>• Test data requirements<br>• Dependencies, risks, and mitigation approaches<br>• Performance and volume monitoring requirements and verification approaches | Test Architecture Definition:<br>• Test architecture, approach and the test data will sufficiently facilitate the verification of the system acceptance criteria and the system requirements, including the to-be business processes |

FIG. 4G

| | Weighting Factor | PDR SCORE | USE THIS COLUMN TO ENTER SCORES |
|---|---|---|---|
| 1. Static Architecture Definition | 6.75 | 0.00 | 0.00 |
| 1.1 Completeness in the system logical and physical architecture and presented and agreed to | 1.69 | 0.00 | 0.00 |
| 1.2 Completeness with the allocation of system requirements to architecture components agreed to | 1.69 | 0.00 | 0.00 |
| 1.3 Completeness with regard to the external and internal logical and physical interfaces agreed to | 1.69 | 0.00 | 0.00 |
| 1.4 Business monitoring tools (volume and volume projections) identified and agreed to | 1.69 | 0.00 | 0.00 |
| 2. Dynamic Architecture Definition | 6.75 | 0.00 | 0.00 |
| 2.1 Completeness in the use case diagrams - showing tracing of scenarios through the system at the application level | 2.25 | | |
| 2.2 Completeness of the interaction diagrams - showing application level interactions / interfaces | 2.25 | 0.00 | 0.00 |
| 2.3 Completeness of data architecture / model (data flow, data definition, and data migration models) | 2.25 | 0.00 | 0.00 |
| 3. Architecture Element Definition / Component Requirements | 8.15 | 0.00 | 0.00 |
| 3.1 Development team (hardware and software) and customer concurrence with the completeness of the component definitions | 4.08 | 0.00 | 0.00 |
| 3.2 Verification of system requirements - through the consolidation of architectural element requirements | 4.08 | 0.00 | 0.00 |
| 4. Test Architecture Definition | 3.35 | 0.00 | 0.00 |
| 4.1 Test architecture, approach, and the test data will sufficiently facilitate the verification of the system acceptance criteria and the system requirements, including the to-be business processes | 3.35 | 0.00 | 0.00 |
| Total | 25.00 | 0.00 | 0.00 |

Overall Review Score

FIG. 5C

- Goal: Present and review component designs and component and E2E test plans, to include production infrastructure capacities - Focus on documentation relating to delivered solution
- Review and approve component designs
- Review and approve component detailed test plans
- Establish Traceability - Between component designs and end-to-end functionality and the system level acceptance criteria
  - Ensure completeness
    - Completeness - customer and systems engineering perspective: All customer requirements / business process changes addressed (traceability) of all functional and nonfunctional requirements)
    - Completeness - development perspective: designs complete and ready for implementation
- Establish the Design Baseline
  - The component designs, interfaces, and test plans represent the design baseline for a project
- Identify technical risks
  - Technology and Standards: Requirements and Acceptance Criteria Ambiguity; Technical Skill and Capability Requirements; Technical Approach Impact on Cost and Schedule
- Review mitigation plans to offset risk
  - Ensure that the implementation approach selected addresses the deployment of the solution being developed, together with impact on the existing platforms and business processes
- Identify dependencies (External - Technology, Baselines, Interfaces)
- Review Technical Performance Measures (TPMs)
- Verify production infrastructure capacity supports system requirements

FIG. 5D

- Review documentation and address concerns relative to:
  - Completion, deployment, and delivery of the solution and functionality required by the customer
  - Clarity→Clarify any ambiguity pertaining to the detailed component requirements and design, and component interfaces
    - Ensure ability to test and validate the end-to-end functionality and solution
  - Clarity with regard to the Test Plans and Approach
  - Traceability between component requirements and the test plans
  - Dependencies and assumptions
  - Any requirement or business process changes
- Key members of the software development, test, production, and SDC → hardware teams are present during the CDR and agree with → approve the design baseline

FIG. 5E

| Entry Criteria | Presentation | Exit Criteria |
|---|---|---|
| System and Components Requirement Review<br>• Reapply all applicable SRR and PDR entry criteria to the changes in the System and Component baselines. See FIGs 3E, 3F, 4E, and 4F for specific entry criteria. | System and Component Requirement Changes:<br>• Review any changes to the requirements baseline since PDR - These changes mush have been approved by the Change Control Board<br>• Review any business process changes since PDR - These changes must have been approved by the customer | System and Component Requirement Review:<br>• Completeness in the system and component requirements<br>• All changes (requirements and business processes) traceable to component design |
| Physical Component Design and Test Review:<br>• Component designs complete and documented<br>• Component interfaces defined, designed and documented<br>• Component acceptance criteria defined and met<br>• Data design completed<br>• Data migration approach defined and documented<br>• Component test approach and plans completed and documented | Physical Component Design and Test Definition:<br>• Component designs showing all the interfaces<br>• Present efforts and results with regard to: Adherence to open standards, east of technology refreshment, commonality<br>• Present considerations with regard to footprint, packaging, power, volume<br>• Present the requirements allocation - selected and key requirements<br>• Present the updated TPMs and Acceptance Criteria for the components<br>• Present the test plans and their completeness vis-a-vis acceptance criteria and end-to-end functionality<br>• Technical risks, dependencies, & mitigation plans | Physical Component Design and Test Definition:<br>• Completeness in the component and data designs and interfaces presented and agreed to<br>• Completeness with the test plans and traceability to acceptance criteria and end-to-end functionality agreed to |

FIG. 5F

| Entry Criteria | Presentation | Exit Criteria |
|---|---|---|
| System Delivery Center (SDC):<br>• Capacity plans and projections completed and documented<br>• Availability and disaster recovery plans and projections completed and documented | SDC Presentation:<br>• Production infrastructure architecture<br>• Production capacity projections and resources<br>• e2e System Monitoring, Measurement, and Management process (M3)<br>• Risks and risk management plan<br>• Critical dependencies | SDC:<br>• Agreement with regard to: a) Production infrastructure, its capacity and projections; b) Availability and disaster recovery approach and projections |
| System Testing:<br>• Preliminary Test Plan defined for each system requirement by Test Type: a) System Integration Test and Pre-Production Test; b) Performance and Stress Test; c) User Acceptance Test<br>• Test plans show traceability to acceptance criteria | System Testing:<br>• Test scope and requirements: a) traceability to system and component requirements, b) acceptance criteria<br>• Test environment: a) Infrastructure; b) applications<br>• Data plan and migration<br>• Test ground rules: a) Test periods; b) test incident report (TIR) turnaround requirements; c) SDC support; d) Application support | System Testing:<br>• Test plans traceable to system/component requirements and acceptance criteria<br>• Facilitate the tesing of end-to-end functionality and solution delivery |
| Data Load (Test):<br>• Test data defined for each test type: a) System Integration Test and Pre-Production Test; b) Performance and Stress Test; c) User Acceptance Test | Data Load (Test):<br>• Review test data traceability to system/component requirements<br>• Data freeze and completion criteria<br>• Critical dependencies; Risks and risk management plan | Data Load (Test):<br>• Test data will support the associated test and facilitate verification of system/component requirement and acceptance criteria |
| Data Load (Production):<br>• Production data changes for each system/component requirement defined<br>• Process to enter production data is defined (initial data load, as well as day-to-day) | Data Load (Production):<br>• Review production data changes<br>• Present process to enter, migrate, and verify production data<br>• Critical dependencies; Risks and risk management plan | Data Load (Production):<br>• Process and production data supports the system and component requirements |

FIG. 5G

| | Weighting Factor | CDR SCORE | USE THIS COLUMN TO ENTER SCORES | |
|---|---|---|---|---|
| 1. System and Components Requirement Review (Changes from SRR/PDR only) | 1.88 | 0.00 | 0.00 | 0.00 |
| 1.1 Completeness in the system and component requirements | 0.94 | 0.00 | 0.00 | 0.00 |
| 1.2 All changes (requirements and business processes) traceable to component designs | 0.94 | 0.00 | 0.00 | 0.00 |
| 2. Component Design and Test | 10.63 | 0.00 | 0.00 | 0.00 |
| 2.1 Completeness in the component and data designs and interfaces presented and agreed to by by the customer development team | 5.31 | 0.00 | 0.00 | 0.00 |
| 2.2 Completeness with the test plans and traceability to acceptance criteria and end-to-end functionality agreed to by the testing team | 5.31 | 0.00 | 0.00 | 0.00 |
| 3. Service Delivery Center (SDC)/Operations and Delivery Organization | 2.50 | 0.00 | 0.00 | 0.00 |
| 3.1 Agreement with regard to production infrastructure, its capacity and projections | 1.25 | 0.00 | 0.00 | 0.00 |
| 3.2 Agreement with regard to availability and disaster recovery approach and projections | 1.25 | 0.00 | 0.00 | 0.00 |
| 4. System Testing | 5.00 | 0.00 | 0.00 | 0.00 |
| 4.1 Test plans traceable to system/component requirements and acceptance criteria | 2.50 | 0.00 | 0.00 | 0.00 |
| 4.2 Facilitate the testing of end-to-end functionality and solution delivery | 2.50 | 0.00 | 0.00 | 0.00 |
| 5. Data Load (Test) | 1.25 | 0.00 | 0.00 | 0.00 |
| 5.1 Test data will support the associated test and facilitate verification of system/component requirement and acceptance criteria | 1.25 | 0.00 | 0.00 | 0.00 |
| 6. Data Load (Production) | 3.75 | 0.00 | 0.00 | 0.00 |
| 6.1 Process and production data supports the system/component requirements | 3.75 | 0.00 | 0.00 | 0.00 |
| Total | 25.00 | 0.00 | 0.00 | 0.00 |

Overall Review Score

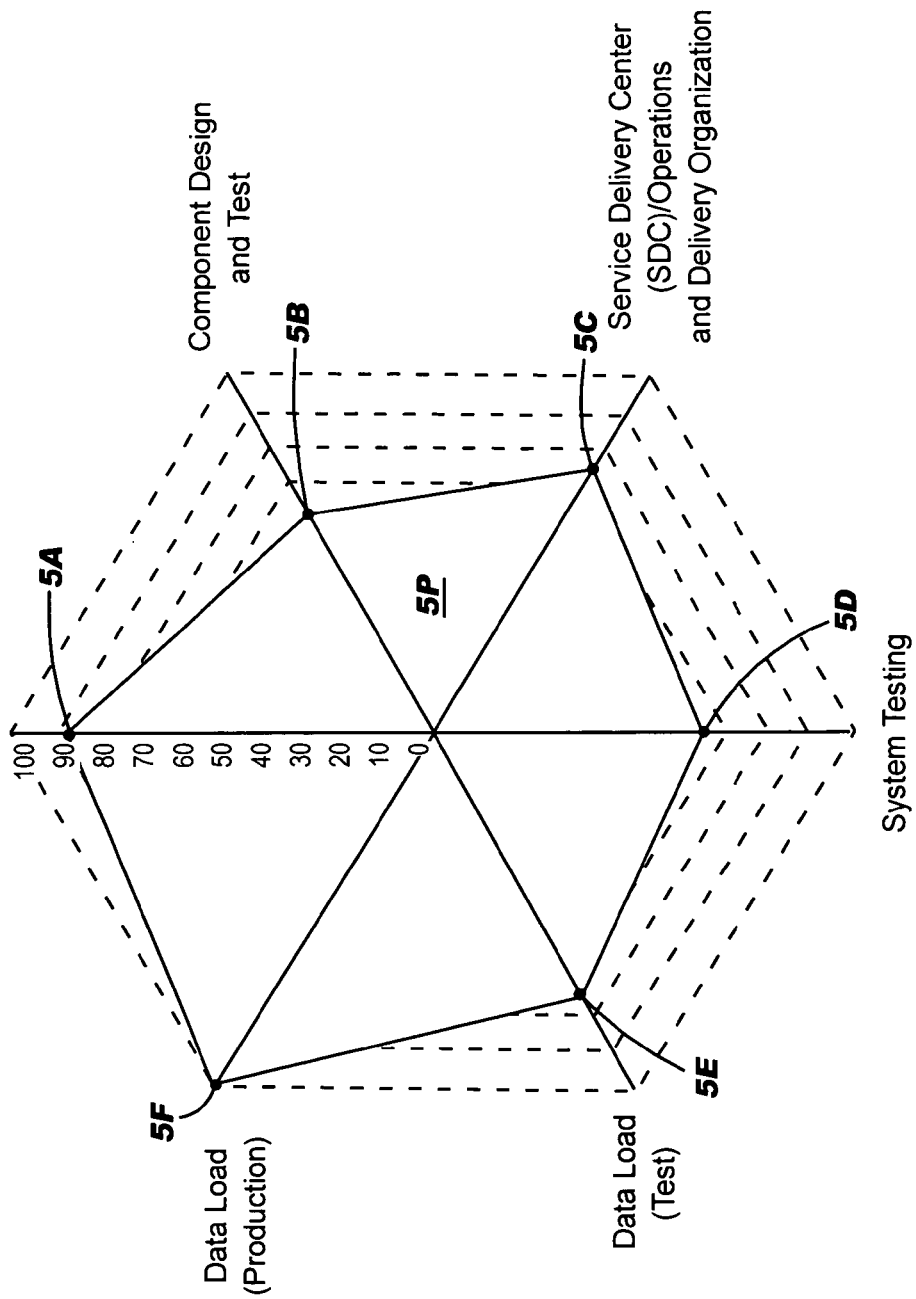

FIG. 6C

- Create a Test Baseline
  - Review test strategy
    - Ground rules agreed to by supporting organizations (customer, software development, SDC→hardware, etc.)
    - Documented risks and mitigation plans
  - Verify which requirements have been tested & test methods used (Requirements Verification Matrix)
  - Verify test types & methods to be run in this phase (RVM)
  - Verify project Quality Management Plan estimated and actual defects
- Verify that test entrance criteria has been met for each application & document exceptions
  - Previous test results
  - Test related documentation as defined in the Test Strategy/Plan
  - Entrance criteria exceptions
- Verify test environment & data readiness
- Verify Test Team readiness
  - Test plan
  - Resources & skills
  - Test data
  - Test tools
  - Test cases traced to requirements (as defined in the test strategy)
  - Problem and change management
  - Test exit criteria
- Obtain Customer & Solution Project Manager approval for text execution readiness

FIG. 6D

| Entry Criteria | Presentation | Exit Criteria |
|---|---|---|
| 1. Test Strategy:<br>• Test schedule is documented<br>• Problem and defect turnaround times by severity are documented | Test Strategy:<br>• Test schedule<br>• Problem, defects, turnaround times by severity<br>• Documented Technical risks, dependencies, & mitigation plans | Test Strategy:<br>• Test schedule is complete and achievable<br>• Participating organizations agree to meet problem and defect turnaround times<br>• Mitigation plans are complete |
| 2. Test Requirements Verification Matrix:<br>• Functions that should be tested are mapped to functions that are being tested<br>• Test types and methods to be performed for each requirement are documented<br>• Technical risks, dependencies, and mitigation plans are documented | Test Requirements Verification Matrix:<br>• Mapping of functions that should be tested to functions that are being tested<br>• Test types and methods to be performed for each requirement<br>• Documented Technical risks, dependencies & mitigation plans | Test Requirements Verification Matrix:<br>• Functions that should be tested completely map to functions that are being tested<br>• Test types and methods to be performed for each requirement are sufficient to verify the requirement<br>• Mitigation plans are complete |

FIG. 6E

| Entry Criteria | Presentation | Exit Criteria |
|---|---|---|
| 3. Application Readiness verification:<br>• Applications delivered to system test are documented<br>• Application Problems have been resolved<br>• Application testing statistics are documented<br>• Previous and new features / functionality are documented<br>• Load information is documented<br>• Source doe controls are documented<br>• Caveats are documented | Application Readiness verification:<br>• List of projects delivered in this load<br>• MRs fixed and delivered with this build<br>• Number of planned tests<br>• Number of actually tests executed<br>• Number of passed test cases<br>• Number of failed test cases<br>• Previous features / functionality<br>• New features / ER / Software improvements<br>• Initial load / Database load / Multiple instances<br>• Source code control, builds and tape packaging<br>• Caveats / Known bugs / limitations<br>• Documented Technical risks, dependencies, & mitigation plans | Application Readiness verification:<br>• Delivered applications are sufficient to meet system requirements<br>• Application Problem have been resolved sufficiently to allow completion system test<br>• Application testing statistics are accurate and complete<br>• Previous and new features / functionality are documented completely<br>• Load information is documented completely<br>• Source code controls are documented completely<br>• Caveats are documented completely<br>• Mitigation plans are complete |
| 4. Test Environment Readiness:<br>• Installation information and special customization in system test are documented<br>• Required Software is documented<br>• Patches delivered and not delivered are documented<br>• Machine customization is documented<br>• Test tools are documented<br>• Test Connectivity grid is documented | Test Environment Readiness:<br>• Required System-level software<br>• Required application-level software<br>• Previous patches delivered in release<br>• Previous patches not delivered in release<br>• Testing machine customization<br>• List of test tools installed, version and release<br>• Post diagram of connectivity grid<br>• Documented Technical risks, dependencies, & mitigation plans | Test Environment Readiness:<br>• Installation information and special customization are installed<br>• Required Software is available<br>• Patches delivered are available; Patches not delivered do not inhibit test<br>• Machine customization is complete<br>• Test tools are installed<br>• Test Connectivity grid is accurate and complete<br>• Mitigation plans are complete |
| 5. Test Team Readiness:<br>• Test plans are traced to system requirements<br>• Test data are traced to test plans<br>• Test team staffing is documented | Test Team Readiness:<br>• Test plans, test procedures and test data<br>• Test team members, skills, and work schedule<br>• Documented Technical risks, dependencies, & mitigation plans | Test Team Readiness:<br>• Test plans are sufficient to verify all system requirements<br>• Test data is sufficient to execute all test plans<br>• Test team staffed as scheduled<br>• Mitigation plans are complete |

FIG. 6F

| TRR-<Enter Project ID and Name here> | Weighting Factor | TRR SCORE | USE THIS COLUMN TO ENTER SCORES |
|---|---|---|---|
| Enter here REVIEW DATE (mm/dd/yyyy) | | | |
| 1. Test Strategy | | 0.00 | 0.00 |
| 1.1 Test Schedule is documented and complete and achievable | 1.25 | 0.00 | 0.00 |
| 1.2 Problem and defect turnaround times by severity are agreed | 0.42 | 0.00 | 0.00 |
| 1.3 Technical risks, dependencies, and mitigation plans are complete | 0.42 | 0.00 | 0.00 |
| 2. Test Requirements Verification Matrix | 1.25 | 0.00 | 0.00 |
| 2.1 Functions that should be tested completely map to functions that are being tested | 0.42 | 0.00 | 0.00 |
| 2.2 Test types and methods to be performed for each requirement are sufficient to verify the requirement | 0.42 | 0.00 | 0.00 |
| 2.3 Technical risks, dependencies, & mitigation plans are complete | 0.42 | 0.00 | 0.00 |
| 3. Application Readiness Verification | 7.50 | 0.00 | 0.00 |
| 3.1 Applications delivered in this load are complete | 0.63 | 0.00 | 0.00 |
| 3.2 Defects fixed and delivered with this build are documented | 0.63 | 0.00 | 0.00 |
| 3.3 Planned tests cases for System Level Test are documented | 0.63 | 0.00 | 0.00 |
| 3.4 Executed test cases are documented | 0.63 | 0.00 | 0.00 |
| 3.5 Passed test cases are documented | 0.63 | 0.00 | 0.00 |
| 3.6 Failed test cases are documented | 0.63 | 0.00 | 0.00 |
| 3.7 Previous features and functionality are documented | 0.63 | 0.00 | 0.00 |
| 3.8 New features and Software improvements are documented | 0.63 | 0.00 | 0.00 |
| 3.9 Initial load / Database load / Multiple instances are documented | 0.63 | 0.00 | 0.00 |
| 3.10 Source code control, builds and tape packaging are documented | 0.63 | 0.00 | 0.00 |
| 3.11 Caveates / Known bugs / limitations are documented | 0.63 | 0.00 | 0.00 |
| 3.12 Technical risks, dependencies, & mitigation plans are documented | 0.63 | 0.00 | 0.00 |
| 4. Test Environment Readiness | 7.50 | 0.00 | 0.00 |
| 4.1 Required System-level software is available | 0.94 | 0.00 | 0.00 |
| 4.2 Required application-level software is available | 0.94 | 0.00 | 0.00 |
| 4.3 Previous patches delivered in relase are available | 0.94 | 0.00 | 0.00 |
| 4.4 Previous patches not delivered in release are available | 0.94 | 0.00 | 0.00 |
| 4.5 Testing machine customization is documented and complete | 0.94 | 0.00 | 0.00 |
| 4.6 Test tools installed, including version and release, are documented | 0.94 | 0.00 | 0.00 |
| 4.7 Diagram of connectivity grid is complete | 0.94 | 0.00 | 0.00 |
| 4.8 Technical risks, dependencies, & mitigation plans are documented | 0.94 | 0.00 | 0.00 |
| 5.0 Test Team Readiness | 7.50 | 0.00 | 0.00 |
| 5.1 Test plans and test data are complete | 2.50 | 0.00 | 0.00 |
| 5.2 Test team members and skills are available as scheduled — Overall Review Score | 2.50 | 0.00 | 0.00 |
| 5.3 Technical risks, dependencies, & mitigation plans are documented | 2.50 | 0.00 | 0.00 |
| Total | 25.00 | 0.00 | |

TRR - Normalized Score by Criteria

FIG. 7C

The objectives of the Production Readiness Review (PRR) are to:
Verify the release is ready to be installed into production by reviewing the following information:
- Requirements / Architecture
  - Requirements and architecture being delivered to meet operational needs
- Test
  - Functional Test and Non-Functional (Performance) test results
- Move to Production
  - Planning for pre-installation activities
- Production Readiness
  - Planning for installation and operation activities Decide whether the release is ready for production based on completeness of the material and number of open defects resulting from the review

FIG. 7D

| Entry Criteria | Presentation | Exit Criteria |
|---|---|---|
| 1. Requirements/Architecture<br>• Functional Requirements documented<br>• Non Functional Requirements documented<br>• Change Requests Incorporated and open are documented<br>• Applications, Interfaces, Loads are documented | Requirements/Architecture<br>• Functional Requirements<br>• Non Functional Requirements<br>• Change Requests<br>• Applications, Interfaces, Loads | Requirements/Architecture<br>• Functional Requirements defined, enumerated, traced<br>• Non Functional Requirements defined, enumerated, traced<br>• Change Requests Incorporated or known to be incorporated<br>• Applications, Interfaces, Loads defined |
| 2. Test<br>• Functional Testing Results documented<br>• Non-Functional Testing Results documented<br>• Code Lock status documented<br>• Test Gaps documented | Test<br>• Functional Testing Results<br>• Non-Functional Testing Results<br>• Code Lock status<br>• Test Gaps | Test<br>• Functional Testing Complete or projected<br>• Non-Functional Testing Complete or projected<br>• Code Lock in place or projected<br>• Test Gaps identified |
| 3. Move To Production (MTP)<br>• Major Move to Production Milestones documented<br>• Applications and contacts documented<br>• Time line documented<br>• Deliverables documented<br>• Governance Needs documented | Move To Production (MTP)<br>Major Move to Production Milestones<br>Applications and contacts documented<br>• Time line<br>• Deliverables<br>• Governance Needs | Move To Production (MTP)<br>• Major Move to Production Milestones defined<br>• Applications and contacts defined<br>• Time line defined<br>• Deliverables defined<br>• Governance Needs defined |

FIG. 7E

| Entry Criteria | Presentation | Exit Criteria |
|---|---|---|
| 4. Production Readiness<br>• Q Gates or checklist documented<br>• Install Plans documented<br>• Install Timeliness documented<br>• Install Configuration Control documented<br>• Dependencies, Issues and Risks documented<br>• Test before go live plans documented | Production Readiness<br>• Q Gates or checklist requirements and status<br>• Install Plans<br>• Install Timeliness<br>• Install Configuration Control<br>• Dependencies, Issues and Risks<br>• Test before go live plans | Production Readiness<br>• Q Gates or checklist defined and status provided<br>• Install Plans defined<br>• Install Timeliness defined<br>• Install Configuration Control defined<br>• Dependencies, Issues and Risks defined<br>• Test before go live |
| 5. Project Risks to Production<br>• Risks and mitigation documented | Project Risks to Production<br>• Risks and mitigation plans | Project Risks to Production<br>• Risks identified, and mitigated or transferred (Exclusions) |

FIG. 7F

| | Weighting Factor | BRR SCORE | USE THIS COLUMN TO ENTER SCORES |
|---|---|---|---|
| 1. Requirements / Architecture | 1.25 | 0.00 | 0.00 |
| 1.1 Reqts / Arch - Functional Requirements defined, enumerated, traced | 0.42 | 0.00 | 0.00 |
| 1.2 Reqts / Arch - Non Functional Requirements defined, enumerated, traced | 0.42 | 0.00 | 0.00 |
| 1.3 Reqts / Arch - Change Requests Incorporated or known to be incorporated | | | |
| 1.4 Reqts / Arch - Applications, Interfaces, Loads defined | 0.42 | 0.00 | 0.00 |
| 2. Test | 1.25 | 0.00 | 0.00 |
| 2.1 Test - Functional Testing Complete or projected | 0.42 | 0.00 | 0.00 |
| 2.2 Test - Non-Functional Testing Complete or projected | 0.42 | 0.00 | 0.00 |
| 2.3 Test - Code Lock in place or projected | | | |
| 2.4 Test - Gaps identified | | | |
| 3. Move To Production (MTP) | 7.50 | 0.00 | 0.00 |
| 3.1 MTP - Major Move to Production Milestones defined | 0.63 | 0.00 | 0.00 |
| 3.2 MTP - MTP Applications and contacts defined | 0.63 | 0.00 | 0.00 |
| 3.3 MTP - Time line defined | 0.63 | 0.00 | 0.00 |
| 3.4 MTP - MTP Deliverables defined | 0.63 | 0.00 | 0.00 |
| 3.5 MTP - eGovernance Needs met | 0.63 | 0.00 | 0.00 |
| 4. Production Readiness | 7.50 | 0.00 | 0.00 |
| 4.1 Prod Readiness - Q Gates or checklist defined and status provided | 0.94 | 0.00 | 0.00 |
| 4.2 Prod Readiness - Install Plans defined | 0.94 | 0.00 | 0.00 |
| 4.3 Prod Readiness - Install Timeliness defined | 0.94 | 0.00 | 0.00 |
| 4.4 Prod Readiness - Install Configuration Control Defined | 0.94 | 0.00 | 0.00 |
| 4.5 Prod Readiness - Dependencies, Issues and Risks defined | 0.94 | 0.00 | 0.00 |
| 4.6 Prod Readiness - Test before go live | 0.94 | 0.00 | 0.00 |
| 5. Project Risks to Production | 7.50 | 0.00 | 0.00 |
| 5.1 Risks identified, and mitigated or transferred (Exclusions) | 2.50 | 0.00 | 0.00 |
| Total | 25.00 | 0.00 | |

Overall Review Score

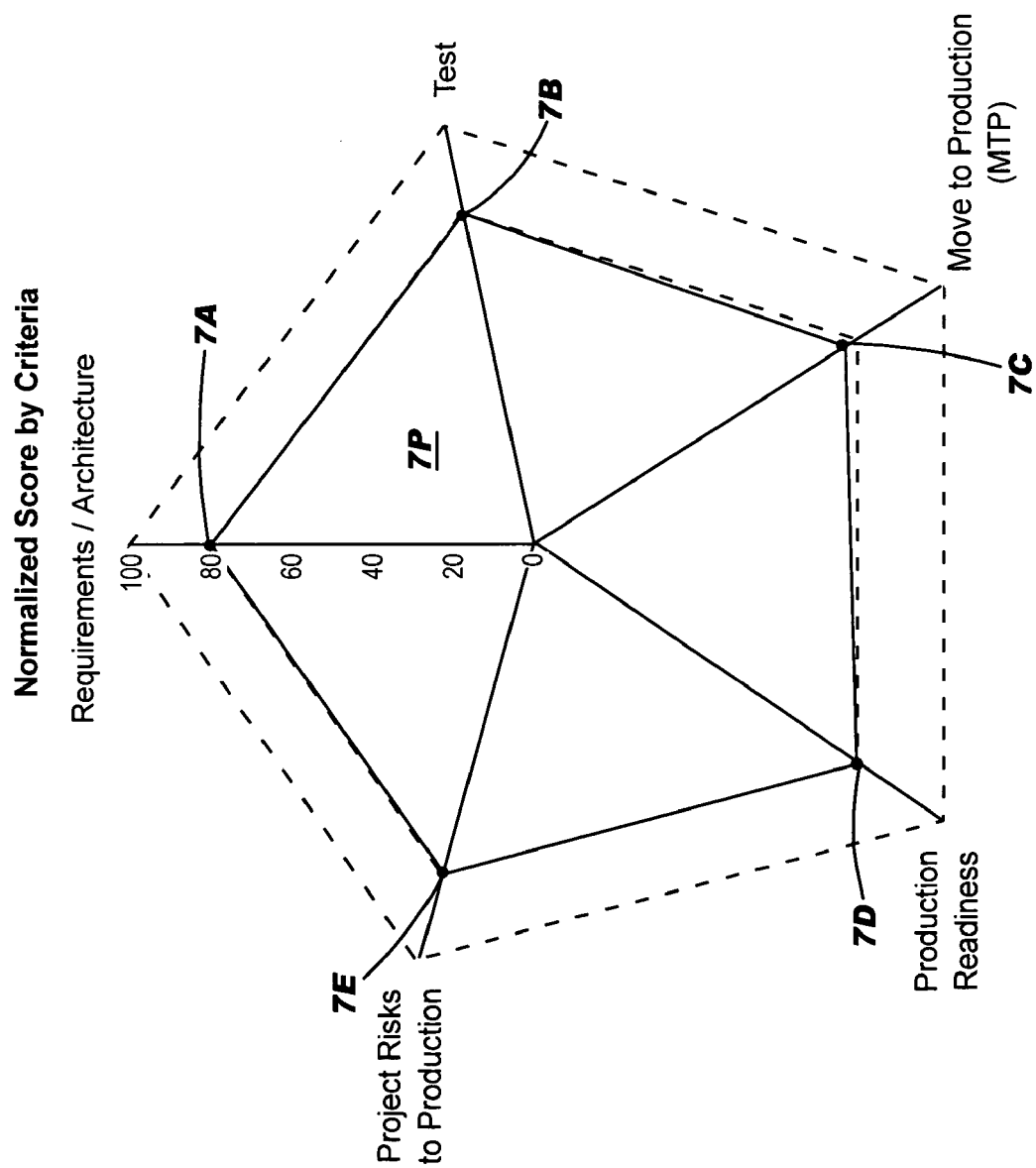

FIG. 8A

| Customer Business Requirements | | | | | Affected Elements | | Customer Acceptance Criteria |
|---|---|---|---|---|---|---|---|
| | System Requirements | | | Requirement Status | Design Documents | Build Components | |
| | | Component Requirements | | | | | |
| | | | Requirements | | | | |
| R1 | | | Customer business requirement with multiple system requirements | | | | |
| R1 | S1.1 | | System requirement with multiple component requirements | | | | |
| R1 | S1.1 | C1.1.1 | Component requirement | | | | |
| R1 | S1.1 | C.1.1.2 | Component requirement | | | | |
| R1 | S1.2 | | System requirement with multiple component requirements | | | | |
| R1 | S1.2 | C1.2.1 | Component requirement | | | | |
| R1 | S1.2 | C1.2.2 | Component requirement | | | | |
| R1 | S1.2 | C1.2.3 | Component requirement | | | | |
| R2 | | | Customer business requirement with multiple system requirements | | | | |
| R2 | S2.1 | | System requirement with one component requirement | | | | |
| R2 | S2.1 | C2.1.1 | Component requirement | | | | |
| R2 | S2.2 | | System requirement with one component requirement | | | | |
| R2 | S2.2 | C2.2.1 | Component requirement | | | | |
| R3 | | | Customer business requirement with one system requirement | | | | |
| R3 | S3.1 | | System requirement with no component requirements | | | | |
| R4 | | | Customer business requirement with one system requirement | | | | |
| R4 | S4.1 | | System requirement with no component requirements | | | | |

FIG. 8C

| Customer Business Requirements | | | | | 810 | | 820C | |
|---|---|---|---|---|---|---|---|---|
| | System Requirements | | | | | | Integration Test | |
| | | Component Requirements | | | | Test Method | Test Case | Test Result |
| | | | Requirements | | | | | |
| R1 | | | Customer business requirement with multiple system requirements | | | | | |
| R1 | S1.1 | | System requirement with multiple component requirements | | | | | |
| R1 | S1.1 | C1.1.1 | Component requirement | | | | | |
| R1 | S1.1 | C.1.1.2 | Component requirement | | | | | |
| R1 | S1.2 | | System requirement with multiple component requirements | | | | | |
| R1 | S1.2 | C1.2.1 | Component requirement | | | | | |
| R1 | S1.2 | C1.2.2 | Component requirement | | | | | |
| R1 | S1.2 | C1.2.3 | Component requirement | | | | | |
| R2 | | | Customer business requirement with multiple system requirements | | | | | |
| R2 | S2.1 | | System requirement with one component requirement | | | | | |
| R2 | S2.1 | C2.1.1 | Component requirement | | | | | |
| R2 | S2.2 | | System requirement with one component requirement | | | | | |
| R2 | S2.2 | C2.2.1 | Component requirement | | | | | |
| R3 | | | Customer business requirement with one system requirement | | | | | |
| R3 | S3.1 | | System requirement with no component requirements | | | | | |
| R4 | | | Customer business requirement with one system requirement | | | | | |
| R4 | S4.1 | | System requirement with no component requirements | | | | | |

800C

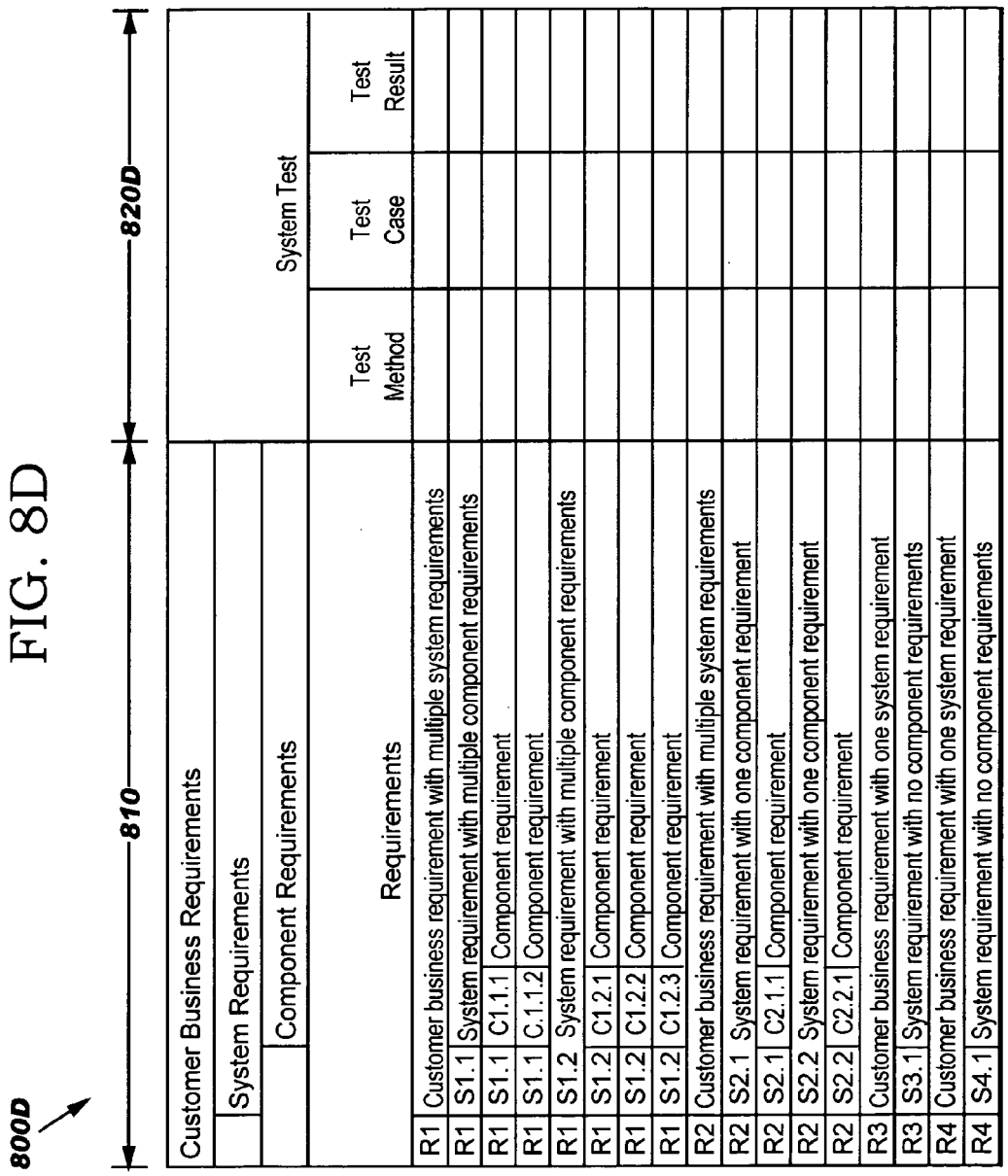

FIG. 8E

| Customer Business Requirements | | | | Systems Integration Test | | |
|---|---|---|---|---|---|---|
| System Requirements | | | | | | |
| | Component Requirements | | | | | |
| | | | Requirements | Test Method | Test Case | Test Result |
| R1 | | | Customer business requirement with multiple system requirements | | | |
| R1 | S1.1 | | System requirement with multiple component requirements | | | |
| R1 | S1.1 | C1.1.1 | Component requirement | | | |
| R1 | S1.1 | C.1.1.2 | Component requirement | | | |
| R1 | S1.2 | | System requirement with multiple component requirements | | | |
| R1 | S1.2 | C1.2.1 | Component requirement | | | |
| R1 | S1.2 | C1.2.2 | Component requirement | | | |
| R1 | S1.2 | C1.2.3 | Component requirement | | | |
| R2 | | | Customer business requirement with multiple system requirements | | | |
| R2 | S2.1 | | System requirement with one component requirement | | | |
| R2 | S2.1 | C2.1.1 | Component requirement | | | |
| R2 | S2.2 | | System requirement with one component requirement | | | |
| R2 | S2.2 | C2.2.1 | Component requirement | | | |
| R3 | | | Customer business requirement with one system requirement | | | |
| R3 | S3.1 | | System requirement with no component requirements | | | |
| R4 | | | Customer business requirement with one system requirement | | | |
| R4 | S4.1 | | System requirement with no component requirements | | | |

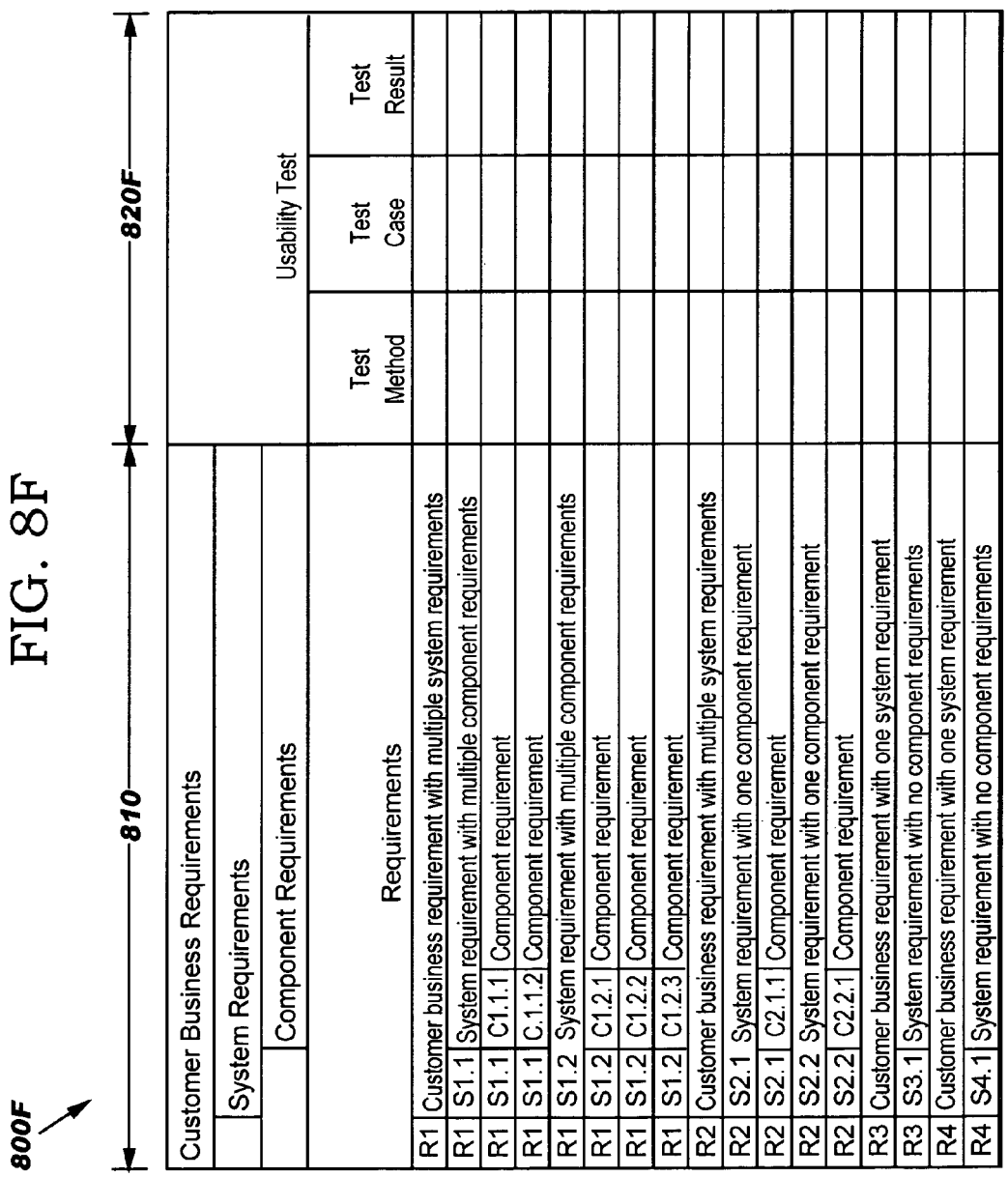

FIG. 8G

| Customer Business Requirements | | | | Acceptance Test | | |
|---|---|---|---|---|---|---|
| System Requirements | | | | Test Method | Test Case | Test Result |
| | Component Requirements | | | | | |
| | | Requirements | | | | |
| R1 | | | Customer business requirement with multiple system requirements | | | |
| R1 | S1.1 | | System requirement with multiple component requirements | | | |
| R1 | S1.1 | C1.1.1 | Component requirement | | | |
| R1 | S1.1 | C.1.1.2 | Component requirement | | | |
| R1 | S1.2 | | System requirement with multiple component requirements | | | |
| R1 | S1.2 | C1.2.1 | Component requirement | | | |
| R1 | S1.2 | C1.2.2 | Component requirement | | | |
| R1 | S1.2 | C1.2.3 | Component requirement | | | |
| R2 | | | Customer business requirement with multiple system requirements | | | |
| R2 | S2.1 | | System requirement with one component requirement | | | |
| R2 | S2.1 | C2.1.1 | Component requirement | | | |
| R2 | S2.2 | | System requirement with one component requirement | | | |
| R2 | S2.2 | C2.2.1 | Component requirement | | | |
| R3 | | | Customer business requirement with one system requirement | | | |
| R3 | S3.1 | | System requirement with no component requirements | | | |
| R4 | | | Customer business requirement with one system requirement | | | |
| R4 | S4.1 | | System requirement with no component requirements | | | |

| Customer Business Requirements | | | | Operability Test | | |
|---|---|---|---|---|---|---|
| System Requirements | | | | | | |
| | Component Requirements | | | | | |
| | | Requirements | | Test Method | Test Case | Test Result |
| R1 | | | Customer business requirement with multiple system requirements | | | |
| R1 | S1.1 | | System requirement with multiple component requirements | | | |
| R1 | S1.1 | C1.1.1 | Component requirement | | | |
| R1 | S1.1 | C.1.1.2 | Component requirement | | | |
| R1 | S1.2 | | System requirement with multiple component requirements | | | |
| R1 | S1.2 | C1.2.1 | Component requirement | | | |
| R1 | S1.2 | C1.2.2 | Component requirement | | | |
| R1 | S1.2 | C1.2.3 | Component requirement | | | |
| R2 | | | Customer business requirement with multiple system requirements | | | |
| R2 | S2.1 | | System requirement with one component requirement | | | |
| R2 | S2.1 | C2.1.1 | Component requirement | | | |
| R2 | S2.2 | | System requirement with one component requirement | | | |
| R2 | S2.2 | C2.2.1 | Component requirement | | | |
| R3 | | | Customer business requirement with one system requirement | | | |
| R3 | S3.1 | | System requirement with no component requirements | | | |
| R4 | | | Customer business requirement with one system requirement | | | |
| R4 | S4.1 | | System requirement with no component requirements | | | |

SYSTEMS ENGINEERING PROCESS

BACKGROUND OF THE INVENTION

1. Technical Field

The present invention relates to a Systems Engineering process for managing and implementing a project for a customer.

2. Related Art

Current Systems Engineering techniques utilize subjective principles and practices that rely primarily upon the practitioner's experience and judgment to define, analyze, and manage requirements, architectures, and designs. An objective methodology that consistently applies these principles and practices does not exist, which is a one of the primary reason why many commercial projects fail. Thus, there is a need for a consistent, structured, and flexible Systems Engineering method for defining, analyzing, and managing requirements, architectures, and designs for commercial projects.

SUMMARY OF THE INVENTION

The present invention provides a method for implementing a project for a customer, said method comprising the steps of:

developing business requirements of the project, including reviewing the business requirements for acceptability in accordance with business requirements review (BRR) exit criteria;

developing system requirements of the project after the step of developing business requirements, including reviewing the system requirements for acceptability in accordance with system requirements review (SRR) exit criteria, said business requirements being decomposed into the system requirements; and developing component requirements of the project after the step of developing system requirements, including reviewing the component requirements for acceptability in accordance with preliminary design review (PDR) exit criteria, said system requirements being decomposed into the component requirements.

The present invention provides a method for implementing a project for a customer, comprising the steps of:

developing business requirements (BR) of the project, including reviewing the business requirements for acceptability in accordance with BRR exit criteria;

developing system requirements (SR) of the project after the step of developing business requirements, including reviewing the system requirements for acceptability in accordance with SRR exit criteria, said business requirements being decomposed into the system requirements;

developing component requirements of the project after the step of developing system requirements, including reviewing the component requirements (CR) for acceptability in accordance with component requirements review (PDR) exit criteria, said system requirements being decomposed into the component requirements;

developing component designs compatible with the component requirements and developing test plans for testing the component designs after the step of developing component requirements, including reviewing the component designs and test plans for acceptability in accordance with critical design review (CDR) exit criteria, said component requirements being decomposed into the component designs and the test plans;

providing a Requirements Traceability and Verification Matrix (RTVM) as input to each of the BRR, SRR, and PDR, said RTVM depicting hierarchical relationships between the business requirements and the system requirements, said RTVM further depicting hierarchical relationships between the system requirements and the component requirements;

updating the RTVM with verification information relating to the business requirements, after the BRR exit criteria have been determined to be satisfied and before the step of developing system requirements has been initiated;

updating the RTVM with verification information relating to the system requirements, after the SRR exit criteria have been determined to be satisfied and before the step of developing component requirements has been initiated;

updating the RTVM with verification information relating to the component requirements, after the PDR exit criteria have been determined to be satisfied; and updating the RTVM with verification information relating to the component designs and test plans, after the CDR exit criteria have been determined to be satisfied.

The present invention provides a computer program product, comprising:

a computer usable medium having a computer readable Requirements Traceability and Verification Matrix (RTVM) embodied therein, said RTVM being used in conjunction with a method for implementing a project for a customer, said method comprising the steps of:

developing business requirements of the project, including reviewing the business requirements for acceptability in accordance with business requirements review (BRR) exit criteria;

developing system requirements of the project after the step of developing business requirements, including reviewing the system requirements for acceptability in accordance with system requirements review (SRR) exit criteria, said business requirements being decomposed into the system requirements; and developing component requirements of the project after the step of developing system requirements, including reviewing the component requirements for acceptability in accordance with component requirements review (PDR) exit criteria, said system requirements being decomposed into the component requirements, said RTVM comprising verification information relating to the business requirements if the BRR exit criteria have been satisfied, said RTVM comprising verification information relating to the system requirements if the SRR exit criteria have been satisfied, said RTVM comprising verification information relating to the component requirements if the PDR exit criteria have been satisfied, said RTVM depicting hierarchical relationships between the business requirements and the system requirements, said RTVM further depicting hierarchical relationships between the system requirements and the component requirements.

The present invention advantageously provides a consistent, structured, and flexible Systems Engineering method for defining, analyzing, and managing requirements, architectures, and designs for commercial projects.

BRIEF DESCRIPTION OF THE DRAWINGS

FIG. 1 is a flow chart depicting an initial step followed by six sequential steps of a Systems Engineering (SE) process for implementing a project for a customer, in accordance with embodiments of the present invention.

FIGS. 2A-2G depict details associated with the first sequential step of FIG. 1, namely the step of developing business requirements for the project, in accordance with embodiments of the present invention.

FIGS. 3A-3H depict details associated with the second sequential step of FIG. 1, namely the step of developing system requirements, in accordance with embodiments of the present invention.

FIGS. 4A-4H depict details associated with the third sequential step of FIG. 1, namely the step of developing component requirements, in accordance with embodiments of the present invention.

FIGS. 5A-5H depict details associated with the fourth sequential step of FIG. 1, namely the step of developing and testing components, in accordance with embodiments of the present invention.

FIGS. 6A-6G depict details associated with the fifth sequential step of FIG. 1, namely the step of testing the system, in accordance with embodiments of the present invention.

FIGS. 7A-7G depict details associated with the sixth sequential step of FIG. 1, namely the step of putting the system into production, in accordance with embodiments of the present invention.

FIGS. 8A-8H collectively depict a Requirements Traceability and Verification Matrix (RTVM), in accordance with embodiments of the present invention.

DETAILED DESCRIPTION OF THE INVENTION

Overview

Figure 2A:
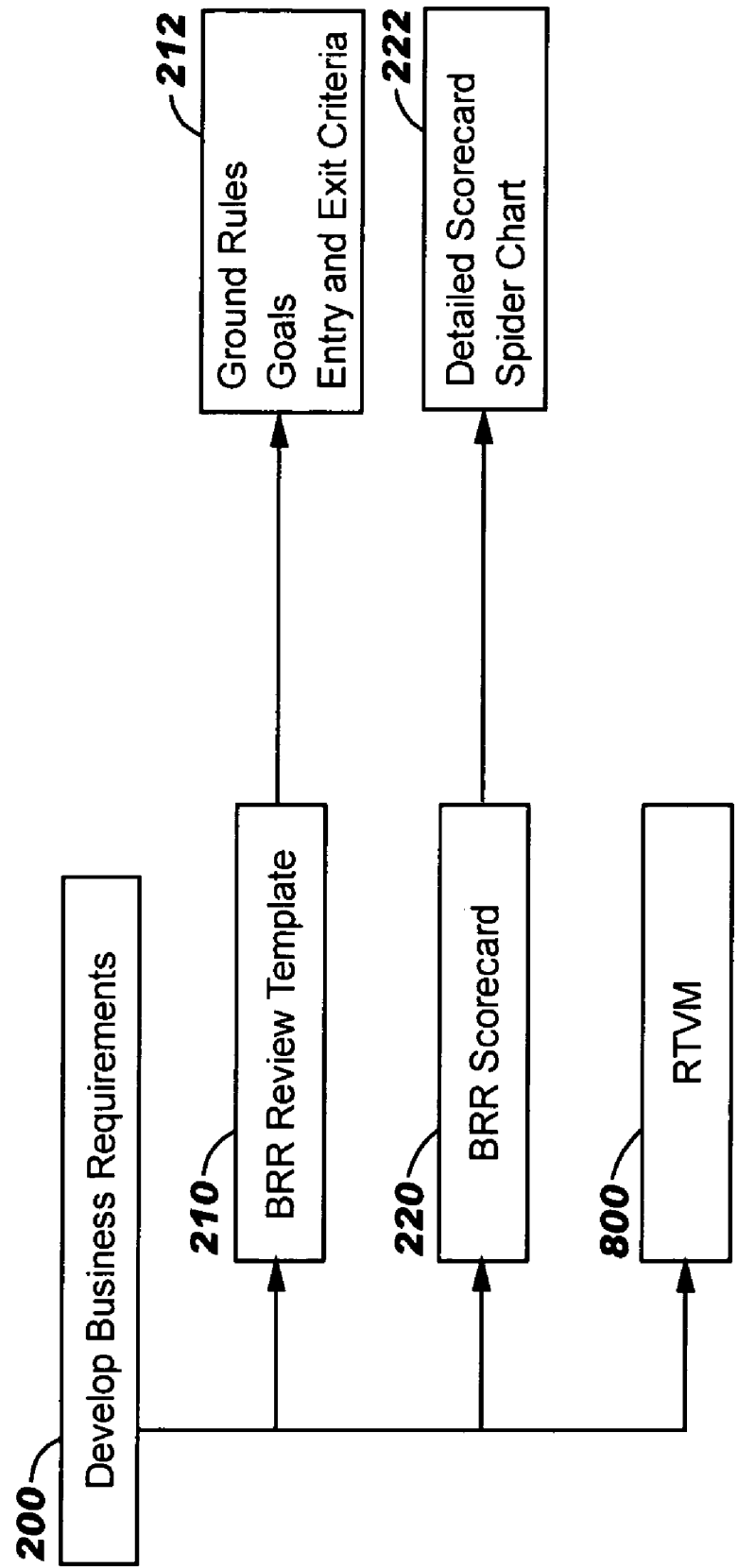

FIG. 1 is a flow chart depicting sequential steps 100, 200, 300, 400, 500, 600, and 700 of a Systems Engineering (SE) process for implementing a project or program (hereinafter, "project") for a customer, in accordance with embodiments of the present invention. The SE process ensures that customer "requirements" and expectations for the project are effectively and efficiently identified, integrated, and managed. Requirements define the needs and objectives of the stakeholders of the project. A "stakeholder" is anyone who has a stake in the outcome of the success of the project and may include, inter alia, customers, business process owners, contractors, software develops, testers, and systems engineers who are managing SE reviews for the project. The purpose of requirements management is to manage the requirements of the projects' products and product components and to identify inconsistencies between those requirements and the project plans and work products.

Step 100 initiates the project.

Step 200 develops business requirements for the project. The detailed implementation of step 200 is described infra in conjunction with FIGS. 2A-2G and FIGS. 8A-8H. The business requirements are the fundamental requirements for the project and may initially be specified or proposed by the customer.

Each business requirement is decomposed into one or more system requirements. Thus, the system requirements associated with a given business requirement is hierarchically related to the given business requirement. Step 300 develops the system requirements and system architecture. The detailed implementation of step 300 is described infra in conjunction with FIGS. 3A-3H and FIGS. 8A-8H.

Each system requirement may be decomposed into one or more component requirements. When a system requirement is completely allocated to a single component requirement, the component requirement and the system requirement are the same, which is the meaning of the terminology "System requirement with no component requirement" for system requirements S3.1 and S4.1 in FIG. 8A described infra. In conjunction with the decomposition of the system requirement into component requirements, the system architecture is defined in terms of components. Thus, the component requirements associated with a given system requirement are hierarchically related to the given system requirement. Step 400 develops the component requirements and component architecture. The detailed implementation of step 400 is described infra in conjunction with FIGS. 4A-4H and FIGS. 8A-8H.

The following example illustrates a project, associated business requirements, associated system requirements generated by the business requirements, and associated component requirements generated by the system requirements. In this example, the project is to design and build a car. A business requirement is that the car is to be able to decelerate. This business requirement may include the system requirement of having a method to decelerate the car. The system requirement of having a method to decelerate the car is decomposed into braking components (i.e., wheel braking components, hydraulic control components, etc.). In this example, the system architecture is defined in terms of components which make up the car, and one of the components which make up the car is a braking component. The braking component is defined in terms of the parts that make up the braking component.

Step 500 develops and tests the components. The detailed implementation of step 500 is described infra in conjunction with FIGS. 5A-5H and FIGS. 8A-8H.

Step 600 tests and verifies that the system meets the requirements by conducting component tests and systems test for each level of requirements in the system/component hierarchy. The system pertaining to the project is the set of all methods, components, software, documentation, interfaces, schedules, and the like, which support the implementation of the project. The detailed implementation of step 600 is described infra in conjunction with FIGS. 6A-6G and FIGS. 8A-8H.

Step 700 puts the system into production by verifying that all tests were completed successfully, the production infrastructure has been updated with the new system, the revised manual procedures have been documented, and the users have been trained in the new procedures. The detailed implementation of step 700 is described in conjunction with infra in conjunction with FIGS. 7A-7G.

Each of steps 200, 300, 400, 500, 600, and 700 utilize a review template and a review scorecard that define and support specific, measurable and repeatable procedures. The review template provides standardization and replication of the procedures by dictating the detailed content and specific sequence of required SE reviews. A review scorecard quantitatively measures how well the project need is being met by a step (i.e., one of steps 200, 300, 400, 500, 600, and 700) as the step is being implemented and completed. The review scorecard provides a mechanism for assessing accuracy, completeness, quality, and risk associated with the step. Thus the SE process of the present invention provides a structured guide to the work required to complete each step of the SE process and a measurable standard with which to determine the readiness and risk to proceed forward with the project.

FIGS. 8A-8H depicts a Requirements Traceability and Verification Matrix (RTVM) which provides cumulative traceability from the business requirements, systems requirements, system architecture, design elements, and test methods to ensure that the system is verified and validated in all of its facets. The RTVM effectively tracks the hierarchical relationships among the business requirements, the system requirements, the component requirements, and the architectural components. The RTVM is input to, and is utilized in, each of steps 200, 300, 400, 500, and 600.

Definitionally, the word scope of "criteria", as used herein including in the claims, encompasses both singular and plural forms; i.e., a "criteria" may encompass one criterion or alternatively may encompass more than one criterion. For example, the scope of "review exit criteria" encompasses any of: one criterion, two criteria, three criteria, etc.

The SE process steps 200, 300, 400, 500, 600, and 700, as well as the RTVM, are next described in detail.

Develop Business Requirements (Step 200)

FIGS. 2A-2G depict details associated with step 200 of FIG. 1, namely the step of developing business requirements for the project, in accordance with embodiments of the present invention.

FIG. 2A illustrates three aspects of step 200 to be utilized in developing the business requirements, namely a Business Requirements Review (BRR) template 210, a BRR scorecard 220, and the RTVM 800. The BRR template 210 has BRR aspects 212, which include an establishment and review of ground rules, goals, BRR entry criteria, and BRR exit criteria. The phrases "entry criteria" and "entrance criteria" are equivalent. The ground rules are rules to be followed during the conduct of the BRR and are intended to provide the systems engineer conducting the review with a clear set of instructions for what the content of the review should or should not include. The BRR entry criteria denotes criteria to be satisfied in order to conduct the BRR. The BRR exit criteria denotes criteria to be satisfied in order to complete the BRR. Satisfying the BRR entry criteria and BRR exit criteria requires an objective standard, such as achieving a minimum score relating to the extent to which the BRR entry criteria and BRR exit criteria are satisfied. The present invention teaches use of a scorecard for implementing an objective scoring standard in terms of a numerical score, namely the BRR scorecard 220. The BRR scorecard 220 has aspects 222, which include a detailed scorecard and an associated spider chart (described infra in conjunction with FIGS. 2F and 2G, respectively). Upon completion of the BRR, the RTVM 800 is updated to record the changes from the BRR as described infra in conjunction with FIGS. 8A-8H.

Figure 2B:
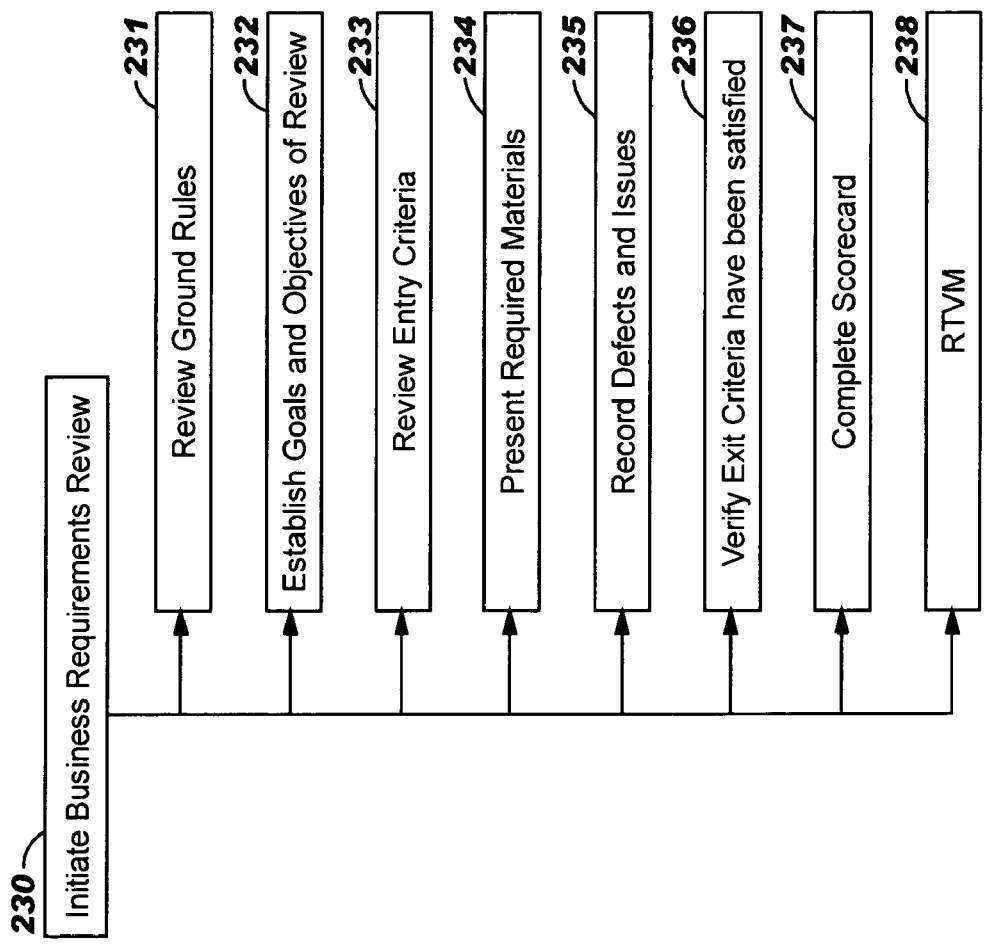

FIG. 2B depicts process steps 230-238 of the BRR. Step 230 initiates the BRR. Steps 231-237 follow step 230. Updating the RTVM via step 238 is the final process step of the BRR as described supra in conjunction with the RTVM 800 shown in FIG. 2A. Step 231 establishes the ground rules for conducting the BRR, as described infra in conjunction with FIG. 2C. Step 232 establishes goals and objectives of the BRR, as described infra in conjunction with FIG. 2D. Step 233 reviews the BRR entry criteria for conducting the BRR, as described infra in conjunction with FIG. 2E. Step 234 presents materials needed for conducting the BRR session, as described infra in conjunction with FIG. 2E. Step 235 records defects and issues which emerge during the conduct of steps 231-234 and 237. Steps 236 initiates verification that the BRR exit criteria have been satisfied, as described infra in conjunction with FIG. 2E. Step 237 determines objectively in terms of a quantitative metric whether the BRR exit criteria have been satisfied. If step 237 determines that the BRR exit criteria have been satisfied, then steps 231-237 are exited and the RTVM 800 is updated to record the changes from the BRR as described infra in conjunction with FIGS. 8A-8H. If step 237 determines that the BRR exit criteria have not been satisfied, then steps 231-237 are selectively re-executed iteratively until step 237 determines that the BRR exit criteria have been satisfied. Note that there is no required sequential order for executing steps 231-237, and the scope of the present invention includes execution of steps 231-237 in any desired order, including the possibility of concurrent performance of some of the steps. The defects and issues recorded in step 235 may provide logical and intuitive guidelines for executing steps 231-237 in an order that makes sense in light of the identified defects and issues. For example, if a defect or issue relates to a seemingly unavoidable violation of a ground rule of step 232, then it may be appropriate to revisit step 232 next to assess whether the violated ground rule should be eliminated or modified. As another example, if the defect or issue relates to an inconsistency between a BRR exit criteria and a particular goal, then it may be appropriate to revisit steps 231 and 236 iteratively until consistency is established between the BRR exit criteria and the particular goal.

FIG. 2C describes a review of ground rules to be followed during the conduct of the BRR (see step 231 of FIG. 2B). In FIG. 2C, the indicated main ground rule that "no solutions are allowed" means that the purpose of the BRR is to perform a review to determine that the business requirements have been established, and not to develop project solutions that focus on how those business requirements will be implemented or "solutioned". FIG. 2C also identifies three other ground rules.

The first other ground rule in FIG. 2C is that the review of issues and the address of concerns are relative to identifying and reviewing gaps in a document that describes the business process flows for the project. The business process flows to be reviewed for gaps are "as is" end to end (hereinafter, "e2e") processes, which include manual touch point desk-level procedures. "End to end" means from beginning to end so as to ensure that all business threads of the business process flow are shown. "Manual touch point" refers to any step in a process such that the step is accomplished by an individual (i.e., a person). A "desk-level procedure" implements process steps and sub-steps which are applied across an organization. Accordingly, a "manual touch point desk-level procedure" is a procedure utilized by an individual to implement process steps and sub-steps which are applied across an organization.

The second other ground rule in FIG. 2C is review and approve business requirements that will drive the project. Note from FIG. 2C that functional and non-functional requirements are to be checked. A functional requirement pertains to a function that a system must perform. A non-functional requirement pertains to how well the function is to be performed. For example, a functional requirement may be that a car must be able to move from a first point to a second point, while a non-functional requirement may be that the car is able to accelerate from 0 to 60 mph in 5 seconds.

The third other ground rule in FIG. 2C is that stakeholders, customers, and business process owners are each represented during the BRR sessions, and that the business requirements and BRR exit criteria must ultimately be signed off by (i.e., approved by) said representatives. Note that the stakeholders may include the customers and business process owners, as well as contractors and systems engineers.

FIG. 2D describes establishing goals and objectives of the BRR (see step 232 of FIG. 2B). The systems engineer conducting the BRR can select from the list of goals for any BRR held. These goals are intended to provide a guide to the activities the systems engineer will need to accomplish in order to complete the BRR. This list of goals can be tailored to each project. It is a goal in FIG. 2C to convey a clear understanding of the business scope, objectives, and requirements that pertain to this project, and associated acceptance/success criteria, and identify "as is" business processes that will be affected. As a result of establishing goals and objectives of the BRR, the business requirements and BRR exit criteria are approved and baselined (i.e., established for use in steps 300, 400, 500, 600, and 700 of FIG. 1). Note that the procedure of establishing goals and objectives of the BRR does not produce documents for the BRR, but rather facilitates a gathering and revision of existing documents relating to the BRR. As indicated in FIG. 2D, the audience (i.e., participants) for establishing goals and objectives of the BRR include: stakeholders, customers, systems engineers, and a Solution Project Manager (SPM) who is responsible for the e2e solution. As described in FIG. 2D, establishing goals and objectives of the BRR includes to: review business requirements and acceptance criteria with customers and stakeholders; establish traceability and set a baseline; validate that "as is" process flows exist and are complete; review project plan milestones; review known risks (i.e, risk mitigation) and related issues, dependencies, and defects; and capture new risks, issues, dependencies, and defects.

FIG. 2E describes a review of BRR entry criteria for the BRR (see step 233 of FIG. 2B), BRR presentation content (see step 234 of FIG. 2B), and BRR exit criteria for the BRR (see step 236 of FIG. 2B). The BRR entry criteria, BRR presentation content, and BRR exit criteria are intended as a guide for the systems engineer conducting the BRR. The items listed in the Entry Criteria column are the documents and activities that must be completed prior to the start of the BRR. The items listed in the Presentation column are the documents and work products that must be presented to the stakeholders and team members attending the BRR. The items listed in Exit Criteria column are the activities and documents that must be completed before the review is considered complete. In FIG. 2E, the BRR entry criteria, BRR presentation content, and BRR exit criteria each pertain to the BRR criteria categories of: business objectives and scope, "as is" business process flows, business requirements, and business criteria and associated metrics. The detailed descriptions and explanations of the BRR presentation content and the BRR entry criteria and BRR exit criteria within each BRR criteria category are contained within FIG. 2E.

In FIG. 2E, the phrase "top sheet" means summary page. In the "as is" business process flows entry criteria, "M3" means Measured, Monitored and Managed. End to end M3 pertains to the function of connecting monitors and probes hardware to the physical system in places such that progress through critical business process can be watched and measurements (such as time, throughput, etc.) are taken such that the system can be verified to be operating as designed. Thus, the "as is" business process flows entry criteria adds requirements to the design of the system so that the aforementioned function can be performed when the system is made operational.

FIG. 2F depicts a detailed scorecard (see step 237 of FIG. 2B) for scoring performance relating to the BRR exit criteria in the BRR exit criteria categories of FIG. 2E. The BRR criteria categories in FIG. 2F (called "scorecard criteria") are: business objectives and scope, "as is" business process flows, business requirements, and business criteria and associated metrics). In FIG. 2F, each BRR criteria category includes one or more criteria. For example, the BRR criteria category of business objectives and scope includes the criteria of: validated and verified business scope and objectives; business case reviewed (top sheet, etc.); and identified issues, risks, and dependencies. Each criteria in FIG. 2F is scored and each criteria is assigned a weight. The criteria for each BRR criteria category in FIG. 2F reflects the criteria within the corresponding BRR exit criteria category of FIG. 2E.

Although FIG. 2F shows a same weight for each criteria of a given BRR criteria category, the criteria weights associated with the given BRR criteria category may generally be variable. The weight of a BRR criteria category is equal to the sum of the weights of its associated criteria. The weights of the BRR criteria categories denote the relative importance of the four BRR criteria categories in FIG. 2F and balance the influence that each BRR criteria category will have on the Overall Review Score. The criteria weights denote the relative importance of the criteria and balance the influence that each criteria has on the Overall Review Score. The various criteria weights may be established in any of steps 231-237 (see FIG. 2B) or may be preassigned prior to the conduct of the BRR. The criteria weights to be entered in the "Weighting Factor" column may be predetermined based on an initial assessment of the relative importance of the BRR criteria and may also be updated as new pertinent information becomes available during the BRR.

In some embodiments, the score S entered into the "USE THIS COLUMN TO ENTER SCORES" column for the criteria are as follows for S in a range of 0 to 4:

$S=0$ (no data available);

$0<S\leq 1$ (critical issue(s); e.g., the issue(s) may prevent sign off);

$1<S\leq 2$ (major defect(s) with possible workaround(s));

$2<S\leq 3$ (major defect(s) with known workaround(s));

$3<S<4$ (minor or no defects); and 4 (not applicable)

The "BRR Score" column for each criteria contains the product of the values in the "Weighting Factor" and "USE THIS COLUMN TO ENTER SCORES" columns relating to each criteria. The "BRR Score" for a given BRR criteria category is the sum of the "BRR Scores" of the criteria pertaining to the given BRR criteria category. The value in the "USE THIS COLUMN TO ENTER SCORES" column for the BRR criteria category is the value in the "BRR Score Column" divided by the value in the "Weighting Factor" column of the BRR criteria category. Thus the Overall Review Score is the sum of the BRR Scores of the criteria or, equivalently, the sum of the BRR Scores of the BRR criteria categories. The Overall Review Score may be normalized to be in a range of 0 to 100. For this range of 0 to 100, the BRR Score of the criteria and BRR criteria categories may be interpreted as a percent contribution to the Overall Review Score. The Overall Review Score may be computed by software that is stored on a computer readable medium and is executed by a processor of a computer system.

Various algorithms may be used to determine whether the BRR process has been successfully completed. In a first exemplary algorithm, the BRR process has been successfully completed if the Overall Review Score is no less than a predetermined threshold score (e.g., 85, within a range of 85 to 100, etc.). In a second algorithm, the BRR process has been successfully completed if each criteria category score satisfies a given threshold score (e.g., 85, within a range of 80 to 90, etc.), and the given threshold score may be constant or criteria dependent or criteria category dependent. In a third algorithm, the BRR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the BRR process has not been successfully completed, then steps 231-237 are selectively re-executed iteratively until the pertinent algorithm determines that the BRR process has been successfully completed.

Figure 2G:
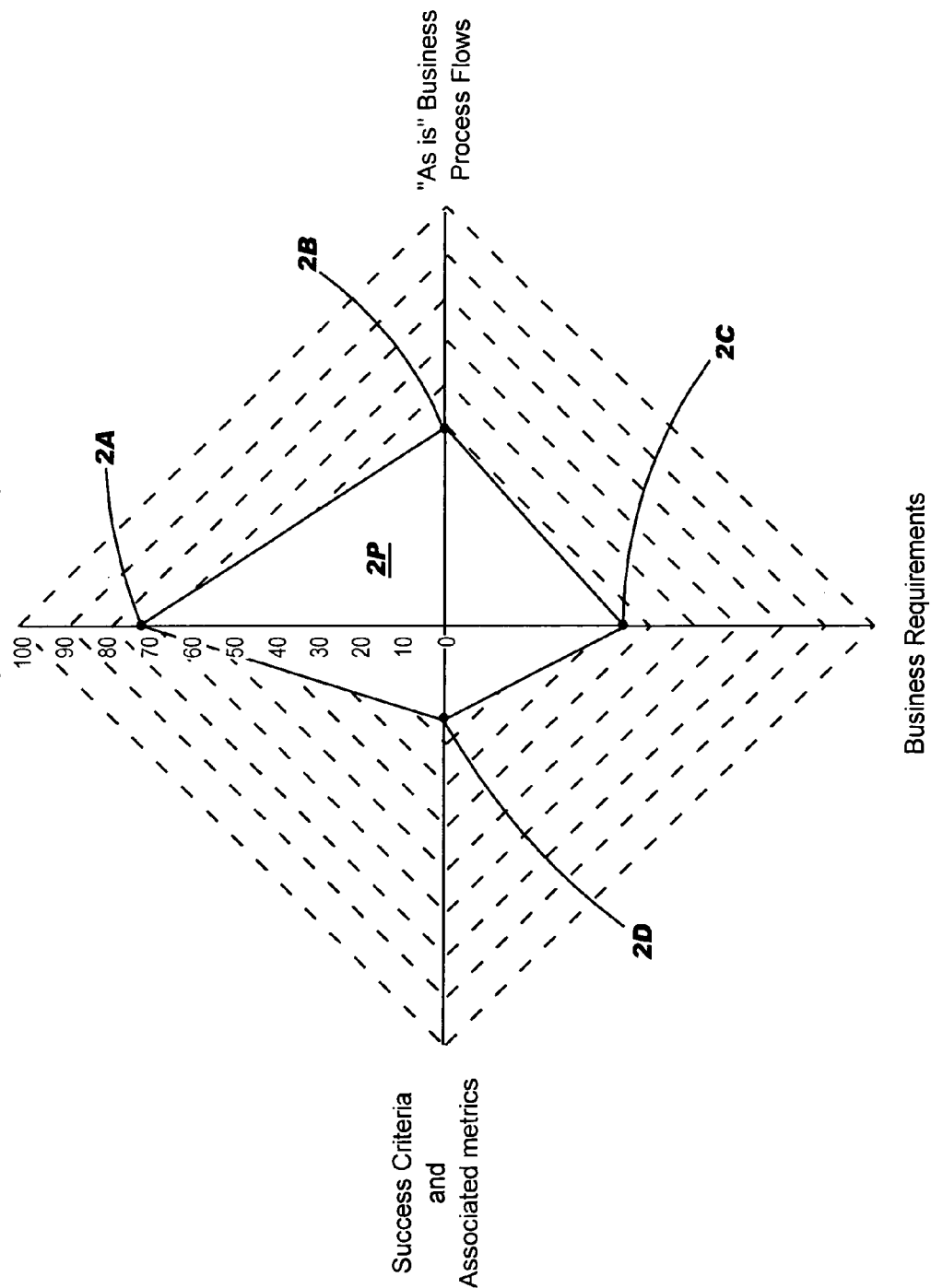

FIG. 2G is a spider chart for graphically representing the BRR criteria category scores tabulated in the scorecard of FIG. 2F. Each axis of FIG. 2G represents a BRR criteria category of FIG. 2F such that points 2A, 2B, 2C, and 2D respectively represent the BRR scores of the BRR criteria category of: business objectives and scope, "as is" business process flows, business requirements, and business criteria and associated metrics. The dashed polygons identify the scores at the intersections between the dashed polygons and the four axes. The points 2A, 2B, 2C, and 2D define a polygon 2P that is useful for visualizing the BRR criteria category scores relative to each other and also for visualizing the score of each BRR criteria category in relation to the pertinent threshold score (e.g., 85). Although not shown in FIG. 2G, a threshold score to ultimately be satisfied by the BRR criteria category scores and/or Overall Review Score could also be represented on FIG. 2G. For example, if the threshold score for the Overall Review Score is 85, then a heavily bolded polygon having the value 85 (i.e., between the dashed polygons having values of 80 and 90), could be superimposed onto FIG. 2G. The spider chart of FIG. 2G may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the BRR entry criteria categories of FIG. 2E in a manner analogous to the use of the detailed scorecard and spider chart of FIGS. 2F and 2G, respectively, in relation to scoring performance for the BRR exit criteria categories of FIG. 2E.

If the pertinent algorithm determines that the BRR process has been successfully completed, then the RTVM is next updated as described infra in conjunction with FIGS. 8A-8H, followed by execution of the Develop System Requirements step 300 of FIG. 1.

In accordance with the preceding discussion, the Develop Business Requirements step 200 (see FIG. 1) of the SE process reviews developing the business requirements for the project. The BRR maps out clear, specific steps to develop, evaluate and finalize the business requirements, then obtain stakeholder (e.g., customer) agreement. The BRR template (see FIG. 2A), along with the BRR scorecard (FIG. 2F), and the RTVM (see FIG. 2A), are used to establish the business requirements. The BRR template maps out a clear, specific set of steps to evaluate the business requirements. The BRR scorecard quantitatively measures how well the business requirements satisfy the business needs established by the customer. The RTVM provides traceability from the business requirements, systems requirements, design elements and test methods to ensure that the system is verified and validated. The RTVM links steps 200, 300, 400, 500, and 600 shown in FIG. 1 and is described infra in detail in conjunction with FIGS. 8A-8H.

In accordance with the preceding discussion, the Develop Business Requirements step 200 (see FIG. 1) develops the business requirements for the project. The BRR template, along with the BRR scorecard (FIG. 2F) and the RTVM are used to define the business level solution requirements as well as the IT solution approach to meet the business requirements. The BRR template maps out a clear, specific set of steps to evaluate the business requirements. The BRR scorecard (see FIG. 2F) quantitatively measures how well the requirements are being developed. The RTVM provides traceability from the assigned requirements to the design elements and test methods to ensure that all requirements can be validated.

The approved business requirements forms a business requirements baseline, which defines the boundaries of a project and enables both the SE team and the customer to formally agree on the scope of the project as well as the Information Technology (IT) solution approach to meet the requirements. The present invention provides a structured guide to the work required to complete the BRR step of the SE process and a measurable standard with which to determine the readiness and risk to proceed forward with the project.

The BRR template provides standardization and replication of the BRR review steps shown in FIG. 2B for any project using the SE process by dictating the detailed content and specific sequence of the BRR, resulting in a measurable improvement in quality, content and consistency of all BRRs. A goal of the BRR is to ensure the business scope, objectives, process flows, requirements and success criteria for the project are established and agreed to by the SE team, the customer, and other stakeholders. Successful completion of the BRR reduces project risk by identifying defects and issues. Successful completion of the BRR is achieved when a sufficient number of defects and issues have been resolved to obtain a success score (i.e., passing score) as described supra in conjunction with FIG. 2F.

To achieve successful completion of the BRR, the present invention lists clear, standardized objectives and ground rules for the BRR to ensure the review goals are met. To achieve successful completion of the BRR, the present invention also establishes a standardized set of BRR entry criteria, BRR presentation content, and BRR exit criteria that must be met in order to successfully complete the review. The BRR entry criteria list the information to be presented within the review. The BRR presentation material of FIG. 2E further clarifies what information should be presented and how it can be presented. The BRR exit criteria delineate the requirements for accepting the technical information as complete. If the level of detail required in the BRR review template is not available, then the practitioner is not ready to hold a BRR.

To achieve successful completion of the BRR, the present invention also requires completion of the BRR scorecard to provide a measurable evaluation of the review's success.

When the BRR is conducted as described herein, a list of defects and issues is recorded as well as a quantitative measure (i.e., score) which evaluates the content and completeness of the business requirements. The score is tied to the defects and issues that have been recorded. Correction of the defects and resolution of the issues are essential to the creation of the business requirements baseline. As the defects are corrected and the issues resolved, the BRR criteria are periodically reapplied to evaluate the content and completeness of the requirements and a new quantitative measure is developed. The quantitative measure is used to identify and quantify risk. The business requirements are not baselined until a minimum success score (i.e., minimum acceptable success score; e.g., 85, 80-90, or 85-100 in the Overall Review Score of FIG. 2F) has been achieved.

The BRR scorecard is a quantitative and consistent method to measure the quality and completeness of the project's business scope, objectives, process flows, requirements and success criteria (i.e., acceptance criteria) according to a comprehensive set of success criteria. The BRR scorecard provides a mechanism for scoring the proposed or tentative business requirements baseline for accuracy, completeness, quality, and risk. The BRR scorecard includes the BRR criteria and weighting for the BRR criteria in a software tool (e.g., a commercially available tool such as the Microsoft Excel® spreadsheet tool) to quickly and uniformly generate an Overall Review Score. The success criteria can be easily tailored to address specific project complexity or scope situations. Using a uniform (i.e., project independent) success criteria allows teams to conduct analysis across all projects and develop organization lessons learned with corrective actions. However, the scope of the present invention also includes embodiments in which the success criteria are project dependent.

The present invention measures the quality of the business requirements baseline with respect to the prescribed BRR exit criteria by providing: guidelines for performing the scoring; a prescribed set of scoring criteria for each question (see FIG. 2F); a prescribed set of questions (see FIG. 2F) for the BRR exit criteria which specifically address the defined goals of the BRR (See FIG. 2D); and a weighting factor (see FIG. 2F) for each question to accurately reflect the significance of each criteria in regard to the overall evaluation.

An output of the BRR scorecard may be an Overall Review Score (see FIG. 2F) such as between 0 and 100 which: rates the quality of the material presented at the BRR; specifies the issues and defects that were discovered during the BRR; and states the technical risk associated with the proposed business requirement baseline presented at the BRR.

The Overall Review Score may be mapped to "Red" (critical), "Yellow" (caution), "Green" (satisfactory) status for a summary assessment of the overall condition of the business requirements of the project. The BRR scorecard (see FIG. 2F) automatically generates a "spider chart" (see FIG. 2G) as a graphical representation of the scoring per criteria. The spider chart is a visual reference to highlight the problem areas discovered during the BRR and measured by the Overall Review Score for the BRR.

When the BRR is completed and the related defects/issues have been resolved, then the business requirements are used to define the system architecture and requirements.

Develop System Requirements (Step 300)

FIGS. 3A-3H depict details associated with step 300 of FIG. 1, namely the step of developing system requirements, in accordance with embodiments of the present invention. The system requirements are hierarchically associated with the established business requirements for the project, since each business requirement may be decomposed into one or more system requirements.

Figure 3A:
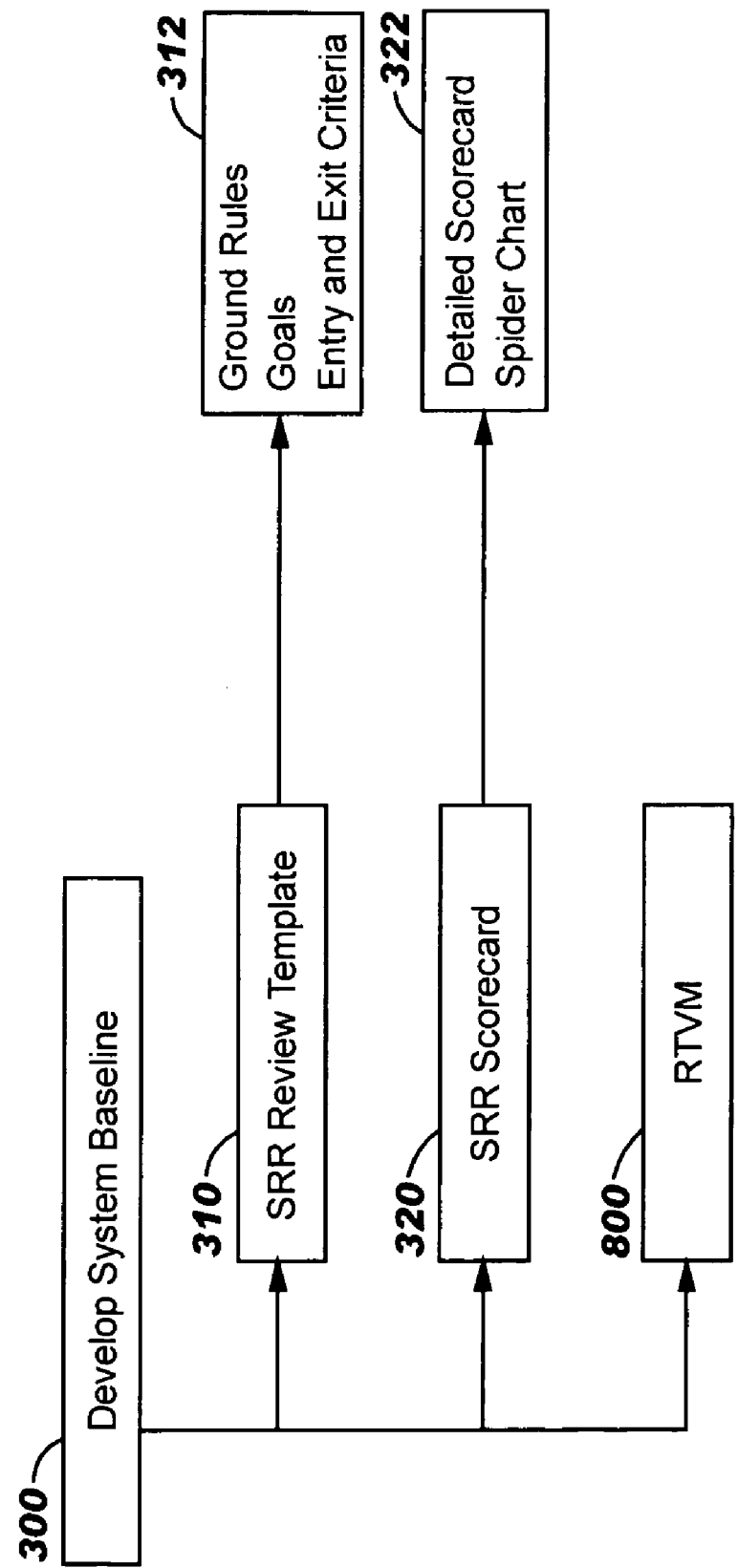

FIG. 3A illustrates three aspects of step 300 to be utilized in developing the system requirements, namely a System Requirements Review (SRR) template 310, a SRR scorecard 320, and the RTVM 800. The SRR template 310 has SRR aspects 312, which include an establishment and review of ground rules, goals, SRR entry criteria, and SRR exit criteria. The ground rules are rules to be followed during the conduct of the SRR and are intended to provide the systems engineer conducting the review with a clear set of instructions for what the content of the review should or should not include. The SRR entry criteria denotes criteria to be satisfied in order to conduct the SRR. The SRR exit criteria denotes criteria to be satisfied in order to complete the SRR. Satisfying the SRR entry criteria and SRR exit criteria requires an objective standard, such as achieving a minimum score relating to the extent to which the SRR entry criteria and SRR exit criteria are satisfied. The present invention uses a scorecard for implementing an objective scoring standard in terms of a numerical score, namely the SRR scorecard 320. The SRR scorecard 320 has aspects 322, which include a detailed scorecard and an associated spider chart (described infra in conjunction with FIGS. 3G and 3H, respectively). Upon completion of the SRR, the RTVM 800 is updated to record the changes from the SRR as described infra in conjunction with FIGS. 8A-8H.

Figure 3B:
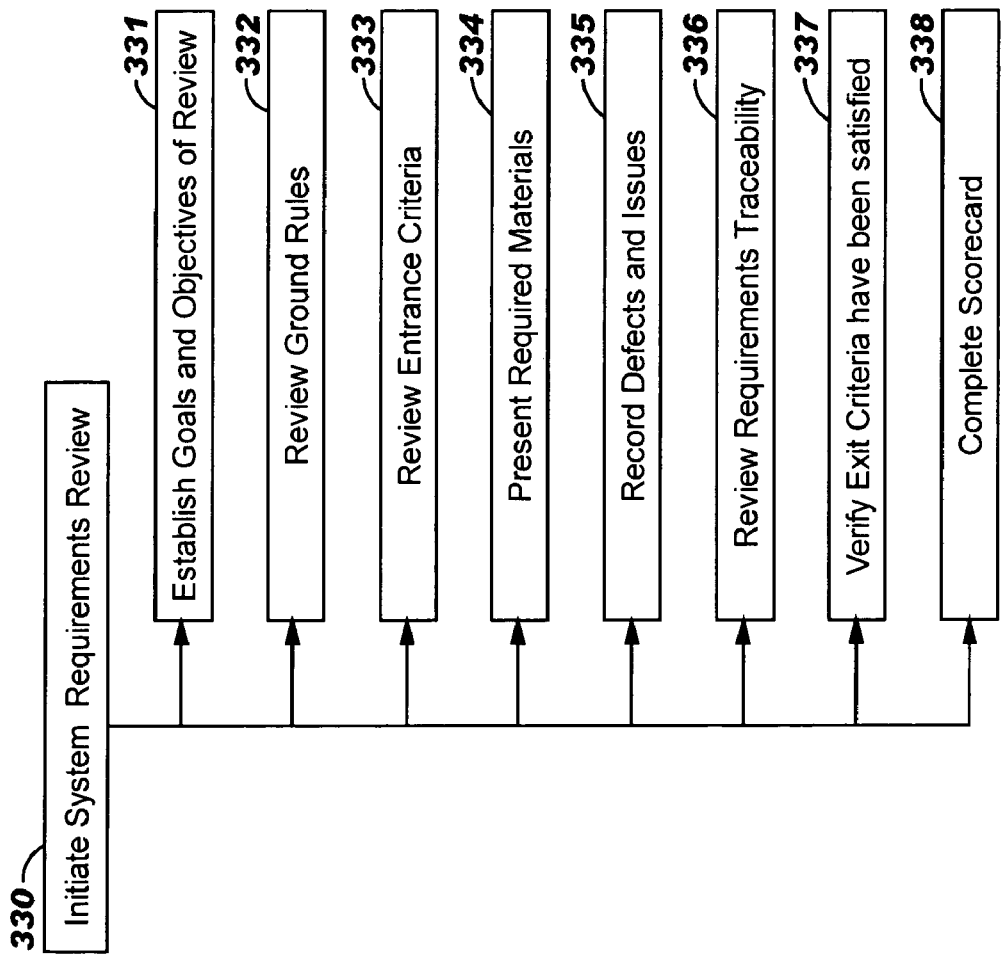

FIG. 3B depicts process steps 330-338 of the SRR. Step 330 initiates the SRR. Steps 331-338 follow step 330. Updating the RTVM 800 (see FIG. 3A) is the final process step of the SRR after steps 331-338 have been completely executed. Step 331 establishes goals and objectives of the SRR, as described infra in conjunction with FIG. 3C. Step 332 establishes the ground rules for conducting the SRR, as described infra in conjunction with FIG. 3D. Step 333 reviews the SRR entry criteria for conducting the SRR, as described infra in conjunction with FIGS. 3E-3F. Step 334 presents materials needed for conducting the SRR session, as described infra in conjunction with FIGS. 3E-3F. Step 335 records defects and issues which emerge during the conduct of steps 331-334 and 336-338. Step 336 utilizes the RTVM 800 (see FIG. 3A) to review the requirements traceability with respect to the business requirements and system requirements. Step 337 initiates verification that the SRR exit criteria have been satisfied, as described infra in conjunction with FIGS. 3E-3F. Step 338 determines objectively in terms of a quantitative metric whether the SRR exit criteria have been satisfied. If step 338 determines that the SRR exit criteria have been satisfied, then steps 331-338 are exited and the RTVM 800 is updated to record the changes from the SRR as described infra in conjunction with FIGS. 8A-8H. If step 338 determines that the SRR exit criteria have not been satisfied, then steps 331-338 are selectively re-executed iteratively until step 338 determines that the SRR exit criteria have been satisfied. Note that there is no required sequential order for executing steps 331-338, and the scope of the present invention includes execution of steps 331-338 in any desired order, including the possibility of concurrent performance of some of the steps. The defects and issues recorded in step 335 may provide logical and intuitive guidelines for executing steps 331-338 in an order that makes sense in light of the identified defects and issues. For example, if the defect or issue relates to an inconsistency between a system requirement and a particular goal, then it may be appropriate to revisit steps 331 and 337 iteratively until consistency is established between the system requirement and the particular goal. Once the defect is reconciled, the re-scoring is done and step 338 redetermines whether the SRR exit criteria have been satisfied.

FIG. 3C describes establishing goals and objectives of the SRR (see step 331 of FIG. 3B). The systems engineer conducting the SRR can select from the list of goals for any SRR held. These goals are intended to provide a guide to the activities the systems engineer will need to accomplish in order to complete the SRR. This list of goals can be tailored to each project. It is a goal in FIG. 3C to convey a clear understanding of the business/stakeholder needs, rationale and priorities, and review the system level solution requirements and the information technology (IT) solution approach, and obtain customer concurrence on system requirements/architecture. As described in FIG. 3C, the establishing of goals and objectives of the SRR include: review and approve documented system requirements and architecture; establish traceability; establish the technical baseline; identify technical risks; review mitigation plans; identify dependencies; establish plans, and identify technical performance measures.

FIG. 3D describes a review of ground rules to be followed during the conduct of the SRR (see step 331 of FIG. 3B). The indicated ground rules comprise: review documentation and address the listed concerns; and key stakeholders and business process holders are present during the SRR and sign off on the solution (system) requirements/architecture and the solution (system) scope. The "key stakeholders" and "key business process owners" in the SRR ground rules refer to representatives of each class of stakeholder and each class of business process owner. In other words, while it is desirable that as many stakeholders and business process owners in each class be involved in implementing the ground rules (e.g., being present during the SRR), the actual ground rules require that each stakeholder class be represented regardless of how many members in each stakeholder class collectively fulfill the representation requirement.

FIGS. 3E-3F collectively describe a review of SRR entry criteria for the SRR (see step 333 of FIG. 3B), SRR presentation content (see step 334 of FIG. 3B), and SRR exit criteria for the SRR (see step 336 of FIG. 3B). The SRR entry criteria, SRR presentation content, and SRR exit criteria are intended as a guide for the systems engineer conducting the SRR. The items listed in the Entry Criteria column are the documents and activities that must be completed prior to the start of the SRR. The items listed in the Presentation column are the documents and work products that must be presented to the stakeholders and team members attending the SRR. The items listed in Exit Criteria column are the activities and documents that must be completed before the review is considered complete. In FIGS. 3E-3F, the SRR entry criteria, SRR presentation content, and SRR exit criteria each pertain to the SRR criteria categories of: business requirements and process definition, system requirements definition, system level architecture, acceptance criteria, and requirements traceability. The detailed descriptions and explanations of the SRR presentation content and the SRR entry criteria and SRR exit criteria within each SRR criteria category are contained within FIGS. 3E-3F.

FIG. 3G depicts a detailed scorecard (see step 238 of FIG. 3B) for scoring performance relating to the SRR exit criteria in the SRR exit criteria categories of FIGS. 3E and 3F. The SRR criteria categories in FIG. 3G (called "scorecard criteria") are: business requirements and process definition, system requirements definition, system level architecture, requirements traceability, and acceptance criteria. In FIG. 3G, each SRR criteria category includes one or more criteria. For example, the SRR criteria category of system level architecture includes the criteria of: customer concurs that the system level architecture satisfies the business requirements; dynamic and static architectures are defined and complete; system level architecture matches system requirements; 'to be' system landscape is defined, and 'to be' business flows is defined. The criteria for each SRR criteria category in FIG. 3G reflects the criteria within the corresponding SRR exit criteria category of FIGS. 3E-3F. Each criteria in FIG. 3G is scored and each criteria is assigned a weight. The scores in FIG. 3G are analogous to the scores in FIG. 2F described supra. The meaning and use of the weights and the interpretation of the "Weighting Factor", "SRR Score", and "USE THIS COLUMN TO ENTER SCORES" columns in FIG. 3G are analogous to the corresponding columns of FIG. 2F described supra. Similarly, the Overall Review Score in FIG. 3G is analogous to the corresponding Overall Review Score in FIG. 2F described supra and may be computed by any of the techniques described supra for computing the Overall Review Score relating to the BRR.

Various algorithms may be used to determine whether the SRR process has been successfully completed. In a first exemplary algorithm, the SRR process has been successfully completed if the Overall Review Score is no less than a predetermined threshold score (e.g., 85, within a range of 85 to 100, etc.). In a second algorithm, the SRR process has been successfully completed if each criteria category score satisfies a given threshold score (e.g., 85, within a range of 80 to 90, etc.), and the given threshold score may be constant or criteria dependent or criteria category dependent. In a third algorithm, the SRR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the SRR process has not been successfully completed, then steps 331-338 are selectively re-executed iteratively until the pertinent algorithm determines that the SRR process has been successfully completed.

Figure 3H:
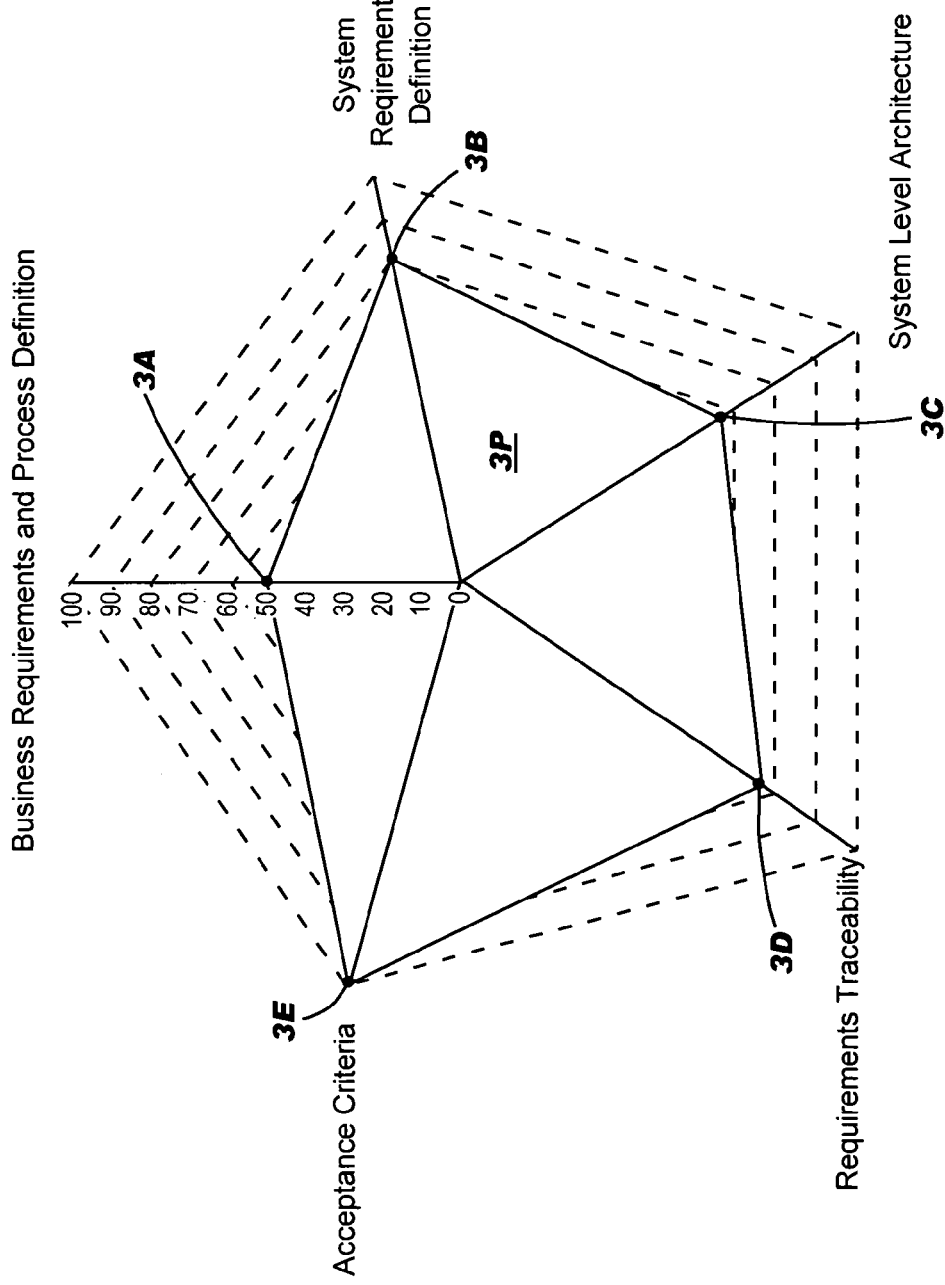

FIG. 3H is a spider chart for graphically representing the SRR criteria category scores tabulated in the scorecard of FIG. 3G. Each axis of FIG. 3H represents a SRR criteria category of FIG. 3G such that points 3A, 3B, 3C, 3D, and 3E respectively represent the SRR scores of the SRR criteria category of: business requirements and process definition, system requirements definition, system level architecture, requirements traceability, and acceptance criteria. The dashed polygons identify the scores at the intersections between the dashed polygons and the four axes. The points 3A, 3B, 3C, 3D, and 3E define a polygon 3P that is useful for visualizing the SRR criteria category scores relative to each other and also for visualizing the score of each SRR criteria category in relation to the pertinent threshold score (e.g., 85). Although not shown in FIG. 3H, a threshold score to ultimately be satisfied by the SRR criteria category scores and/or Overall Review Score could also be represented on FIG. 3H. For example, if the threshold score for the Overall Review Score is 85, then a heavily bolded polygon having the value 85 (i.e., between the dashed polygons having values of 80 and 90), could be superimposed onto FIG. 3H. The spider chart of FIG. 3G may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the SRR entry criteria of FIGS. 3E-3F in a manner analogous to the use of the detailed scorecard and spider chart of FIGS. 3G and 3H, respectively, in relation to scoring performance for the SRR exit criteria of FIGS. 3E-3F.

If the pertinent algorithm determines that the SRR process has been successfully completed, then the RTVM is next updated as described infra in conjunction with FIGS. 8A-8H, followed by execution of the Develop Component Requirements step 400 of FIG. 1.

In accordance with the preceding discussion, the Develop System Requirements step 300 (see FIG. 1) of the SE process reviews developing the system baseline. The SRR template (see FIG. 3A), along with the SRR scorecard (see FIG. 3G), and the RTVM (see FIG. 3A) are used to define the system level requirements as well as the IT solution approach to meet the system requirements. The SRR template maps out a clear, specific set of steps to evaluate the system requirements. The SRR scorecard quantitatively measures how well the system requirements support the business requirements. The RTVM provides traceability from the assigned requirements to the design elements and test methods to ensure that all requirements can be validated.

The present invention enables both the SE team, the customer, and other stakeholders to agree on the scope of the system and formally baseline the technical scope of the project. The present invention provides a structured guide to the work required to complete the Develop System Requirements 300 step (see FIG. 1) of the SE process and a measurable standard with which to determine the readiness and risk to proceed forward with the project.

The SRR review template (see FIG. 3A) provides standardization and replication of the SRR review steps (see FIG. 3B) for any project using the SE process by dictating the detailed content and specific sequence of the SRR, resulting in a measurable improvement in quality, content, and consistency of all SRRs. The overall goal of the SRR is to establish and formally baseline the system requirements. Successful completion of the SRR will reduce project risk by identifying defects and issues. Successful completion of the SRR is achieved when a sufficient number of defects and issues have been resolved to obtain a success score as described supra in conjunction with FIG. 3G.

To achieve successful completion of the SRR, the present invention lists clear, standardized ground rules and objectives for the SRR to ensure the review goals are met.

To achieve successful completion of the SRR, the present invention also establishes a standardized set of SRR entry criteria, SRR presentation content, and SRR exit criteria (see FIGS. 3E-3F) that must be met in order to successfully complete the review. The SRR entry criteria list the information to be presented within the review. The SRR presentation content further clarify what information should be presented and how it can be presented. The SRR exit criteria delineate the requirements for accepting the technical information as complete. If the level of detail required in the SRR review template is not available, then the practitioner is not ready to hold an SRR.

To achieve successful completion of the SRR, the present invention also requires completion of the SRR scorecard (see FIG. 3G) to provide a measurable evaluation of the review's success.

When the SRR is conducted via the method outlined herein, a list of defects and issues is recorded as well as a quantitative measure (i.e., score) which evaluates the content and completeness of the system and business requirements. The score is tied to the defects and issues that have been recorded. Correction of the defects and resolution of the issues are essential to the creation of the system requirements baseline. As the defects are corrected and the issues resolved the SRR criteria are periodically reapplied to evaluate the content and completeness of the requirements and a new quantitative measure is developed. The quantitative measure is used to identify and quantify risk. The system requirements are not baselined until a minimum success score (i.e., minimum acceptable success score; e.g., 85, 80-90, or 85-100 in the Overall Review Score of FIG. 3G) has been achieved.

The SRR scorecard is a quantitative and consistent method to measure the quality and completeness of the project's business and system requirements, system level architecture, requirements traceability, and acceptance criteria according to a comprehensive set of criteria. It provides a mechanism for scoring the system requirements baseline for accuracy, completeness, quality and risk. The SRR scorecard contains the SRR criteria and weighting in a software tool (e.g., a commercially available tool such as the Microsoft Excel® spreadsheet tool) to quickly and uniformly generate a review score. The success criteria can be easily tailored to address specific project complexity or scope situations. Using a uniform (i.e., project independent) criteria allows teams to conduct analysis across all projects and develop organization lessons learned with corrective actions. However, the scope of the present invention also includes embodiments in which the success criteria are project dependent.

The present invention measures the quality of the prescribed SRR exit criteria by providing guidelines for performing the scoring; a prescribed set of scoring criteria for each question (see FIG. 3G); a prescribed set of questions/criteria (see FIG. 3G) which specifically address the defined goals of the SRR (see FIG. 3D); and a weighting factor (see FIG. 3G) for each question/criteria to accurately reflect the significance of each element in regard to the overall evaluation.

An output of the SRR scorecard may be an Overall Review Score (see FIG. 3G) such as between 0 and 100 which: rates the quality of the material presented at the SRR; specifies the issues and defects that were discovered during the SRR; and states the technical risk associated with the system requirements baseline that was presented at the SRR.

The Overall Review Score may be mapped to "Red" (critical), "Yellow" (caution), "Green" (satisfactory) status for a summary assessment of the overall condition of the system requirements of the project. The SRR scorecard (see FIG. 3G) automatically generates a "spider chart" (see FIG. 3H) as a graphical representation of the scoring per criteria. The spider chart is a visual reference to highlight the problem areas discovered during the SRR and measured by the Overall Review Score for the SRR.

When the SRR is completed and the related defects/issues have been resolved, then the system requirements are used to define the component architecture and requirements.

Develop Component Requirements (Step 400)

FIGS. 4A-4H depict details associated with step 400 of FIG. 1, namely the step of developing component requirements and component architecture, in accordance with embodiments of the present invention. The component requirements are hierarchically associated with the established system requirements for the project, since each system requirement may be decomposed into one or more component requirements. The component requirements relate to hardware elements, software modules, or processes required to fulfill the business requirements. Developing component requirements includes defining the architectural components.

Figure 4A:
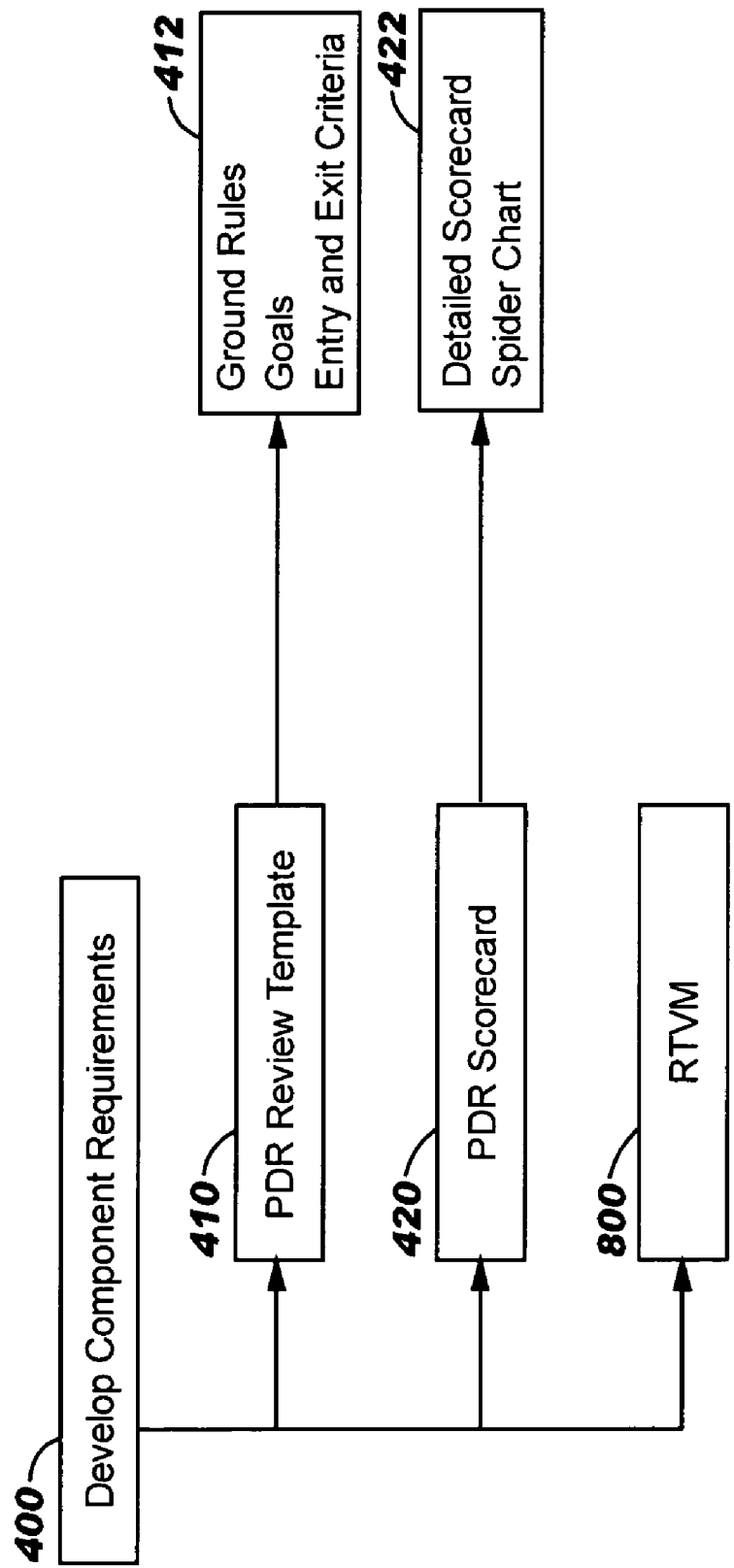

FIG. 4A illustrates three aspects of step 400 to be utilized in developing the component requirements, namely a Preliminary Design Review (PDR) template 410, a PDR scorecard 420, and the RTVM 800. The PDR template 410, PDR scorecard 420, and the RTVM 800 collectively define the component requirements. The PDR template 410 has PDR aspects 412, which include an establishment and review of ground rules, goals, PDR entry criteria, and PDR exit criteria. The ground rules are rules to be followed during the conduct of the PDR and are intended to provide the systems engineer conducting the review with a clear set of instructions for what the content of the review should or should not include. The PDR entry criteria denotes criteria to be satisfied in order to conduct the PDR. The PDR exit criteria denotes criteria to be satisfied in order to complete the PDR. Satisfying the PDR entry criteria and PDR exit criteria requires an objective standard, such as achieving a minimum score relating to the extent to which the PDR entry criteria and PDR exit criteria are satisfied. The present invention uses a scorecard for implementing an objective scoring standard in terms of a numerical score, namely the PDR scorecard 420. The PDR scorecard 420 has aspects 422, which include a detailed scorecard and an associated spider chart (described infra in conjunction with FIGS. 4G and 4H, respectively). Upon completion of the PDR, the RTVM 800 is updated to record the changes from the PDR as described infra in conjunction with FIGS. 8A-8H.

Figure 4B:
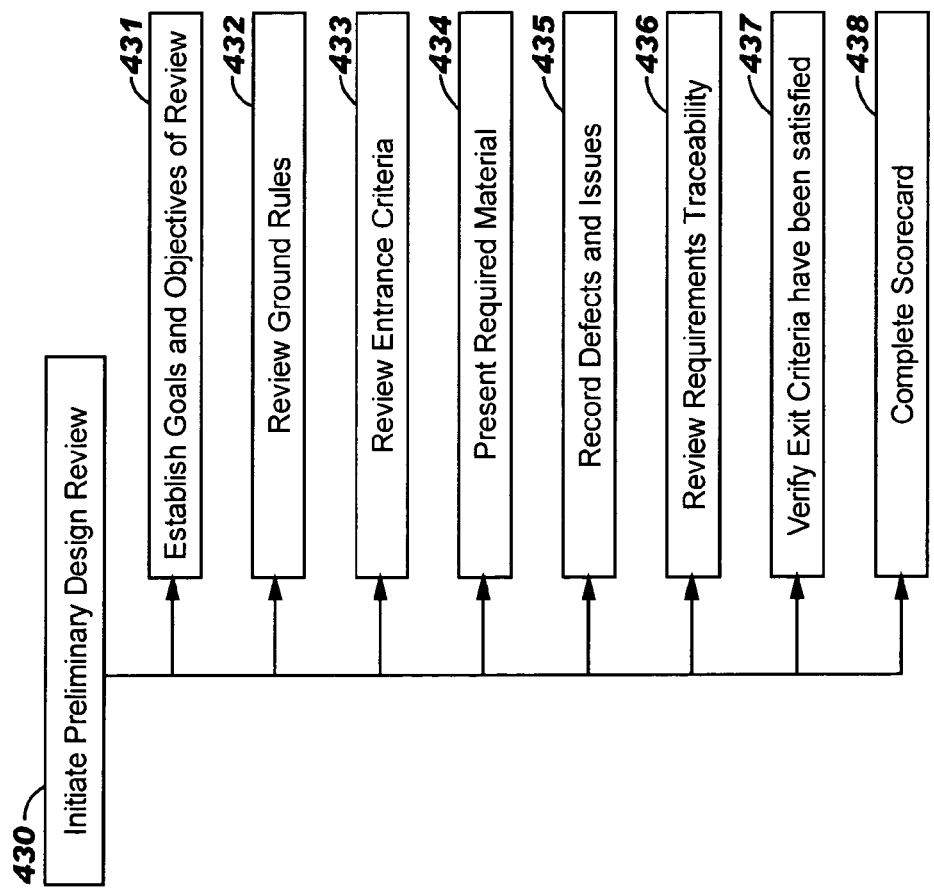

FIG. 4B depicts process steps 430-438 of the PDR. Step 430 initiates the PDR. Steps 431-438 follow step 430. Updating the RTVM 800 (see FIG. 4A) is the final process step of the PDR after steps 431-438 have been completely executed. Step 431 establishes goals and objectives of the PDR, as described infra in conjunction with FIG. 4C. Step 432 establishes the ground rules for conducting the PDR, as described infra in conjunction with FIG. 4D. Step 433 reviews the PDR entry criteria for conducting the PDR, as described infra in conjunction with FIGS. 4E-4F. Step 434 presents materials needed for conducting the PDR session, as described infra in conjunction with FIGS. 4E-4F. Step 435 records defects and issues which emerge during the conduct of steps 431-434 and 436-438. Step 436 utilizes the RTVM 800 (see FIG. 4A) to review the requirements traceability with respect to the business requirements, system requirements, and component requirements. Step 437 initiates verification that the PDR exit criteria have been satisfied, as described infra in conjunction with FIGS. 4E-4F. Step 438 determines objectively in terms of a quantitative metric whether the PDR exit criteria have been satisfied. If step 438 determines that the PDR exit criteria have been satisfied, then steps 431-438 are exited and the RTVM 800 is updated to record the changes from the PDR as described infra in conjunction with FIGS. 8A-8H. If step 438 determines that the PDR exit criteria have not been satisfied, then steps 431-438 are selectively re-executed iteratively until step 438 determines that the PDR exit criteria have been satisfied. Note that there is no required sequential order for executing steps 431-438, and the scope of the present invention includes execution of steps 431-438 in any desired order, including the possibility of concurrent performance of some of the steps. The defects and issues recorded in step 435 may provide logical and intuitive guidelines for executing steps 431-438 in an order that makes sense in light of the identified defects and issues. For example, if the defect or issue relates to an inconsistency between a PDR component architecture and a particular goal, then it is appropriate to revisit steps 431 and 437 iteratively until consistency is established between the component architecture and the particular goal which will lead in turn to satisfying the PDR exit criteria.

FIG. 4C describes establishing goals and objectives of the PDR (see step 431 of FIG. 4B). The systems engineer conducting the PDR can select from the list of goals for any PDR held. These goals are intended to provide a guide to the activities the systems engineer will need to accomplish in order to complete the PDR. This list of goals can be tailored to each project. It is a goal in FIG. 4C to present the high level design and the component level baseline, to include the allocated requirements and the architecture baseline. As described in FIG. 4C, the establishing of goals and objectives of the PDR include: review and approve the component level architecture baseline; establish traceability; establish a technical baseline for the component requirements; identify technical risks; review mitigation plans; identify dependencies; identify hardware and software performance monitor tools in support of the e2e monitoring, measurement, and management requirements; review technical performance measures; and review test architecture.

FIG. 4D describes a review of ground rules to be followed during the conduct of the PDR (see step 431 of FIG. 4B). The indicated ground rules comprise: review documentation and address the listed concerns; and key stakeholders and business process holders are present during the PDR and sign off on the component requirements/architecture and the solution (component architecture). The "key stakeholders" and "key business process owners" in the PDR ground rules refer to representatives of each class of stakeholder and each class of business process owner. In other words, while it is desirable that as many stakeholders and business process owners in each class be involved in implementing the ground rules (e.g., being present during the PDR), the actual ground rules require that each stakeholder class be represented regardless of how many members in each stakeholder class collectively fulfill the representation requirement.

FIGS. 4E-4F collectively describe a review of PDR entry criteria for the PDR (see step 433 of FIG. 4B), PDR presentation content (see step 434 of FIG. 4B), and PDR exit criteria for the PDR (see step 437 of FIG. 4B). The PDR entry criteria, PDR presentation content, and PDR exit criteria are intended as a guide for the systems engineer conducting the PDR. The items listed in the Entry Criteria column are the documents and activities that must be completed prior to the start of the PDR. The items listed in the Presentation column are the documents and work products that must be presented to the stakeholders and team members attending the PDR. The items listed in Exit Criteria column are the activities and documents that must be completed before the review is considered complete. In FIGS. 4E-4F, the PDR entry criteria, PDR presentation content, and PDR exit criteria each pertain to the PDR criteria categories of: static architecture definition; dynamic architecture definition; architecture element definition/component requirements; and test architecture definition. The detailed descriptions and explanations of the PDR presentation content and the PDR entry criteria and PDR exit criteria within each PDR criteria category are contained within FIGS. 4E-4F.

Note that the terms "logical architecture" and "physical architecture" in FIG. 4D are defined as follows. Logical architecture defines the functions that the system must perform. Physical architecture defines resources for every function identified in the logical architecture.

FIG. 4G depicts a detailed scorecard (see step 438 of FIG. 4B) for scoring performance relating to the PDR exit criteria in the PDR exit criteria categories of FIGS. 4E-4F. The PDR criteria categories in FIG. 4G (called "scorecard criteria") are: static architecture definition; dynamic architecture definition; architecture element/component requirements; and test architecture definition. In FIG. 4G, each PDR criteria category includes one or more criteria. For example, the PDR criteria category of dynamic architecture includes the criteria of: completeness in the use case diagrams, completeness of the interaction diagrams, and completeness of data architecture/model. Each of the criteria are scored and each of the criteria are assigned a weight. The criteria for each PDR criteria category in FIG. 4G reflects the criteria within the corresponding PDR exit criteria category of FIGS. 4E-4F. Each criteria in FIG. 4G is scored and each criteria is assigned a weight. The scores in FIG. 4G are analogous to the scores in FIG. 2F described supra. The meaning and use of the weights and the interpretation of the "Weighting Factor", "PDR Score", and "USE THIS COLUMN TO ENTER SCORES" columns in FIG. 4G are analogous to the corresponding columns of FIG. 2F described supra. Similarly, the Overall Review Score in FIG. 4G is analogous to the corresponding Overall Review Score in FIG. 2F described supra and may be computed by any of the techniques described supra for computing the Overall Review Score relating to the BRR.

Various algorithms may be used to determine whether the PDR process has been successfully completed. In a first exemplary algorithm, the PDR process has been successfully completed if the Overall Review Score is no less than a predetermined threshold score (e.g., 85, within a range of 85 to 100, etc.). In a second algorithm, the PDR process has been successfully completed if each criteria category score satisfies a given threshold score (e.g., 85, within a range of 80 to 90, etc.), and the given threshold score may be constant or criteria dependent or criteria category dependent. In a third algorithm, the PDR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the PDR process has not been successfully completed, then steps 431-438 are selectively re-executed iteratively until the pertinent algorithm determines that the PDR process has been successfully completed.

Figure 4H:
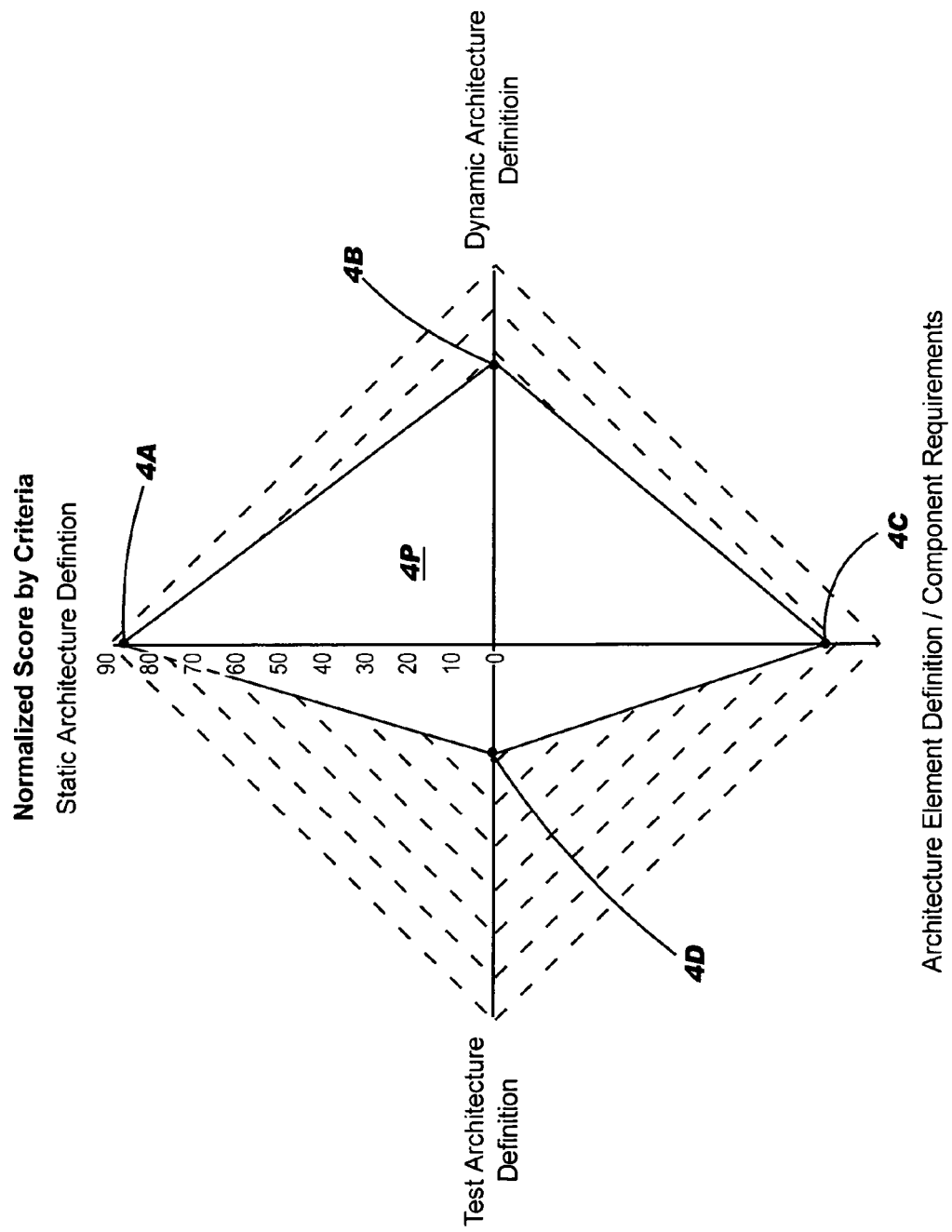

FIG. 4H is a spider chart for graphically representing the PDR criteria category scores tabulated in the scorecard of FIG. 4G. Each axis of FIG. 4H represents a PDR criteria category of FIG. 4G such that points 4A, 4B, 4C, and 4D respectively represent the PDR scores of the PDR criteria category of: static architecture definition; dynamic architecture definition; architecture element/component requirements; and test architecture definition. The dashed polygons identify the scores at the intersections between the dashed polygons and the four axes. The points 4A, 4B, 4C, and 4D define a polygon 4P that is useful for visualizing the PDR criteria category scores relative to each other and also for visualizing the score of each PDR criteria category in relation to the pertinent threshold score (e.g., 85). Although not shown in FIG. 4H, a threshold score to ultimately be satisfied by the PDR criteria category scores and/or Overall Review Score could also be represented on FIG. 4H. For example, if the threshold score for the Overall Review Score is 85, then a heavily bolded polygon having the value 85 (i.e., between the dashed polygons having values of 80 and 90), could be superimposed onto FIG. 4H. The spider chart of FIG. 4H may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the PDR entry criteria of FIGS. 4E-4F in a manner analogous to the use of the detailed scorecard and spider chart of FIGS. 4G and 4H, respectively, in relation to scoring performance for the PDR exit criteria of FIGS. 4E-4F.

If the pertinent algorithm determines that the PDR process has been successfully completed, then the RTVM is next updated as described infra in conjunction with FIGS. 8A-8H, followed by execution of the Develop and Test Components Requirements step 500 of FIG. 1.

In accordance with the preceding discussion, the Develop Component Requirements step 400 (see FIG. 1) of the SE process reviews development of the component requirements and component architecture which are the natural decomposition of the system requirements and system architecture into more specific detail for logical and/or physical hardware elements, software modules, or processes required to develop the system. The PDR template, along with the PDR scorecard and the RTVM are used to define the component requirements as well as the IT solution approach to meet the requirements. The PDR template maps out a clear, specific set of steps to evaluate the component requirements. The PDR scorecard quantitatively measures how well the component requirements satisfy the system and business requirements. The RTVM provides traceability from the assigned requirements to the design elements and test methods to ensure that all requirements can be validated. The present invention enables both the SE team and the customer to agree on the scope of the system and formally baseline the technical scope of the project. The inventions provide a structured guide to the work required to complete this step of the SE process and a measurable standard with which to determine the readiness and risk to proceed forward with the project.

The PDR template provides standardization and replication of the PDR review steps for any project using the SE process by dictating the detailed content and specific sequence of the PDR, resulting in a measurable improvement in quality, content and consistency of all PDRs. The overall goal of the PDR is to establish and formally baseline the component requirements and architecture. Successful completion of the PDR will reduce project risk by removing defects and resolving issues. Successful completion of the PDR is achieved when a sufficient number of defects and issues have been resolved to obtain a success score as described supra in conjunction with FIG. 4G. To achieve successful completion of the PDR, the present invention lists clear, standardized objectives and ground rules for the PDR to ensure the review goals are met.

To achieve successful completion of the PDR, the present invention also establishes a standardized set of PDR entry criteria, PDR presentation content, and PDR exit criteria that must be met in order to successfully complete the review. The PDR entry criteria list the information to be presented within the review. The PDR presentation content further clarify what information should be presented and how it can be presented. The PDR exit criteria delineate the requirements for accepting the technical information as complete. If the level of detail required in the PDR review template is not available, then the practitioner is not ready to hold a PDR.

To achieve successful completion of the PDR, the present invention also requires completion of the PDR scorecard to provide a measurable evaluation of the review's success.

When the PDR is conducted, a list of defects and issues is recorded as well as a quantitative measure (i.e., score) which evaluates the content and completeness of the component requirements and component architecture. The score is tied to the defects and issues that have been recorded. Correction of the defects and resolution of the issues are essential to the creation of the component requirements and architecture baseline. As the defects are corrected and the issues resolved the PDR criteria are periodically reapplied to evaluate the content and completeness of the requirements and architecture to develop a new quantitative measure. The quantitative measure is used to identify and quantify risk. The component requirements and architecture are not baselined until a minimum success score (i.e., minimum acceptable success score; e.g., 85, 80-90, or 85-100 in the Overall Review Score of FIG. 4G) has been achieved.

The PDR scorecard is a simple, quantitative and consistent method to measure the quality and completeness of the project's static and dynamic architecture, component requirements and test architecture definition according to a comprehensive set of criteria. The PDR scorecard provides a mechanism for scoring the component requirements and architecture baseline for accuracy, completeness, quality and risk. The PDR scorecard contains the PDR criteria and weighting in a software tool (e.g., a commercially available tool such as the Microsoft Excel® spreadsheet tool) to quickly and uniformly generate a review score. The criteria can be easily tailored to address specific project complexity or scope situations. Using a uniform (i.e., project independent) criteria allows teams to conduct analysis across all projects and develop organization lessons learned with corrective actions. However, the scope of the present invention also includes embodiments in which the success criteria are project dependent.

The present invention measures the quality of the prescribed PDR exit criteria by providing: guidelines for performing the scoring; a prescribed set of scoring criteria for each question/criteria; a prescribed set of questions/criteria which specifically address the defined goals of the PDR; and a weighting factor for each question/criteria to accurately reflect the significance of each element in regard to the overall evaluation.

An output of the PDR scorecard may be an Overall Review Score such as between 0 and 100 which: rates the quality of the material presented at the PDR, specifies the issues and defects that were discovered during the PDR, and states the technical risk associated with the system requirements baseline that was presented at the PDR.

The Overall Review Score may be mapped to "Red" (critical), "Yellow" (caution), "Green" (satisfactory) status for a summary assessment of the overall condition of the project. The PDR scorecard (see FIG. 4G) automatically generates a "spider chart" (See FIG. 4H) as a graphical representation of the scoring per criteria. The spider chart is a visual reference to highlight the problem areas discovered during the PDR and measured by the Overall Review Score for the PDR.

Develop and Test Components (Step 500)

FIGS. 5A-5H depict details associated with step 500 of FIG. 1, namely the step of developing and testing components, in accordance with embodiments of the present invention. This step includes verifying the component design and creating a design baseline, which includes developing component designs compatible with the component requirements and developing test plans for testing the component designs. The component requirements are decomposed into the component designs and the test plans. Developing the component designs and the test plans include reviewing the component designs and test plans for acceptability in accordance with Critical Design Review (CDR) exit criteria.as will be discussed infra.

Figure 5A:
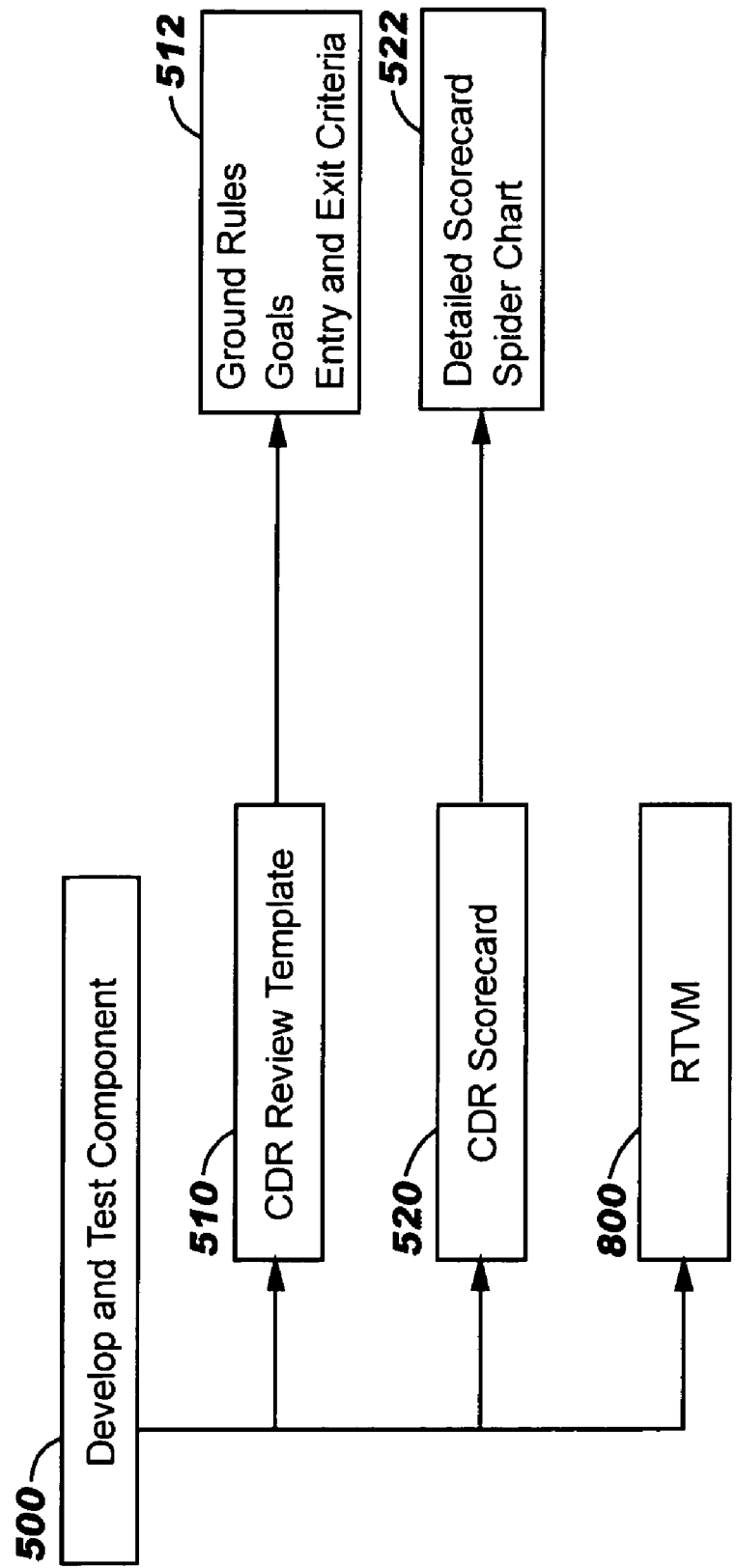

FIG. 5A illustrates three aspects of step 500 to be utilized in developing and testing components which verify the component requirements as baselined in the PDR, so as to ensure that the component design satisfies the component requirements. The three aspects are: a CDR template 510, a CDR scorecard 520, and the RTVM 800. The CDR template 510 has CDR aspects 512, which include an establishment and review of ground rules, goals, PDR entry criteria, and CDR exit criteria. The ground rules are rules to be followed during the conduct of the CDR and are intended to provide the systems engineer conducting the review with a clear set of instructions for what the content of the review should or should not include. The CDR entry criteria denotes criteria to be satisfied in order to conduct the CDR. The CDR exit criteria denotes criteria to be satisfied in order to complete the CDR. Satisfying the CDR entry criteria and CDR exit criteria requires an objective standard, such as achieving a minimum score relating to the extent to which the CDR entry criteria and CDR exit criteria are satisfied. The present invention teaches use of a scorecard for implementing an objective scoring standard in terms of a numerical score, namely the CDR scorecard 520. The CDR scorecard 520 has aspects 522, which include a detailed scorecard and an associated spider chart (described infra in conjunction with FIGS. 5G and 5H, respectively). Upon completion of the CDR, the RTVM 800 is updated to record the changes from the CDR as described infra in conjunction with FIGS. 8A-8H.

Figure 5B:
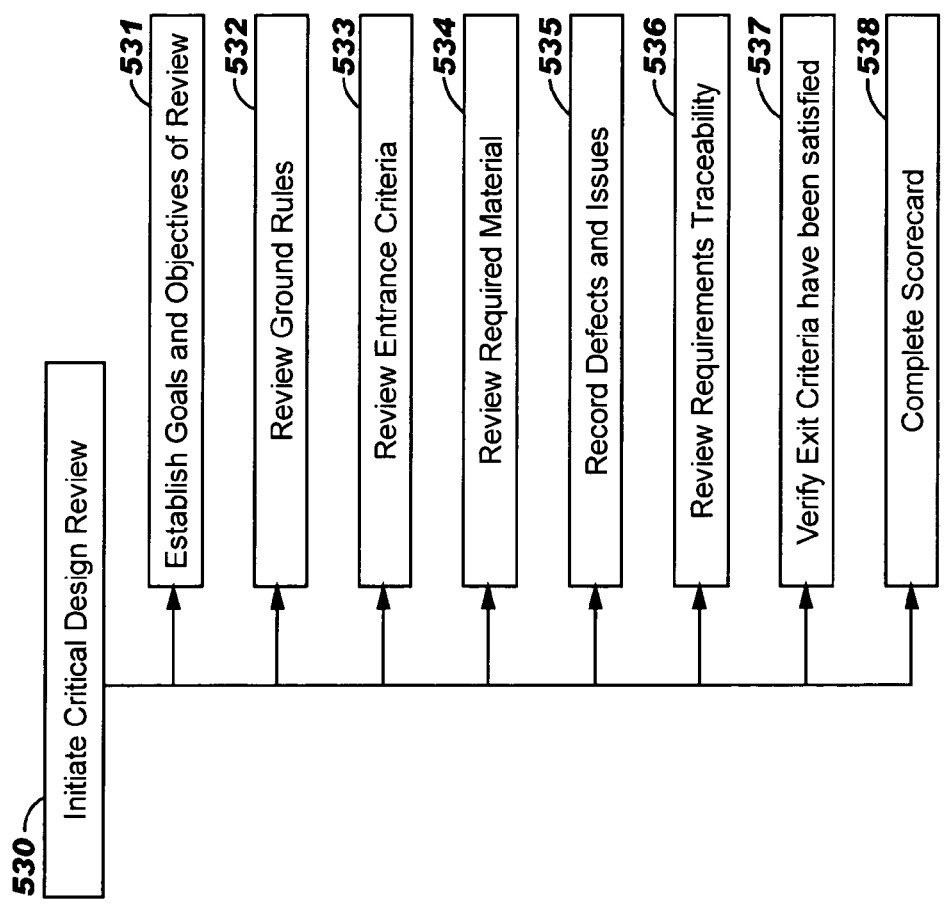

FIG. 5B depicts process steps 530-538 of the CDR. Step 530 initiates the CDR. Steps 531-538 follow step 530. Updating the RTVM 800 (see FIG. 5A) is the final process step of the CDR after steps 531-538 have been completely executed and includes updating the RTVM 800 with verification information relating to the component designs and associated test plans. Step 531 establishes goals and objectives of the CDR, as described infra in conjunction with FIG. 5C. Step 532 establishes the ground rules for conducting the CDR, as described infra in conjunction with FIG. 5D. Step 533 reviews the CDR entry criteria for conducting the CDR, as described infra in conjunction with FIGS. 5E-5F. Step 534 presents materials needed for conducting the CDR session, as described infra in conjunction with FIGS. 5E-5F. Step 535 records defects and issues which emerge during the conduct of steps 531-534 and 536-538. Step 536 utilizes the RTVM 800 (see FIG. 5A) to review the requirements traceability with respect to the business requirements, system requirements, component requirements, component architecture, component design and developing and testing components in relation to the components design. Steps 537 initiates verification that the CDR exit criteria have been satisfied, as described infra in conjunction with FIGS. 5E-5F. Step 538 determines objectively in terms of a quantitative metric whether the CDR exit criteria have been satisfied. If step 538 determines that the CDR exit criteria have been satisfied, then steps 531-538 are exited and the RTVM 800 is updated to record the changes from the CDR as described infra in conjunction with FIGS. 8A-8H. If step 538 determines that the CDR exit criteria have not been satisfied, then steps 531-538 are selectively re-executed iteratively until step 538 determines that the CDR exit criteria have been satisfied. Note that there is no required sequential order for executing steps 531-538, and the scope of the present invention includes execution of steps 531-538 in any desired order, including the possibility of concurrent performance of some of the steps. The defects and issues recorded in step 535 provide logical and intuitive guidelines for executing steps 531-538 in an order that makes sense in light of the identified defects and issues. For example, if the defect or issue relates to an inconsistency between a component design and a particular goal, then it may be appropriate to revisit steps 531 and 537 iteratively until consistency is established between the component design and the particular goal, which in turn leads to satisfying the CDR exit criteria.

FIG. 5C describes establishing goals and objectives of the CDR (see step 531 of FIG. 5B). The systems engineer conducting the CDR can select from the list of goals for any CDR held. These goals are intended to provide a guide to the activities the systems engineer will need to accomplish in order to complete the CDR. This list of goals can be tailored to each project. It is a goal in FIG. 5C to present and review component designs and component e2e test plans, to include production infrastructure capacities, with a focus on documentation relating to a delivered solution. As described in FIG. 5C, the establishing of goals and objectives of the CDR include to: review and approve component designs; review and approve component detailed test plans; establish traceability between component designs and end-to-end functionality and the system level acceptance criteria; establish the design baseline; identify technical risks; review mitigation plans to offset risk; identify dependencies; identify technical performance measures, and verify production infrastructure capacity supports system requirements.

FIG. 5D describes a review of ground rules to be followed during the conduct of the CDR (see step 531 of FIG. 5B). The indicated ground rules comprise: review documentation and address the listed concerns; and key members of the software development, test, production, and SDC→hardware teams are present during the CDR and agree with→approve the design baseline. The "key" members of the software development are defined as representatives of software development.

FIGS. 5E-5F collectively describe a review of CDR entry criteria for the CDR (see step 533 of FIG. 5B), CDR presentation content (see step 534 of FIG. 5B), and CDR exit criteria for the CDR (see step 537 of FIG. 5B). The CDR entry criteria, CDR presentation content, and CDR exit criteria are intended as a guide for the systems engineer conducting the CDR. The items listed in the Entry Criteria column are the documents and activities that must be completed prior to the start of the CDR. The items listed in the Presentation column are the documents and work products that must be presented to the stakeholders and team members attending the CDR. The items listed in Exit Criteria column are the activities and documents that must be completed before the review is considered complete. In FIGS. 5E-5F, the CDR entry criteria, CDR presentation content, and CDR exit criteria each pertain to the CDR criteria categories of: system and components requirement review; physical component design and test review; service delivery center; system testing; data load (test); and data load (production). The detailed descriptions and explanations of the CDR presentation content and the CDR entry criteria and CDR exit criteria within each CDR criteria category are contained within FIGS. 5E-5F.

FIG. 5G depicts a detailed scorecard (see step 538 of FIG. 5B) for scoring performance relating to the CDR exit criteria in the CDR exit criteria categories of FIGS. 5E-5F. The CDR criteria categories in FIG. 5G (called "scorecard criteria") are: system components requirement review; component design and test; service delivery center/operations and delivery organization; system testing; data load (test); and data load (production). In FIG. 5G, each CDR criteria category includes one or more criteria. For example, the CDR criteria category of system testing includes the criteria of: test plans traceable to system/component requirements and acceptance criteria; and facilitate the testing of end-to-end functionality and solution delivery. The criteria for each CDR criteria category in FIG. 5G reflects the criteria within the corresponding CDR exit criteria category of FIGS. 5E-5F. Each criteria in FIG. 5G is scored and each criteria is assigned a weight. The scores in FIG. 5G are analogous to the scores in FIG. 2F described supra. The meaning and use of the weights and the interpretation of the "Weighting Factor", "CDR Score", and "USE THIS COLUMN TO ENTER SCORES" columns in FIG. 5G are analogous to the corresponding columns of FIG. 2F described supra. Similarly, the Overall Review Score in FIG. 5G is analogous to the corresponding Overall Review Score in FIG. 2F described supra and may be computed by any of the techniques described supra for computing the Overall Review Score relating to the BRR.

Various algorithms may be used to determine whether the CDR process has been successfully completed. In a first exemplary algorithm, the CDR process has been successfully completed if the Overall Review Score is no less than a predetermined threshold score (e.g., 85, within a range of 85 to 100, etc.). In a second algorithm, the CDR process has been successfully completed if each criteria category score satisfies a given threshold score (e.g., 85, within a range of 80 to 90, etc.), and the given threshold score may be constant or criteria dependent or criteria category dependent. In a third algorithm, the CDR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the CDR process has not been successfully completed, then steps 531-538 are selectively re-executed iteratively until the pertinent algorithm determines that the CDR process has been successfully completed.

FIG. 5H is a spider chart for graphically representing the CDR criteria category scores tabulated in the scorecard of FIG. 5G. Each axis of FIG. 5H represents a CDR criteria category of FIG. 5G such that points 5A, 5B, 5C, 5D, 5E, and 5F respectively represent the CDR scores of the CDR criteria category of: system and components requirement review; component design and test review; service delivery center/operations and delivery organization; system testing; data load (test); and data load (production). The dashed polygons identify the scores at the intersections between the dashed polygons and the four axes. The points 5A, 5B, 5C, 5D, 5E, and 5F define a polygon 5P that is useful for visualizing the CDR criteria category scores relative to each other and also for visualizing the score of each CDR criteria category in relation to the pertinent threshold score (e.g., 85). Although not shown in FIG. 5H, a threshold score to ultimately be satisfied by the CDR criteria category scores and/or Overall Review Score could also be represented on FIG. 5H. For example, if the threshold score for the Overall Review Score is 85, then a heavily bolded polygon having the value 85 (i.e., between the dashed polygons having values of 80 and 90), could be superimposed onto FIG. 5H. The spider chart of FIG. 5H may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the CDR entry criteria of FIGS. 5E-5F in a manner analogous to the use of the detailed scorecard and spider chart of FIGS. 5G and 5H, respectively, in relation to scoring performance for the CDR exit criteria of FIGS. 5E-5F.

If the pertinent algorithm determines that the CDR process has been successfully completed, then the RTVM is next updated as described infra in conjunction with FIGS. 8A-8H, followed by execution of the Test System step 600 of FIG. 1.

In accordance with the preceding discussion, the Develop and Test Components step 500 (see FIG. 1) of the SE process reviews developing and testing a component solution which satisfies the component requirements as baselined in the CDR. The Critical Design Review (CDR) template, along with the CDR scorecard, and the RTVM are used to define the component solution and test plan to meet the component requirements. The CDR template maps out clear, specific steps to evaluate the component design. The CDR Scorecard quantitatively measures how well the component design meets the component requirements. The RTVM provides traceability from the assigned requirements to the design elements and test methods to ensure that all requirements can be validated. The present invention enables both the SE team and the customer to agree on the scope of the system and formally baseline the technical scope of the project. The present invention provides a structured guide to the work required to complete the Develop and Test Components step 500 step in accordance with a measurable standard with which to determine the readiness and risk to proceed forward with the project.

The CDR template provides standardization and replication of the CDR review steps for any project using the SE process by dictating the detailed content and specific sequence of the CDR. This results in a measurable improvement in quality, content and consistency of all CDRs. A goal of the CDR is to establish and formally baseline the component design and test plan. Successful completion of the CDR will reduce project risk by identifying defects and issues. Successful completion of the CDR is achieved when a sufficient number of defects and issues have been resolved to obtain a success score as described supra in conjunction with FIG. 5G.

To achieve successful completion of the CDR, the present invention lists clear, standardized objectives and ground rules for the CDR to ensure the review goals are met.

To achieve successful completion of the CDR, the present invention also establishes a standardized set of CDR entry criteria, CDR presentation content, and CDR exit criteria that must be met in order to successfully complete the review. The CDR entry criteria list the information to be presented within the review. The CDR presentation material further clarifies what information should be presented and how it can be presented. The CDR exit criteria delineate the requirements for accepting the technical information as complete. If the level of detail required in the template is not available, then the practitioner is not ready to hold a CDR.

To achieve successful completion of the CDR, the present invention also requires completion of the CDR scorecard to provide a measurable evaluation of the review's success.

When the CDR is conducted as described herein, a list of defects and issues is recorded as well as a quantitative measure (i.e., score) which evaluates the content and completeness of the component design. The score is tied to the defects and issues that have been recorded. Correction of the defects and resolution of the issues are essential to the creation of the component design. As the defects are corrected and the issues resolved the CDR criteria are periodically reapplied to evaluate the content and completeness of the design and a new quantitative measure is developed. The quantitative measure is used to identify and quantify risk. The component design is not baselined until a minimum success score (i.e., minimum acceptable score success score—e.g., 85, 80-90, or 85-100 in the Overall Review Score of FIG. 5G) has been achieved.

The CDR scorecard is a quantitative and consistent method to measures the quality and completeness of the project's system and component requirements, component design, and test and production plans according to a comprehensive set of criteria. The CDR scorecard provides a mechanism for scoring the component baseline for accuracy, completeness, quality and risk.

The CDR scorecard contains the CDR criteria and weighting in a software tool (e.g., a commercially available tool such as the Microsoft Excel® spreadsheet tool) to quickly and uniformly generate a review score. The success criteria can be easily tailored to address specific project complexity or scope situations. Using a uniform (i.e, project independent) criteria allows teams to conduct analysis across all projects and develop organization lessons learned with corrective actions. However, the scope of the present invention also includes embodiments in which the success criteria are project dependent.

The present invention measures the quality of the prescribed CDR exit criteria by providing: guidelines for performing the scoring; a prescribed set of scoring criteria for each question; a prescribed set of questions which specifically address the defined goals of the CDR; and a weighting factor for each question to accurately reflect the significance of each element in regard to the overall evaluation.

An output of the CDR scorecard may be an Overall Review Score (see FIG. 5G) such as between 0 and 100 which: rates the quality of the material presented at the CDR; specifies the issues and defects that were discovered during the CDR; and states the technical risk associated with the component requirements baseline that was presented at the CDR.

The Overall Review Score may be mapped to "Red" (critical), "Yellow" (caution), "Green" (satisfactory) status for a summary assessment of the overall condition of the project. The CDR scorecard automatically generates a "spider chart" (see FIG. 5G) as a graphical representation of the scoring per criteria. The spider chart is a visual reference to highlight the problem areas discovered during the CDR and measured by the Overall Review Score for the CDR.

Test System (Step 600)

FIGS. 6A-6G depict details associated with step 600 of FIG. 1, namely the step of testing the system, in accordance with embodiments of the present invention.

Figure 6A:
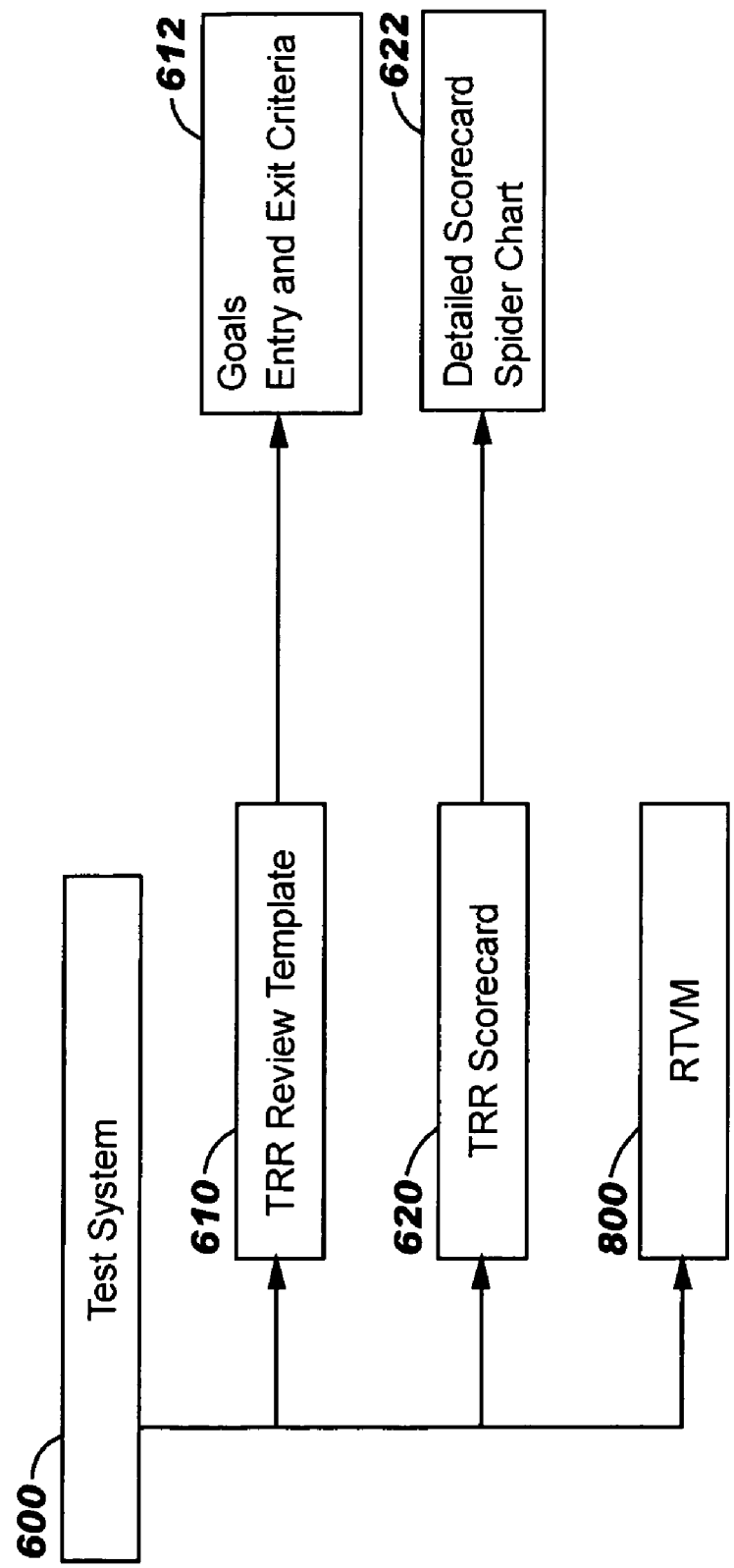

FIG. 6A illustrates three aspects of step 600 to be utilized in developing and testing components which satisfies the component requirements as baselined in the PDR, namely a Test Readiness Review (TRR) template 610, a TRR scorecard 620, and the RTVM 800. The TRR template 610 has TRR aspects 612, which include goals, TRR entry criteria, and TRR exit criteria. The TRR entry criteria denote criteria to be satisfied in order to conduct the TRR. The TRR exit criteria denote criteria to be satisfied in order to complete the TRR. Satisfying the TRR entry criteria and TRR exit criteria requires an objective standard, such as achieving a minimum score relating to the extent to which the TRR entry criteria and TRR exit criteria are satisfied. The present invention teaches use of a scorecard for implementing an objective scoring standard in terms of a numerical score, namely the TRR scorecard 620. The TRR scorecard 620 has aspects 622, which include a detailed scorecard and an associated spider chart (described infra in conjunction with FIGS. 6F and 6G, respectively). Upon completion of the TRR, the RTVM 800 is updated to record the results of the TRR as described infra in conjunction with FIGS. 8A-8H.

Figure 6B:
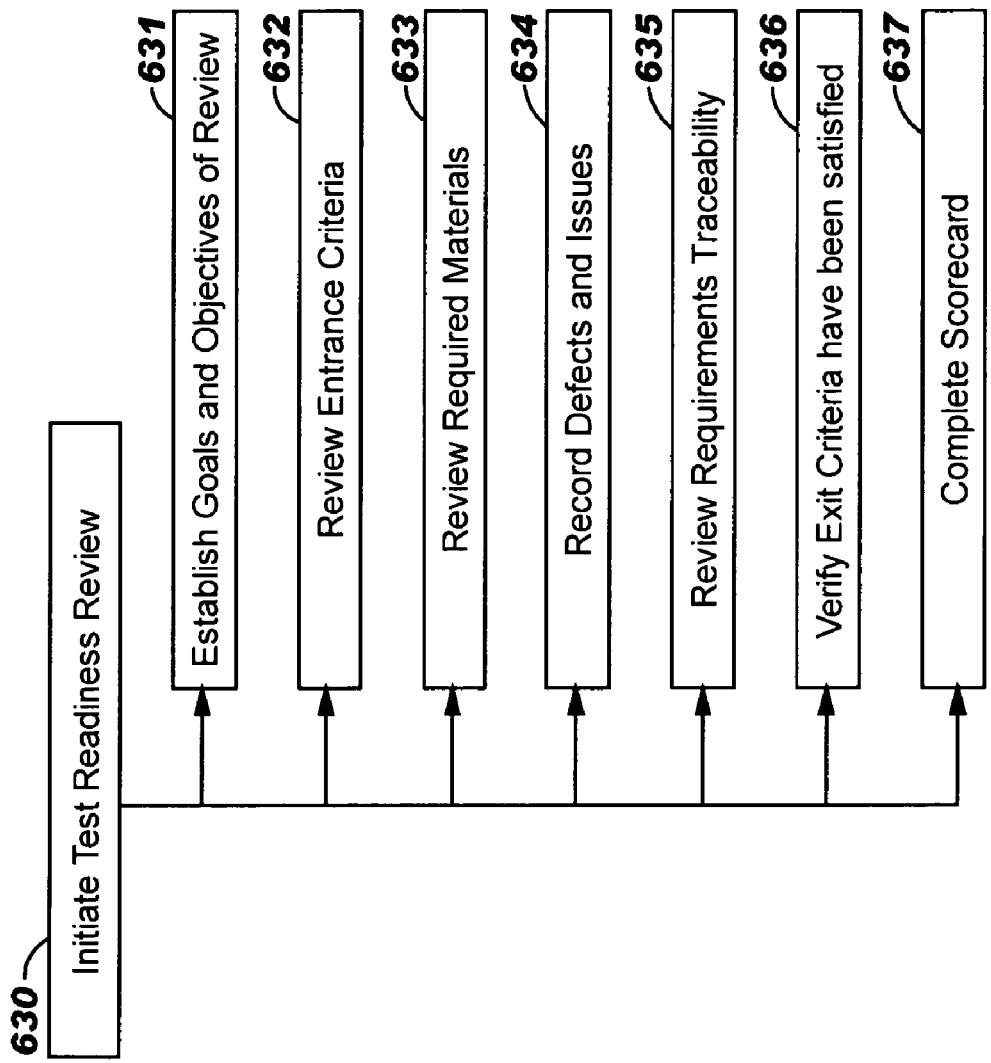

FIG. 6B depicts process steps 630-637 of the TRR. Step 630 initiates the TRR. Steps 631-637 follow step 630. Updating the RTVM 800 (see FIG. 6A) is the final process step of the TRR after steps 631-637 have been completely executed. Step 631 establishes goals and objectives of the TRR, as described infra in conjunction with FIG. 6C. Step 632 reviews the TRR entry criteria for conducting the TRR, as described infra in conjunction with FIGS. 6D-6E. Step 633 presents materials needed for conducting the TRR session, as described infra in conjunction with FIGS. 6D-6E. Step 634 records defects and issues which emerge during the conduct of steps 631-633 and 635-637. Step 635 utilizes the RTVM 800 (see FIG. 6A) to review the requirements traceability with respect to the business requirements, system requirements, component requirements, developing and testing components, and testing the system. Step 636 initiates verification that the TRR exit criteria have been satisfied, as described infra in conjunction with FIGS. 6D-6E. Step 637 determines objectively in terms of a quantitative metric whether the TRR exit criteria have been satisfied. If step 637 determines that the TRR exit criteria have been satisfied, then steps 631-637 are exited and the RTVM 800 is updated to record the results of the TRR as described infra in conjunction with FIGS. 8A-8H. If step 637 determines that the TRR exit criteria have not been satisfied, then steps 631-637 are selectively re-executed iteratively until step 637 determines that the TRR exit criteria have been satisfied. Note that there is no required sequential order for executing steps 631-637 and the scope of the present invention includes execution of steps 631-637 in any desired order, including the possibility of concurrent performance of some of the steps. The defects and issues recorded in step 634 may provide logical and intuitive guidelines for executing steps 631-637 in an order that makes sense in light of the identified defects and issues. For example, if the defect or issue relates to an inconsistency between a TRR exit criteria and a particular goal, then it may be appropriate to revisit steps 631 and 636 iteratively until consistency is established between the TRR exit criteria and the particular goal.

FIG. 6C describes establishing goals and objectives of the TRR (see step 631 of FIG. 6B). The systems engineer conducting the TRR can select from the list of goals for any TRR held. These goals are intended to provide a guide to the activities the systems engineer will need to accomplish in order to complete the TRR. This list of goals can be tailored to each project. The goals in FIG. 6C include to: create a test baseline, verify that test entry criteria has been met for each application and document exception; verify test environment and data readiness; verify test team readiness; and obtain customer and solution project manager approval for test execution readiness.

FIGS. 6D-6E collectively describe a review of TRR entry criteria for the TRR (see step 632 of FIG. 6B), TRR presentation content (see step 633 of FIG. 6B), and review of TRR exit criteria for the TRR (see step 636 of FIG. 6B). The TRR entry criteria, TRR presentation content, and TRR exit criteria are intended as a guide for the systems engineer conducting the TRR. The items listed in the Entry Criteria column are the documents and activities that must be completed prior to the start of the TRR. The items listed in the Presentation column are the documents and work products that must be presented to the stakeholders and team members attending the TRR. The items listed in Exit Criteria column are the activities and documents that must be completed before the review is considered complete. In FIGS. 6D-6E, the TRR entry criteria, TRR presentation content, and TRR exit criteria each pertain to the CDR criteria categories of: test strategy; test requirements verification matrix; application readiness; test environment readiness; and test team readiness. The detailed descriptions and explanations of the TRR presentation content and the TRR entry criteria and TRR exit criteria within each CDR criteria category are contained within FIGS. 6D-6E.

FIG. 6F depicts a detailed scorecard (see step 637 of FIG. 6B) for scoring performance relating to the TRR exit criteria in the TRR exit criteria categories of FIGS. 6D-6E. The TRR criteria categories in FIG. 6F (called "scorecard criteria") are: test strategy; test requirements verification matrix; application readiness; test environment readiness; and test team readiness. In FIG. 6F, each TRR criteria category includes one or more criteria. For example, the TRR criteria category of test strategy includes the criteria of: test schedule; problem, defects, turnaround times by severity; and documented technical risks, dependencies, and migration plans. The criteria for each TRR criteria category in FIG. 6F reflects the criteria within the corresponding TRR exit criteria category of FIGS. 6E-6F. Each criteria in FIG. 6GF is scored and each criteria is assigned a weight. The scores in FIG. 6F are analogous to the scores in FIG. 2F described supra. The meaning and use of the weights and the interpretation of the "Weighting Factor", "TRR Score", and "USE THIS COLUMN TO ENTER SCORES" columns in FIG. 6F are analogous to the corresponding columns of FIG. 2F described supra. Similarly, the Overall Review Score in FIG. 6F is analogous to the corresponding Overall Review Score in FIG. 2F described supra and may be computed by any of the techniques described supra for computing the Overall Review Score relating to the BRR.

Various algorithms may be used to determine whether the TRR process has been successfully completed. In a first exemplary algorithm, the TRR process has been successfully completed if the Overall Review Score is no less than a predetermined threshold score (e.g., 85, within a range of 85 to 100, etc.). In a second algorithm, the TRR process has been successfully completed if each criteria category score satisfies a given threshold score (e.g., 85, within a range of 80 to 90, etc.), and the given threshold score may be constant or criteria dependent or criteria category dependent. In a third algorithm, the TRR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the TRR process has not been successfully completed, then steps 631-637 are selectively re-executed iteratively until the pertinent algorithm determines that the TRR process has been successfully completed.

Figure 6G:
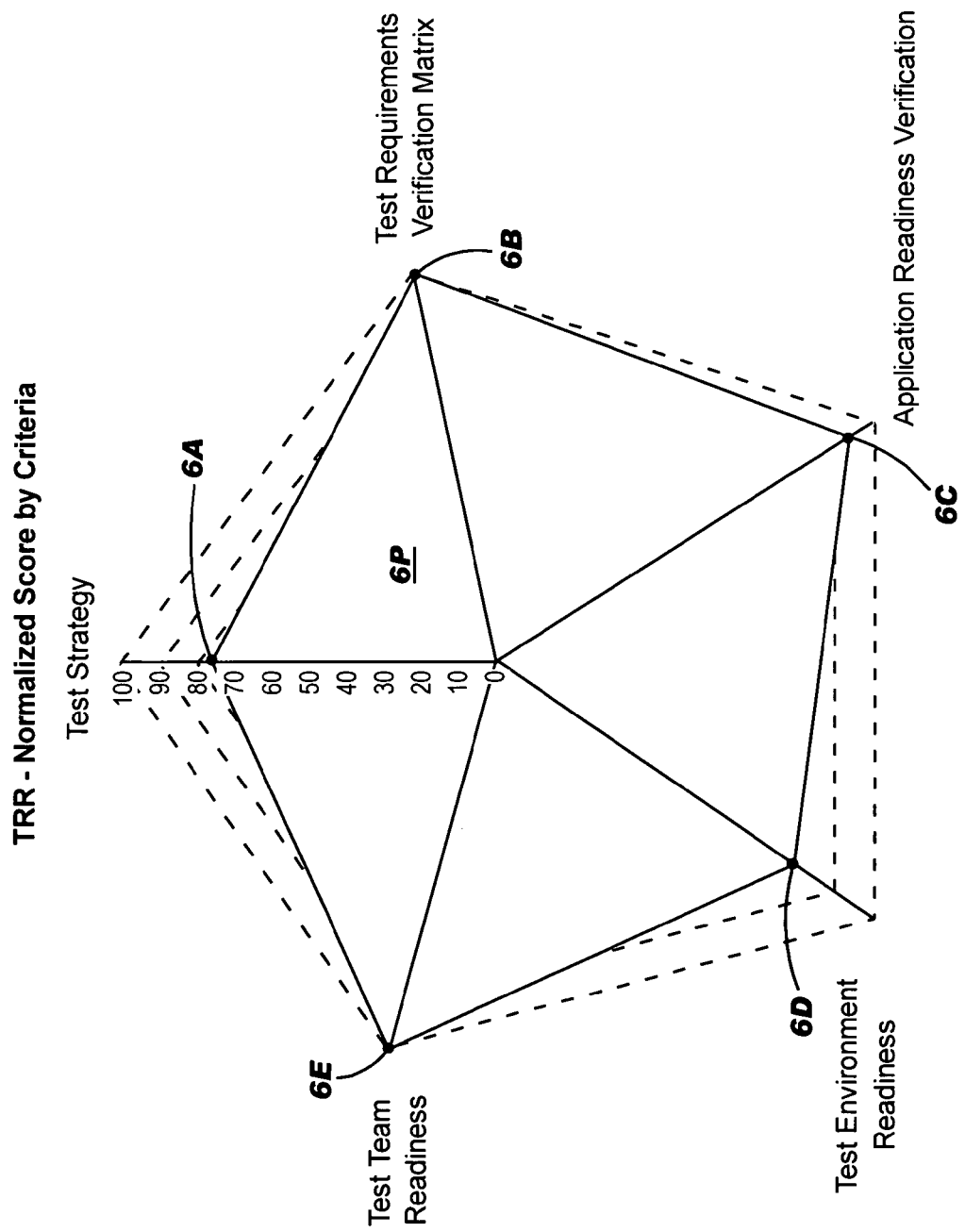

FIG. 6G is a spider chart for graphically representing the TRR criteria category scores tabulated in the scorecard of FIG. 6G. Each axis of FIG. 6G represents a TRR criteria category of FIG. 6F such that points 6A, 6B, 6C, 6D, and 6E respectively represent the TRR scores of the TRR criteria category of: test strategy; test requirements verification matrix; application readiness; test environment readiness; and test team readiness. The dashed polygons identify the scores at the intersections between the dashed polygons and the four axes. The points 6A, 6B, 6C, 6D, and 6E define a polygon 6P that is useful for visualizing the TRR criteria category scores relative to each other and also for visualizing the score of each TRR criteria category in relation to the pertinent threshold score (e.g., 85). Although not shown in FIG. 6G, a threshold score to ultimately be satisfied by the TRR criteria category scores and/or Overall Review Score could also be represented on FIG. 6G. For example, if the threshold score for the Overall Review Score is 85, then a heavily bolded polygon having the value 85 (i.e., between the dashed polygons having values of 80 and 90), could be superimposed onto FIG. 6G. The spider chart of FIG. 6G may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the TRR entry criteria of FIGS. 6D-6E in a manner analogous to the use of the detailed scorecard and spider chart of FIGS. 6F and 6G, respectively, in relation to scoring performance for the TRR exit criteria of FIGS. 6D-6E.

If the pertinent algorithm determines that the TRR process has been successfully completed, then the RTVM is next updated as described infra in conjunction with FIGS. 8A-8H, followed by execution of the Put System into Production step 700 of FIG. 1.

In accordance with the preceding discussion, the Test System step 600 (see FIG. 1) of the SE process reviews testing the system. The Test Readiness Review (TRR) template, along with the TRR scorecard, and the RTVM are used to establish and agree on the test plan for the system. The TRR template maps out a clear, specific set of steps to evaluate the system test plan. The TRR Scorecard quantitatively measures how well the test plan defines the methods, test articles, procedures and environment that will be used to verify that the IT solution meets the requirements. The RTVM provides traceability from the assigned requirements to the design elements and test methods to ensure that all requirements can be validated. The present invention enables both the SE team and the customer to agree on the total testing of the system prior to starting any tests. The present invention provides a structured guide to the work required to complete this step of the SE process and a measurable standard with which to determine the readiness and risk to proceed forward with the project.

The TRR template provides standardization and replication of the TRR review steps for any project using the SE process by dictating the detailed content and specific sequence of the TRR. This results in a measurable improvement in quality, content and consistency of all TRRs. A goal of the TRR is to establish the system test plan. Successful completion of the TRR will reduce project risk by identifying defects and issues. Successful completion of the TRR is achieved when a sufficient number of defects and issues have been resolved to obtain a success score as described supra in conjunction with FIG. 6F.

To achieve successful completion of the TRR, the present invention lists clear, standardized objectives for the TRR to ensure the review goals are met.

To achieve successful completion of the TRR, the present invention also establishes a standardized set of TRR entry criteria, TRR presentation content and TRR exit criteria that must be met in order to successful complete the review. The TRR entry criteria list the information to be presented within the review. The TRR presentation material further clarifies what information should be presented and how it can be presented. The TRR exit criteria delineate the requirements for accepting the technical information as complete. If the level of detail required in the template is not available, then the practitioner is not ready to hold an TRR.

To achieve successful completion of the TRR, the present invention also requires completion of the TRR scorecard to provide a measurable evaluation of the review's success.

When the TRR is conducted via the method described herein, a list of defects and issues is recorded as well as a quantitative measure (score) which evaluates the content and completeness of the test plan. The score is tied to the defects and issues that have been recorded. Correction of the defects and resolution of the issues are essential to the creation of the test plan. As the defects are corrected and the issues resolved the TRR criteria are periodically reapplied to evaluate the content and completeness of the requirements and a new quantitative measure is developed. The quantitative measure is used to identify and quantify risk. The test plan is not baselined until a minimum success score (i.e., minimum acceptable success score; e.g., 85, 80-90, or 85-100 in the Overall Review Score of FIG. 6F) has been achieved.

The TRR scorecard is a quantitative and consistent method to measure the quality and completeness of the project's applications, test environment, test strategy and test requirements according to a comprehensive set of criteria. It provides a mechanism for scoring the test plan for accuracy, completeness, quality and risk. The TRR scorecard contains the BRR criteria and weighting in a software tool (e.g., a commercially available tool such as the Microsoft Excel® spreadsheet tool) to quickly and uniformly generate a review score. The criteria can be easily tailored to address specific project complexity or scope situations. Using a uniform (i.e., project independent) criteria allows teams to conduct analysis across all projects and develop organization lessons learned with corrective actions. However, the scope of the present invention also includes embodiments in which the success criteria are project dependent.

The present invention measures the quality of the prescribed TRR exit criteria by providing: guidelines for performing the scoring; a prescribed set of scoring criteria for each question; a prescribed set of questions which specifically address the defined goals of the TRR; and a weighting factor for each question to accurately reflect the significance of each element in regard to the overall evaluation.

An output of the TRR scorecard is an Overall Review Score (see FIG. 6F) such as between 0 and 100 which: rates the quality of the material presented at the review; specifies the issues and defects that were discovered during the review; and states the technical risk associated with the test plan presented at the review.

The Overall Review Score may be mapped to "Red" (critical), "Yellow" (caution), "Green" (satisfactory) status for a summary assessment of the overall condition of the project. The TRR scorecard automatically generates a "spider chart" (see FIG. 6G) as a graphical representation of the scoring per criteria. The spider chart is a visual reference to highlight the problem areas discovered during the TRR and measured by the Overall Review Score for the TRR.

Put System into Production (Step 700)

FIGS. 7A-7G depict details associated with step 700 of FIG. 1, namely the step of putting the system into production, in accordance with embodiments of the present invention.

Figure 7A:
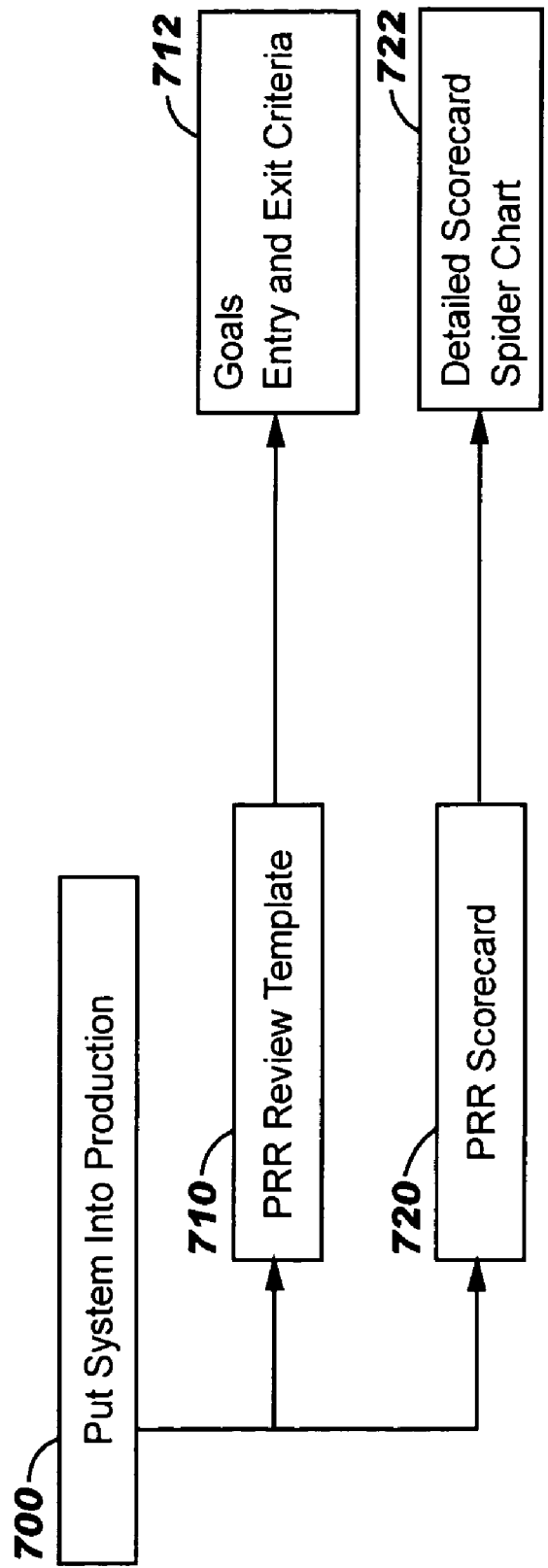

FIG. 7A illustrates two aspects of step 700 to be utilized in putting the system into production, namely a Production Readiness Review (PRR) template 710 and a PRR scorecard 720. The PRR template 710 has PRR aspects 712, which include goals, PRR entry criteria, and PRR exit criteria. The PRR entry criteria denote criteria to be satisfied in order to conduct the PRR. The PRR exit criteria denote criteria to be satisfied in order to complete the PRR. Satisfying the PRR entry criteria and PRR exit criteria requires an objective standard, such as achieving a minimum score relating to the extent to which the PRR entry criteria and PRR exit criteria are satisfied. The present invention teaches use of a scorecard for implementing an objective scoring standard in terms of a numerical score, namely the PRR scorecard 720. The PRR scorecard 720 has aspects 722, which include a detailed scorecard and an associated spider chart (described infra in conjunction with FIGS. 7F and 7G, respectively).

Figure 7B:
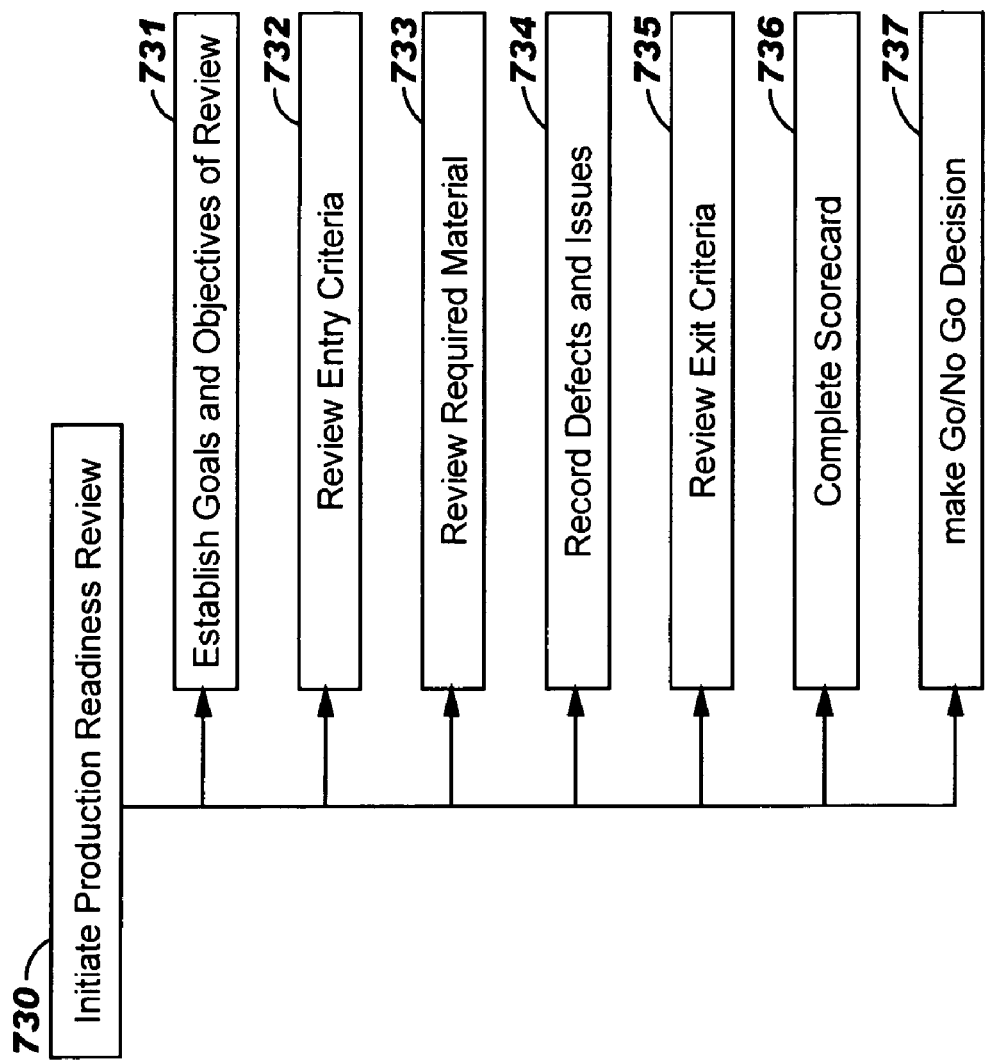

FIG. 7B depicts process steps 730-737 of the PRR. Step 730 initiates the PRR. Steps 731-737 follow step 730. Step 731 establishes goals and objectives of the PRR, as described infra in conjunction with FIG. 7C. Step 732 reviews the PRR entry criteria for conducting the PRR, as described infra in conjunction with FIGS. 7D-7E. Step 733 presents materials needed for conducting the PRR session, as described infra in conjunction with FIGS. 7D-7E. Step 734 records defects and issues which emerge during the conduct of steps 731-733 and 735-736. Step 735 initiates verification that the PRR exit criteria have been satisfied, as described infra in conjunction with FIGS. 7D-7E. Step 736 determines objectively in terms of a quantitative metric whether the PRR exit criteria have been satisfied. If step 736 determines that the PRR exit criteria have been satisfied, then steps 731-736 are exited and step 737 is next executed. If step 736 determines that the PRR exit criteria have not been satisfied, then steps 731-736 are selectively re-executed iteratively until step 736 determines that the PRR exit criteria have been satisfied. Note that there is no required sequential order for executing steps 731-736 and the scope of the present invention includes execution of steps

731-736 in any desired order, including the possibility of concurrent performance of some of the steps. The defects and issues recorded in step 734 may provide logical and intuitive guidelines for executing steps 731-736 in an order that makes sense in light of the identified defects and issues. For example, if the defect or issue relates to an inconsistency between a PRR exit criteria and a particular goal, then it may be appropriate to revisit steps 731 and 735 iteratively until consistency is established between the PRR exit criteria and the particular goal. Step 737 makes a Go/No Go decision as to whether to put the system into production.

FIG. 7C describes establishing goals and objectives of the PRR (see step 731 of FIG. 7B). The systems engineer conducting the PRR can select from the list of goals for any PRR held. These goals are intended to provide a guide to the activities the systems engineer will need to accomplish in order to complete the PRR. This list of goals can be tailored to each project. The goals in FIG. 7C include to: verify that the release is ready to be installed into production by reviewing release content, test results (functional tests, performance tests, pre-production tests), expected system availability/performance/response times; and decide whether the release is ready for production based on the completeness of the material and the number of open defects resulting from the review.

FIGS. 7D-7E collectively describe a review of PRR entry criteria for the PRR (see step 732 of FIG. 7B), PRR presentation content (see step 733 of FIG. 7B), and review of PRR exit criteria for the PRR (see step 735 of FIG. 7B). The PRR entry criteria, PRR presentation content, and PRR exit criteria are intended as a guide for the systems engineer conducting the PRR. The items listed in the Entry Criteria column are the documents and activities that must be completed prior to the start of the PRR. The items listed in the Presentation column are the documents and work products that must be presented to the stakeholders and team members attending the PRR. The items listed in Exit Criteria column are the activities and documents that must be completed before the review is considered complete. In FIGS. 7D-7E, the PRR entry criteria, PRR presentation content, and PRR exit criteria each pertain to the TRR criteria categories of: requirements/architecture; test; move to production; production readiness; and project risks to production. The detailed descriptions and explanations of the PRR presentation content and the PRR entry criteria and PRR exit criteria within each PRR criteria category are contained within FIGS. 7D-7E.

FIG. 7F depicts a detailed scorecard (see step 736 of FIG. 7B) for scoring performance relating to the PRR exit criteria in the PRR exit criteria categories of FIGS. 7D-7E. The PRR criteria categories in FIG. 7F (called "scorecard criteria") are: requirements/architecture; test; move to production; production readiness; and project risks to production. In FIG. 7F, each PRR criteria category includes one or more criteria. For example, the PRR criteria category of "move to production" includes the criteria of: major move to production milestones defined; move to production application and contacts defined; time line defined; move to production deliverables defined; and Governance needs met. The criteria for each PRR criteria category in FIG. 7F reflects the criteria within the PRR exit criteria categories of FIGS. 7D-7E. Each criteria in FIG. 7F is scored and each criteria is assigned a weight. The scores in FIG. 7F are analogous to the scores in FIG. 2F described supra. The meaning and use of the weights and the interpretation of the "Weighting Factor", "PRR Score", and "USE THIS COLUMN TO ENTER SCORES" columns in FIG. 7F are analogous to the corresponding columns of FIG. 2F described supra. Similarly, the Overall Review Score in FIG. 7F is analogous to the corresponding Overall Review Score in FIG. 2F described supra and may be computed by any of the techniques described supra for computing the Overall Review Score relating to the BRR.

Various algorithms may be used to determine whether the PRR process has been successfully completed. In a first exemplary algorithm, the PRR process has been successfully completed if the Overall Review Score is no less than a predetermined threshold score (e.g., 85, within a range of 85 to 100, etc.). In a second algorithm, the PRR process has been successfully completed if each criteria category score satisfies a given threshold score (e.g., 85, within a range of 80 to 90, etc.), and the given threshold score may be constant or criteria dependent or criteria category dependent. In a third algorithm, the PRR process has been successfully completed if each criteria category score satisfies a given threshold score and if the Overall Review Score is no less than a predetermined threshold score. Additional algorithms may impose scoring thresholds on some or all of the criteria and/or criteria categories. If the algorithm determines that the PRR process has not been successfully completed, then steps 731-736 are selectively re-executed iteratively until the pertinent algorithm determines that the PRR process has been successfully completed.

FIG. 7G is a spider chart for graphically representing the PRR criteria category scores tabulated in the scorecard of FIG. 7F. Each axis of FIG. 7G represents a PRR criteria category of FIG. 7F such that points 7A, 7B, 7C, 7D, and 7E respectively represent the SRR scores of the PRR criteria category of: requirements/architecture; test; move to production; production readiness; and project risks to production. The dashed polygons identify the scores at the intersections between the dashed polygons and the four axes. The points 7A, 7B, 7C, 7D, and 7E define a polygon 2P that is useful for visualizing the PRR criteria category scores relative to each other and also for visualizing the score of each PRR criteria category in relation to the pertinent threshold score (e.g., 85). Although not shown in FIG. 7G, a threshold score to ultimately be satisfied by the PRR criteria category scores and/or Overall Review Score could also be represented on FIG. 7G. For example, if the threshold score for the Overall Review Score is 85, then a heavily bolded polygon having the value 85 (i.e., between the dashed polygons having values of 80 and 90), could be superimposed onto FIG. 7G. The spider chart of FIG. 7G may be generated by a software tool or algorithm (e.g., a graphics plotting tool), wherein the software tool or algorithm is stored on a computer readable medium and is executed by a processor of a computer system.

Note that a detailed scorecard and a spider chart could be utilized for scoring performance in relation to the PRR entry criteria of FIGS. 7D-7E in a manner analogous to the use of the detailed scorecard and spider chart of FIGS. 7F and 7G, respectively, in relation to scoring performance for the PRR exit criteria of FIGS. 7D-7E.

If the pertinent algorithm determines that the PRR process has been successfully completed, then the Go/No Go decision step 737 of FIG. 7B is next executed to complete the SE review process for the project.

In accordance with the preceding discussion, the Put System Into Production step 700 (see FIG. 1) of the SE process reviews putting the system into production. The Production Readiness Review (PRR) template and the PRR scorecard are used to establish and agree on the production (also known as operational) plan for the system. The PRR template maps out a clear, specific set of steps to evaluate the production plan. The PRR scorecard quantitatively measures how well the production plan defines the methods, production components, procedures and environment to install the IT solution into production and verify completeness of the production installation. The present invention enables both the SE team and the customer to agree on the adequacy of the production plan prior to starting any installation. This agreement is the formal basis to place the technical scope of the project into operation. The present invention provides a structured guide to the work required to complete this step of the SE process and a measurable standard with which to determine the readiness and risk to proceed forward with the project.

The PRR template provides standardization and replication of the PRR review steps for any project using the SE process by dictating the detailed content and specific sequence of the PRR. This results in a measurable improvement in quality, content and consistency of all PRRs. A goal of the PRR is to establish the plan to put the system into production. Successful completion of the PRR will reduce project risk by identifying defects and issues. Successful completion of the PRR is achieved when a sufficient number of defects and issues have been resolved to obtain a success score as described supra in conjunction with FIG. 6F.

To achieve successful completion of the PRR, the present invention lists clear, standardized objectives for the PRR to ensure the review goals are met.

To achieve successful completion of the PRR, the present invention also establishes a standardized set of PRR entry criteria, PRR presentation content, and PRR exit criteria that must be met in order to successfully complete the review. The PRR entry criteria list the information to be presented within the review. The PRR presentation content further clarify what information should be presented and how it can be presented. The PRR exit criteria delineate the requirements for accepting the technical information as complete. If the level of detail required in the template is not available, then the practitioner is not ready to hold an PRR.

To achieve successful completion of the PRR, the present invention requires completion of the PRR scorecard to provide a measurable evaluation of the review's success.

When the PRR is conducted as described herein, a list of defects and issues is recorded as well as a quantitative measure (i.e., score) which evaluates the content and completeness of the production plan. The score is tied to the defects and issues that have been recorded. Correction of the defects and resolution of the issues are essential to the creation of the production plan. As the defects are corrected and the issues resolved the PRR criteria are periodically reapplied to evaluate the content and completeness of the requirements and a new quantitative measure is developed. The quantitative measure is used to identify and quantify risk. The production plan is not baselined until a minimum success score (i.e., minimum acceptable score; e.g., 85, 80-90, or 85-100 in the Overall Review Score of FIG. 6F) has been achieved.

The PRR Scorecard is a quantitative and consistent method to measures the quality and completeness of the project's production plan according to a comprehensive set of criteria. The PRR Scorecard provides a mechanism for scoring the production plan for accuracy, completeness, quality, and risk. The PRR scorecard contains the PRR criteria and weighting in a software tool (e.g., a commercially available tool such as the Microsoft Excel® spreadsheet tool) to quickly and uniformly generate a review score. The criteria can be easily tailored to address specific project complexity or scope situations. Using a uniform (i.e., project independent) criteria allows teams to conduct analysis across all projects and develop organization lessons learned with corrective actions. However, the scope of the present invention also includes embodiments in which the success criteria are project dependent The present invention measures the quality of the prescribed PRR exit criteria by providing: guidelines for performing the scoring; a prescribed set of scoring criteria for each question; a prescribed set of questions which specifically address the defined goals of the PRR; and a weighting factor for each question to accurately reflect the significance of each element in regard to the overall evaluation.

An output of the PRR scorecard is an Overall Review Score such as between 0 and 100 which: rates the quality of the material presented at the review; specifies the issues and defects that were discovered during the review; and states the technical risk associated with the production plan presented at the review.

The Overall Review Score may also be also mapped to "Red" (critical), "Yellow" (caution), "Green" (satisfactory) status for a summary assessment of the overall condition of the project. The PRR Scorecard automatically generates a "spider chart" as a graphical representation of the scoring per criteria. The chart is a visual reference to highlight the problem areas discovered during the PRR and measured by the Overall Review Score for the PRR.

Requirements Traceability and Verification Matrix (RTVM)

FIGS. 8A-8H depict a Requirements Traceability and Verification Matrix (RTVM) 800 which provides cumulative traceability from the business requirements, systems requirements, component requirements, design elements and test methods to ensure that the system is verified and validated in all of its facets, in accordance with embodiments of the present invention. FIGS. 8A, 8B, 8C, 8D, 8E, 8F, 8G, and 8H respectively depict portion 800A, 800B, 800C, 800D, 800E, 800F, 800G, and 800H of the RTVM 800. The RTVM 800 effectively tracks the hierarchical relationships among the business requirements, the system requirements, and the component requirements. The RTVM is utilized in each of steps 200, 300, 400, 500, and 600 of FIG. 1.

FIGS. 8A-8H include a block 810 which common to each of FIGS. 8A-8H. FIGS. 8A-8H also include Figure-dependent blocks 820A-820H. FIGS. 8A, 8B, 8C, 8D, 8E, 8F, 8G, and 8H include block 820A, 820B, 820C, 820D, 820E, 820F, 820G, and 820H. While FIGS. 8A-8G depict portions 800A-800G of the RTVM 800 on separate and distinct Figures, the scope of the present invention includes representing portions 800A-800H as a single continuous spreadsheet such that the common block 810 appears only once as the leftmost portion of the spreadsheet, and blocks 820A, 820B, 820C, 820D, 820E, 820F, 820G, and 820H appear on the spreadsheet sequentially from left to right as well as to the right of common block 810. In the preceding single spreadsheet layout, duplicate printing of the common block 800 is avoided.

The common block 810 of FIGS. 8A-8H includes a Requirements field which contains business requirements, system requirements, and component requirements. In FIGS. 8A-8H, the common block 810 depicts: business requirements of R1, R2, R3, and R4; system requirements of S1.1, S1.2, S2.1, S2.2, S3.1, and S4.1; and component requirements of C1.1.1, C1.1.2, C1, C1.2.2, C1.2.3, C2.1.1, and C2.2.1. Generally, the business requirements, system requirements, and component requirements are hierarchically linked such that system requirement of $S_{i.j}$ is linked to component requirement $R_i$, and component requirement $C_{i.j.k}$ is linked to system requirement $S_{i.j}$, wherein I, j, and k are positive integers. Each row of the common block 810 represents a business requirement, a system requirement, or a component requirement. For example, row 831 represents business requirement R1, row 832 represents system requirement S1.1 which is hierarchically linked to business requirement R1, and row 833 represents component requirement C1.1.1 which is hierarchically linked to system requirement S1.1.

In FIG. 8A, block 820A has fields Requirement Status, Design Documents, Build Components, and Customer Acceptance Criteria. The Requirement Status field identifies the concurrent status of the requirement and may have, inter alia, one of the following values: design complete, build complete, test verified, withdrawn, etc. The Design Documents field identifies the section(s) in design or other documents where the requirement has been addressed (e.g., External/Internal, Macro/Micro, etc.). The Build Components field identifies the module(s), program(s) or other component(s) (e.g., software component, documentation, training materials, etc.) where the requirement is delivered; the highest level that is descriptive is used. The Customer Acceptance Criteria field identifies the criteria by which the customer will accept that the requirement has been met.

FIGS. 8B-8H each have the fields Test Method, Test Case, and Test Result. The Test Method may be Analysis, Demonstration, Inspection, Simulation/Modeling, or Test. The Test Method of Analysis denotes a systematic appraisal of a requirement and its derivations to definitely demonstrate the validity of a requirement, design or test. The Test Method of Demonstration denotes a presentation of the physical realization of a requirement in active use in real or simulated conditions, which would apply to the validation of Human Factors aspects, maintainability and removal routes. The Test Method of Inspection denotes a visual review of documentation, materials or mechanical features associated with the product. The Test Method of Simulation/Modeling denotes a representation of the design (either physically by a mockup, or by means of a computer-generated simulation which can be validated as representative) through which performance characteristics of the design (or elements of it) can be accurately assessed. The Test Method of Test denotes a repeatable test with defined pre-test conditions and quantifiable pass/fail criteria. Tests may be conducted or repeated at different stages of the design and integration process to verify required operation. The Test Case field includes an identifier of the pertinent test case for the requirement. The Test Result field includes an identifier of the test result for the Test Case.

Figure 8B:
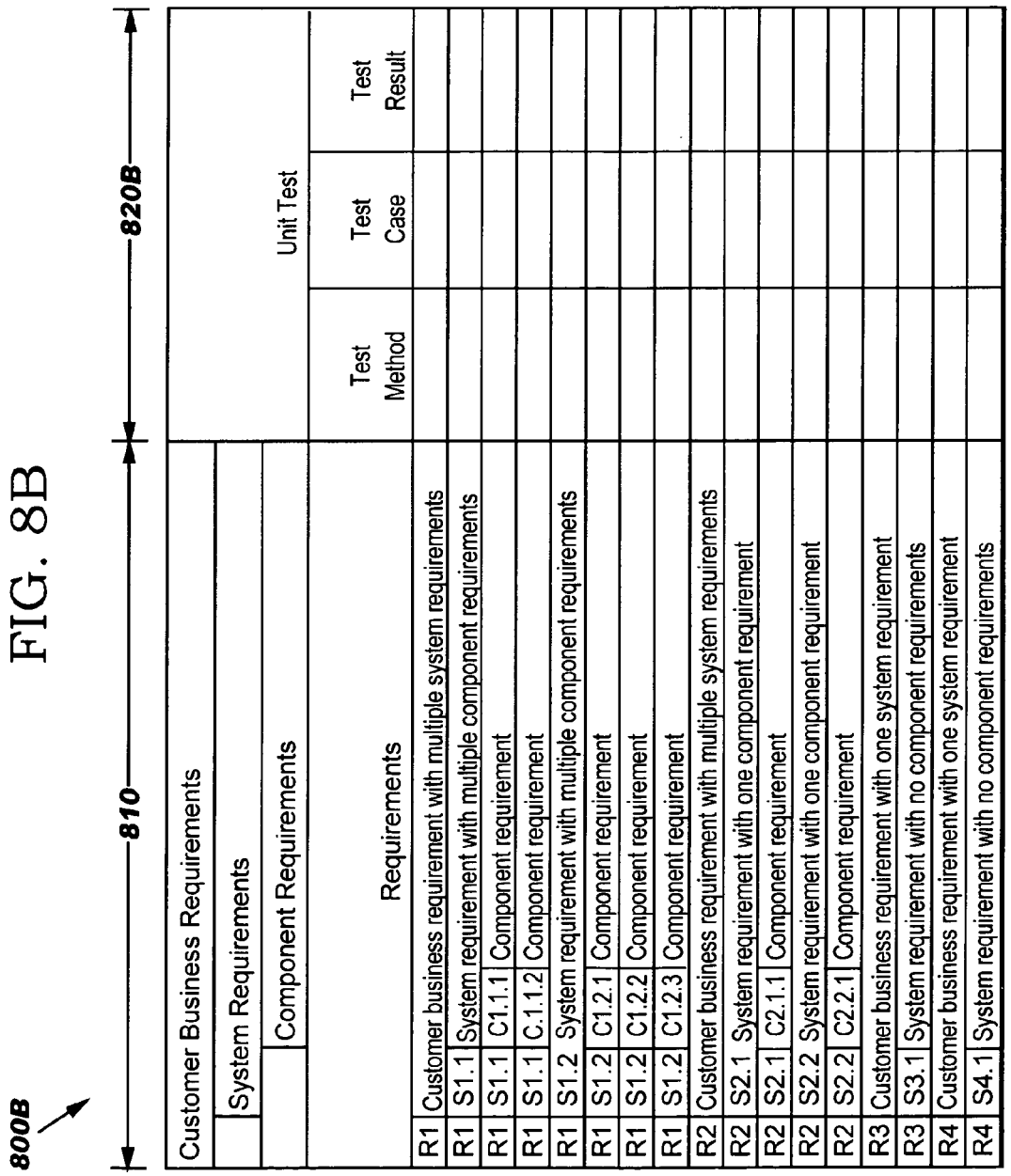

FIG. 8B shows in block 820B the fields Test Method, Test Case, and Test Result of the RTVM that track the Unit Test information (testing the separate units that make up the system). For each requirement (when applicable), the Test Method (Analysis, Demonstration, Inspection, Simulation/Modeling, Test), Test Case and Test Result will be recorded in the corresponding column of the matrix.

FIG. 8C shows in block 820C the fields Test Method, Test Case, and Test Result of the RTVM that track the Integration Test information (integrating the units into a single working system). For each requirement (when applicable), the Test Method (Analysis, Demonstration, Inspection, Simulation/Modeling, Test), Test Case and Test Result will be recorded in the corresponding column of the matrix.

FIG. 8D shows in block 820D the fields Test Method, Test Case, and Test Result of the RTVM that track the System Test information (testing the integrated units as a single working system). For each requirement (when applicable), the Test Method (Analysis, Demonstration, Inspection, Simulation/Modeling, Test), Test Case and Test Result will be recorded in the corresponding column of the matrix.

FIG. 8E shows in block 820E the fields Test Method, Test Case, and Test Result of the RTVM that track the System Integration Test information (integrating the system into existing production environment). For each requirement (when applicable), the Test Method (Analysis, Demonstration, Inspection, Simulation/Modeling, Test), Test Case and Test Result will be recorded in the corresponding column of the matrix.

FIG. 8F shows in block 820F the fields Test Method, Test Case, and Test Result of the RTVM that track the Usability Test information (how well the new system meets it performance requirements). For each requirement (when applicable), the Test Method (Analysis, Demonstration, Inspection, Simulation/Modeling, Test), Test Case and Test Result will be recorded in the corresponding column of the matrix.

FIG. 8G shows in block 820G the fields Test Method, Test Case, and Test Result of the RTVM that track the Acceptance Test information (testing user acceptance of the system). For each requirement (when applicable), the Test Method (Analysis, Demonstration, Inspection, Simulation/Modeling, Test), Test Case and Test Result will be recorded in the corresponding column of the matrix.

FIG. 8H shows in block 820H the fields Test Method, Test Case, and Test Result of the RTVM that track the Operability Test information (testing operability of the system). For each requirement (when applicable), the Test Method (Analysis, Demonstration, Inspection, Simulation/Modeling, Test), Test Case and Test Result will be recorded in the corresponding column of the matrix.

The RTVM is a technical management tool that is continually maintained throughout the project lifecycle. The ability to organize and trace the numerous requirements generated during system development projects is critical to the project's success. A software tool (e.g., a commercially available tool such as the Microsoft Excel® spreadsheet tool) may be utilized to show both requirements traceability and verification. Requirements traceability is the ability to describe and follow a requirement through project lifecycle. The RTVM shows requirements traceability from Business Requirements through System Requirements, Component Requirements, Design Documents, Build Components to Acceptance Criteria. The RTVM shows how the individual requirements will be verified via the test method, the test type, and the acceptance criteria.

The RTVM is created after the business requirements have been baselined. Then the data in each column is defined and/or modified during the various phases of the project lifecycle.

When developing system requirements, the system requirements must be traced to business requirements, which provides a map to illustrate how the business requirements will be implemented and from where the system requirements were derived. The requirements traceability is implemented by the (i,j,k) indexing of the business requirement (Ri), system requirements (Si.j) and component requirements (Ci.j.k), as described supra. Acceptance criteria and test types/methods are shown in the RTVM to indicate how the system requirements will be verified.

When developing component requirements, the component requirements are traced to the system requirements. This provides a map of how the system requirements will be implemented and what business requirement are supported. The map shows the how component requirements were derived from the system requirements and the business requirements. Acceptance criteria and test types/methods are shown to indicate how the component requirements will be verified.

During system design and build, the system's design documents and build components need to be traced to their corresponding system and component requirements to demonstrate that all business processes and system requirements are met within the proposed solution.

During system testing, each system and component requirement is tested to verify its correctness and completeness. The RTVM maps each requirement to the required test method, test type and acceptance criteria.

Figure 9:
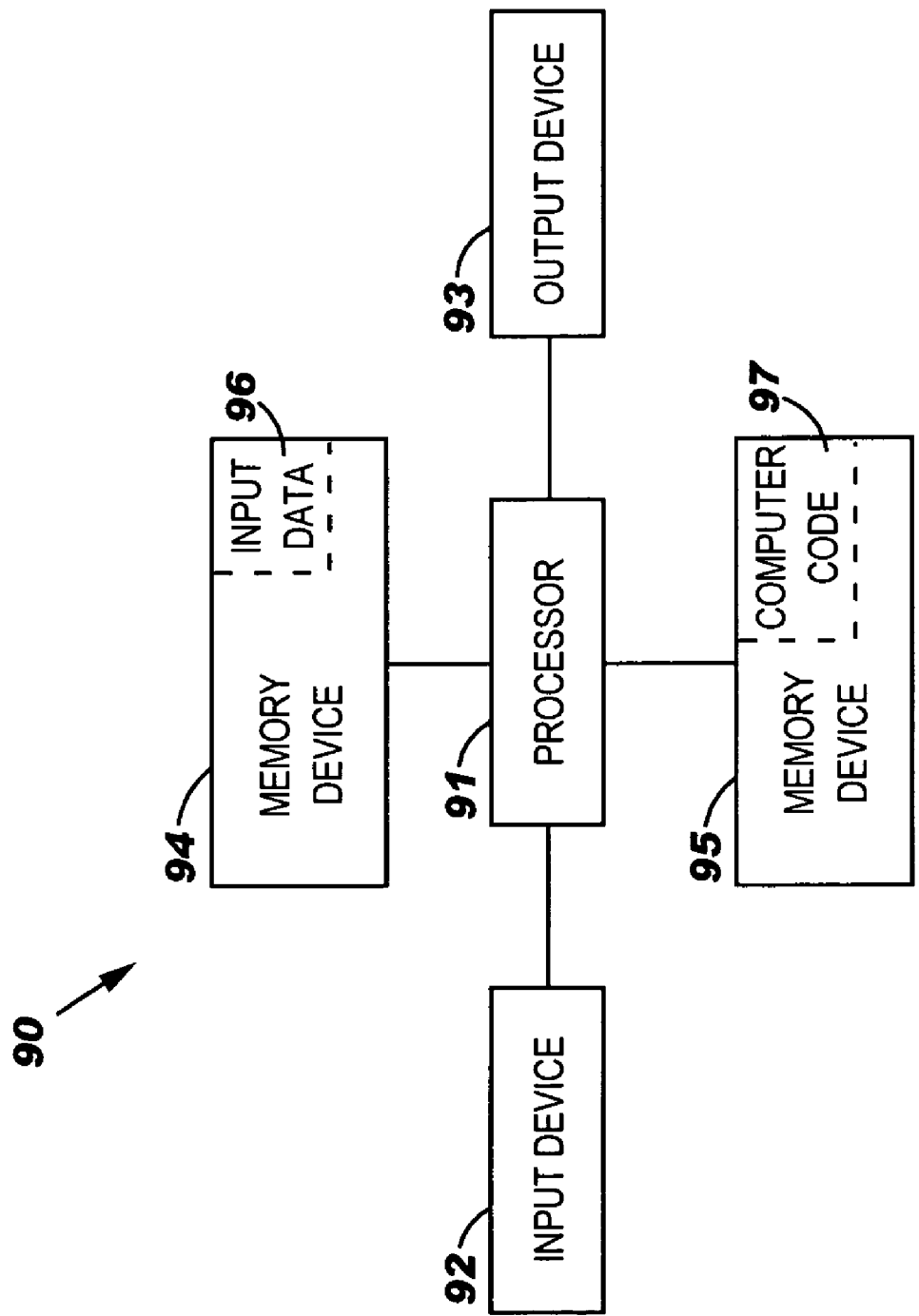
FIG. 9 illustrates a computer system used for generating a RTVM, in accordance with embodiments of the present invention.

FIG. 9 illustrates a computer system 90 used for generating the RTVM and/or generating the spider charts and/or computing the Overall Review Score, described supra, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes a commercially available or customized software tool or algorithm for generating the RTVM (e.g., a commercially available tool such as the Microsoft Excel® spreadsheet tool) described supra, and/or a software tool or algorithm for generating the spider charts (e.g., a graphics plotting tool) described supra, and/or computing the Overall Review Score described supra. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for implementing a project for a customer, said method comprising: developing business requirements of the project, said developing business requirements including reviewing the business requirements for acceptability in accordance with business requirements review (BRR) exit criteria and reviewing the BRR exit criteria, said BRR exit criteria being distributed within a plurality of business requirements categories, said reviewing the business requirements for acceptability comprising determining that the BRR exit criteria are satisfied, said determining that the BRR exit criteria are satisfied comprising:

providing at least one business requirements scorecard criteria for each business requirements category, said at least one business requirements scorecard criteria reflecting said BRR exit criteria for each business requirements category;

providing business requirements weights corresponding to the business requirements scorecard criteria;

providing business requirements scores corresponding to the business requirements scorecard criteria;

computing a BRR overall review score as a function of the business requirements scores and the business requirements weights;

determining a first result consisting of the BRR exit criteria being satisfied by determining that the computed BRR overall review score is not less than a specified minimum success business requirements score;

transmitting the BRR overall review score and the first result to a least one output device of a computer system;

said computing the BRR overall review score and said determining the first result being performed by executing BRR software that computes the BRR overall review score and determines the first result, said BRR software being stored on a computer readable storage medium and being executed by a processor of the computer system.

2. The method of claim 1, said business requirements categories comprising: business objectives and scope, as-is business process flows, business requirements, and success criteria and associated metrics.

3. The method of claim 1, said function of the business requirements scores and the business requirements weights being proportional to a weighted summation over all of the business requirements scores in accordance with the associated business requirements weights.

4. The method of claim 3, wherein the BRR overall review score is normalized to fall within a range of 0 to 100, and wherein the minimum success business requirements score is within a range of 85 to 100.

5. The method of claim 1,
said determining that the BRR exit criteria are satisfied further including generating a spider chart having one axis per business requirements criteria category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those business requirements scores and business requirements weights which correspond to the business requirements scorecard criteria of the category, said generating the spider chart comprising generating the spider chart by executing a software graphics plotting tool, said software graphics plotting tool being stored on the computer readable storage medium and being executed by the processor of the computer system; and displaying the spider chart on an output device of the at least one output device of the computer system.

6. The method of claim 1, said developing business requirements further including:

reviewing BRR entry criteria, said BRR entry criteria comprising criteria to be satisfied as a prerequisite to reviewing the business requirements; and determining whether the BRR entry criteria have been satisfied, wherein if the BRR entry criteria are determined to have been satisfied then executing said reviewing the business requirements, but if the BRR entry criteria are determined to have not been satisfied then iteratively executing said reviewing the BRR entry criteria and determining whether the BRR entry criteria have been satisfied until the BRR entry criteria are determined to have been satisfied.

7. The method of claim 6, said developing business requirements further including:
    reviewing ground rules for reviewing the business requirements;
    establishing goals and objectives for reviewing the business requirements;
    presenting business requirements content to stakeholders of the project; and
    identifying and eliminating defects relating to the business requirements.

8. The method of claim 1, said method further comprising developing system requirements of the project after said developing business requirements, said developing system requirements including reviewing the system requirements for acceptability in accordance with system requirements review (SRR) exit criteria, said business requirements being decomposed into the system requirements, said developing system requirements further including reviewing the SRR exit criteria, said SRR exit criteria being distributed within a plurality of system requirements categories, said reviewing the system requirements for acceptability comprising determining that the SRR exit criteria are satisfied, said determining that the SRR exit criteria are satisfied including:
    providing at least one system requirements scorecard criteria for each system requirements category, said at least one system requirements scorecard criteria reflecting said SRR exit criteria for each system requirements category;
    providing system requirements weights corresponding to the system requirements scorecard criteria;
    providing system requirements scores corresponding to the system requirements scorecard criteria;
    computing a SRR overall review score as a function of the system requirements scores and the system requirements weights;
    determining a second result consisting of the SRR exit criteria being satisfied by determining that the computed SRR overall review score is not less than a specified minimum success system requirements score;
    transmitting the SRR overall review score and the second result to the least one output device of the computer system;
    said computing the SRR overall review score and said determining the second result being performed by executing SRR software that computes the SRR overall review score and determines the second result, said SRR software being stored on the computer readable storage medium and being executed by the processor of the computer system.

9. The method of claim 8, said system requirements categories comprising: business requirements and process definition, system requirements definition, system level architecture, acceptance criteria, and requirements traceability.

10. The method of claim 8, said function of the system requirements scores and the system requirements weights being proportional to a weighted summation over all of the system requirements scores in accordance with the associated system requirements weights.

11. The method of claim 8, wherein the system requirements overall review score is normalized to fall within a range of 0 to 100, and wherein the minimum success system requirements score is within a range of 85 to 100.

12. The method of claim 8, said determining that the SRR exit criteria are satisfied further including generating a spider chart having one axis per system requirements category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those system requirements scores and system requirements weights which correspond to the system requirements scorecard criteria of the category, said generating the spider chart comprising generating the spider chart by executing a software graphics plotting tool, said software graphics plotting tool being stored on the computer readable storage medium and being executed by the processor of the computer system; and
    displaying the spider chart on an output device of the at least one output device of the computer system.

13. The method of claim 8, said method further comprising developing component requirements of the project after said developing system requirements, said developing component requirements including reviewing the component requirements for acceptability in accordance with preliminary design review (PDR) exit criteria, said system requirements being decomposed into the component requirements, said developing component requirements further including reviewing the PDR exit criteria, said PDR exit criteria being distributed within a plurality of component requirements categories, said reviewing the component requirements for acceptability comprising determining that the PDR exit criteria are satisfied, said determining whether the PDR exit criteria have been satisfied including:
    providing at least one component requirements scorecard criteria for each component requirements category, said at least one component requirements scorecard criteria reflecting said PDR exit criteria for each component requirements category;
    providing component requirements weights corresponding to the component requirements scorecard criteria;
    providing component requirements scores corresponding to the component requirements scorecard criteria;
    computing a PDR overall review score as a function of the component requirements scores and the component requirements weights;
    determining a third result consisting of the PDR exit criteria being satisfied by determining that the computed PDR overall review score is not less than a specified minimum success component requirements score;
    transmitting the PDR overall review score and the third result to the least one output device of the computer system;
    said computing the PDR overall review score and said determining the third result being performed by executing PDR software that computes the PDR overall review score and determines the third result, said PDR software being stored on the computer readable storage medium and being executed by the processor of the computer system.

14. The method of claim 13, said component requirements categories comprising: static architecture definition; dynamic architecture definition; architecture element definition/component requirements; and test architecture definition.

15. The method of claim 13, said function of the component requirements scores and the component requirements weights being proportional to a weighted summation over all of the component requirements scores in accordance with the associated component requirements weights.

16. The method of claim 15, wherein the PDR review score is normalized to fall within a range of 0 to 100, and wherein the minimum success component requirements score is within a range of 85 to 100.

17. The method of claim 13, said determining that the PDR exit criteria are satisfied further including generating a spider chart having one axis per component requirements category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those component requirements scores and component requirements weights which correspond to the component requirements scorecard criteria of the category, said generating the spider chart comprising generating the spider chart by executing a software graphics plotting tool, said software graphics plotting tool being stored on the computer readable storage medium and being executed by the processor of the computer system; and
displaying the spider chart on an output device of the at least one output device of the computer system.

18. The method of claim 13, wherein after said developing component requirements, the method further comprises:
developing component designs compatible with the component requirements; and
developing test plans for testing the component designs, said developing component designs and developing test plans including reviewing the component designs and test plans for acceptability in accordance with critical design review (CDR) exit criteria, said component requirements being decomposed into the component designs and the test plans.

19. The method of claim 18, said developing component designs and developing test plans further including reviewing the CDR exit criteria, said CDR exit criteria being distributed within a plurality of CDR criteria categories, said reviewing the component designs and test plans for acceptability comprising determining that the CDR exit criteria are satisfied.

20. The method of claim 18, said CDR criteria categories comprising: system and components requirement review, component design and test review, service delivery center/operations and delivery organization, system testing, data load (test), and data load (production).

21. The method of claim 19, said determining that the CDR exit criteria are satisfied including:
providing at least one CDR scorecard criteria for each CDR criteria category, said at least one CDR scorecard criteria reflecting said CDR exit criteria for each CDR criteria category;
providing CDR criteria weights corresponding to the CDR scorecard criteria;
providing CDR criteria scores corresponding to the CDR scorecard criteria;
computing a CDR overall review score as a function of the CDR criteria scores and the CDR criteria weights;
determining a fourth result consisting of the CDR exit criteria being satisfied by determining that the computed CDR overall review score is not less than a specified minimum success CDR overall review score;
transmitting the CDR overall review score and the fourth result to the least one output device of the computer system;
said computing the CDR overall review score and said determining the fourth result being performed by executing CDR software that computes the CDR overall review score and determines the fourth result, said CDR software being stored on the computer readable storage medium and being executed by the processor of the computer system.

22. The method of claim 21, said function of the CDR criteria scores and the CDR criteria weights being proportional to a weighted summation over all of the CDR criteria scores in accordance with the associated CDR criteria weights.

23. The method of claim 21, wherein the CDR overall review score is normalized to fall within a range of 0 to 100, and wherein the minimum success CDR overall review score is with in a range of 85 to 100.

24. The method of claim 21, said determining that the CDR exit criteria are satisfied further including generating a spider chart having one axis per CDR criteria category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those CDR criteria scores and CDR criteria weights which correspond to the CDR scorecard criteria of the category, said generating the spider chart comprising generating the spider chart by executing a software graphics plotting tool, said software graphics plotting tool being stored on the computer readable storage medium and being executed by the processor of the computer system; and
displaying the spider chart on an output device of the at least one output device of the computer system.

25. The method of claim 18, wherein after said developing component designs compatible with the component requirements and developing test plans for testing the component designs, the method further comprises:
specifying a system pertaining to the project; and
testing the system to determine that the system adequately supports the project, said specifying and testing the system including reviewing said testing for acceptability comprising determining that test readiness review (TRR) exit criteria are satisfied.

26. The method of claim 25, said determining that the TRR exit criteria are satisfied including:
providing at least one TRR scorecard criteria for each TRR criteria category, said at least one TRR scorecard criteria reflecting said TRR exit criteria for each TRR criteria category;
providing TRR criteria weights corresponding to the TRR scorecard criteria;
providing TRR criteria scores corresponding to the TRR scorecard criteria;
computing a TRR overall review score as a function of the TRR criteria scores and the TRR criteria weights;
determining a fourth result consisting of the TRR exit criteria being satisfied by determining that the computed TRR overall review score is not less than a specified minimum success TRR overall review score;
transmitting the TRR overall review score and the fourth result to the least one output device of the computer system;

said computing the TRR overall review score and said determining the fourth result being performed by executing TRR software that computes the TRR overall review score and determines the fourth result, said TRR software being stored on the computer readable storage medium and being executed by the processor of the computer system.

27. The method of claim 26, said function of the TRR criteria scores and the TRR criteria weights being proportional to a weighted summation over all of the TRR criteria scores in accordance with the associated TRR criteria weights.

28. The method of claim 26, wherein the TRR overall review score is normalized to fall within a range of 0 to 100, and wherein the minimum success TRR overall review score is within a range of 85 to 100.

29. The method of claim 26, said determining that the TRR exit criteria are satisfied further including generating a spider chart having one axis per TRR criteria category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those TRR criteria scores and TRR criteria weights which correspond to the TRR scorecard criteria of the category, said generating the spider chart comprising generating the spider chart by executing a software graphics plotting tool, said software graphics plotting tool being stored on the computer readable storage medium and being executed by the processor of the computer system; and displaying the spider chart on an output device of the at least one output device of the computer system.

30. The method of claim 25, wherein after said specifying a system pertaining to the project; and testing the system to determine that the system adequately supports the project, the method further comprises putting the system into production for acceptability by determining that production readiness review (PRR) exit criteria are satisfied.

31. The method of claim 30, said determining that PRR exit criteria have been satisfied including:

providing at least one PRR scorecard criteria for each PRR criteria category, said at least one PRR scorecard criteria reflecting said PRR exit criteria for each PRR criteria category;

providing PRR criteria weights corresponding to the PRR scorecard criteria;

providing PRR criteria scores corresponding to the PRR scorecard criteria;

computing a PRR overall review score as a function of the PRR criteria scores and the PRR criteria weights;

determining a fourth result consisting of the PRR exit criteria being satisfied by determining that the computed PRR overall review score is not less than a specified minimum success PRR overall review score;

transmitting the PRR overall review score and the fourth result to the least one output device of the computer system;

said computing the PRR overall review score and said determining the fourth result being performed by executing PRR software that computes the PRR overall review score and determines the fourth result, said PRR software being stored on the computer readable storage medium and being executed by the processor of the computer system.

32. The method of claim 31, said function of the PRR criteria scores and the PRR criteria weights being proportional to a weighted summation over all of the PRR criteria scores in accordance with the associated PRR criteria weights.

33. The method of claim 31, wherein the PRR overall review score is normalized to fall within a range of 0 to 100, and wherein the minimum success PRR overall review score is within a range of 85 to 100.

34. The method of claim 31, said determining that the PRR exit criteria are satisfied further including generating a spider chart having one axis per PRR criteria category, each said axis representing category scores for the category associated with the axis, each said axis having a plotted point thereon, said plotted point on the axis being a computed category score for the category associated with the axis, plotted points in each pair of successive plotted points being connected by a straight line to form a polygon, said computed category score for the category being a function of those PRR criteria scores and PRR criteria weights which correspond to the PRR scorecard criteria of the category, said generating the spider chart comprising generating the spider chart by executing a software graphics plotting tool, said software graphics plotting tool being stored on the computer readable storage medium and being executed by the processor of the computer system; and displaying the spider chart on an output device of the at least one output device of the computer system.

35. The method of claim 18, said method further comprising:

providing a Requirements Traceability and Verification Matrix (RTVM) as input to each of the BRR, SRR, and PDR, said RTVM depicting hierarchical relationships between the business requirements and the system requirements, said RTVM further depicting hierarchical relationships between the system requirements and the component requirements;

updating the RTVM with verification information relating to the business requirements, after the BRR exit criteria have been determined to be satisfied and before said developing system requirements has been initiated;

updating the RTVM with verification information relating to the system requirements, after the SRR exit criteria have been determined to be satisfied and before said developing component requirements has been initiated;

updating the RTVM with verification information relating to the component requirements, after the PDR exit criteria have been determined to be satisfied and before said developing component designs and developing test plans have been initiated; and updating the RTVM with verification information relating to the component designs and test plans, after the CDR exit criteria have been determined to be satisfied.

36. The method of claim 35, wherein the business requirements, the system requirements, and component requirements are each identified in the RTVM by a symbolic code which effectuates the hierarchical relationships between the business requirements and the system requirements and the hierarchical relationships between system requirements and the component requirements.

37. The method of claim 35, wherein the verification information relating to the business requirements, the system requirements, and the component requirements include requirement status, affected design documents, affected build components, and customer acceptance criteria.

38. The method of claim 35, wherein the RTVM is encoded within a spreadsheet, and wherein each business requirement, system requirement, and component requirement is depicted in a unique row of the spreadsheet.

39. The method of claim 37, wherein the verification information relating to the business requirements, the system requirements, and the component requirements further include a test method, a test case, and a test result for at least one test type.

40. The method of claim 39, wherein the test method is selected from the group consisting of Analysis, Demonstration, Inspection, Simulation/Modeling, and Test.

41. The method of claim 39, wherein the at least one test type includes at least one of: unit test, integration test, system test, systems integration test, usability test, acceptance test, and operability test.

42. The method of claim 13, providing a Requirements Traceability and Verification Matrix (RTVM) as input to each of the BRR, SRR, and PDR, said RTVM depicting hierarchical relationships between the business requirements and the system requirements, said RTVM further depicting hierarchical relationships between the system requirements and the component requirements.

* * * * *

UNITED STATES PATENT AND TRADEMARK OFFICE
CERTIFICATE OF CORRECTION

PATENT NO. : 7,590,552 B2  Page 1 of 1
APPLICATION NO. : 10/839583
DATED : September 15, 2009
INVENTOR(S) : Barker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1533 days.

Signed and Sealed this

Twenty-first Day of September, 2010

David J. Kappos
*Director of the United States Patent and Trademark Office*